(12) United States Patent
Croughwell, III et al.

(10) Patent No.: US 12,341,557 B2
(45) Date of Patent: Jun. 24, 2025

(54) METHODS, DEVICES, AND SYSTEMS FOR TIMING AND BANDWIDTH MANAGEMENT OF ULTRA-WIDEBAND, WIRELESS COMMUNICATION CHANNELS

(71) Applicant: LUMEOVA, INC., Raleigh, NC (US)

(72) Inventors: William Joseph Croughwell, III, Hillsborough, NC (US); Mohammad Ali Khatibzadeh, Cary, NC (US); Morteza Abbasi, Raleigh, NC (US)

(73) Assignee: LUMEOVA, INC., Raleigh, NC (US)

( * ) Notice: Subject to any disclaimer, the term of this patent is extended or adjusted under 35 U.S.C. 154(b) by 0 days.

(21) Appl. No.: 18/439,281

(22) Filed: Feb. 12, 2024

(65) Prior Publication Data
US 2024/0187093 A1 Jun. 6, 2024

Related U.S. Application Data

(63) Continuation of application No. 18/146,036, filed on Dec. 23, 2022, now Pat. No. 11,901,940, which is a
(Continued)

(51) Int. Cl.
*H04B 10/114* (2013.01)
*G06F 13/38* (2006.01)
(Continued)

(52) U.S. Cl.
CPC ........... *H04B 10/11* (2013.01); *G06F 13/387* (2013.01); *H04B 10/114* (2013.01);
(Continued)

(58) Field of Classification Search
CPC ............................................... H04B 10/11–118
See application file for complete search history.

(56) References Cited

U.S. PATENT DOCUMENTS

| 4,558,743 A | 12/1985 | Ryan |
|---|---|---|
| 4,560,984 A | 12/1985 | Scholl |

(Continued)

FOREIGN PATENT DOCUMENTS

| JP | WO2015174108 A1 | 4/2017 |
|---|---|---|
| RU | 2274953 C1 | 4/2006 |

(Continued)

OTHER PUBLICATIONS

ISA/RU, International Search Report in International Application No. PCT/US2019/012989 dated Apr. 11, 2019.
(Continued)

*Primary Examiner* — Nathan M Cors
(74) *Attorney, Agent, or Firm* — NK Patent Law

(57) ABSTRACT

Disclosed herein are methods, devices, and systems for providing timing and bandwidth management of ultra-wideband, wireless data channels (including radio frequency and wireless optical data channels). According to one embodiment, a hub apparatus is disclosed for providing out-of-band bandwidth management for a free-space-optical (FSO) data channel associated with a first device. The hub apparatus includes a processor, a memory coupled with the processor, an FSO transmitter coupled with the processor, and an FSO receiver coupled with the processor. The FSO transmitter may be configured to transmit a control signal comprising timing information and bandwidth management information.

16 Claims, 47 Drawing Sheets

Related U.S. Application Data continuation of application No. 17/181,045, filed on Feb. 22, 2021, now Pat. No. 11,539,433, which is a continuation of application No. 16/663,549, filed on Oct. 25, 2019, now Pat. No. 10,931,371, which is a continuation of application No. PCT/US2019/012989, filed on Jan. 10, 2019.

(60) Provisional application No. 62/615,858, filed on Jan. 10, 2018.

(51) Int. Cl.
| | | |
|---|---|---|
| *H04B 10/11* | (2013.01) | |
| *H04B 10/116* | (2013.01) | |
| *H04J 3/02* | (2006.01) | |
| *H04J 14/02* | (2006.01) | |

(52) U.S. Cl.
CPC .............. *H04B 10/116* (2013.01); *H04J 3/02* (2013.01); *H04J 14/0215* (2013.01)

(56) References Cited

U.S. PATENT DOCUMENTS

| | | | |
|---|---|---|---|
| 4,701,909 | A | 10/1987 | Kavehrad |
| 4,751,701 | A | 6/1988 | Ross |
| 5,247,381 | A | 9/1993 | Omstead |
| RE35,035 | E | 9/1995 | Shipley |
| 5,838,471 | A * | 11/1998 | Beard .............. H04B 10/11 398/189 |
| 6,144,473 | A * | 11/2000 | Rokhsaz ............ H04B 1/525 398/1 |
| 6,548,967 | B1 | 4/2003 | Dowling et al. |
| 9,293,921 | B2 | 3/2016 | Jones et al. |
| 10,579,545 | B2 | 3/2020 | Guigues |
| 10,931,371 | B2 | 2/2021 | Croughwell, III et al. |
| 2003/0126315 | A1 | 7/2003 | Tan et al. |
| 2007/0024571 | A1 | 2/2007 | Maniam et al. |
| 2007/0286599 | A1 | 12/2007 | Sauer |
| 2009/0269074 | A1 | 10/2009 | Tidhar |
| 2012/0182217 | A1 | 7/2012 | Miroshnichenko |
| 2013/0010675 | A1 * | 1/2013 | Huen .............. H04B 10/1129 370/315 |
| 2015/0288942 | A1 | 10/2015 | Jannard et al. |
| 2015/0318922 | A1 | 11/2015 | Poola et al. |
| 2016/0309565 | A1 * | 10/2016 | Tran ..................... H05B 47/11 |
| 2018/0046236 | A1 | 2/2018 | Erturk et al. |
| 2018/0122978 | A1 | 5/2018 | Khatibzadeh |
| 2018/0317184 | A1 | 11/2018 | Bushnell |
| 2019/0028192 | A1 | 1/2019 | Tsonev et al. |
| 2019/0215065 | A1 | 7/2019 | Fairweather |

FOREIGN PATENT DOCUMENTS

| | | | |
|---|---|---|---|
| RU | 2296952 | C2 | 4/2007 |
| RU | 66644 | U1 | 9/2007 |
| RU | 2312371 | C1 | 12/2007 |
| RU | 2361235 | C1 | 7/2009 |
| RU | 2403673 | C1 | 11/2010 |
| RU | 2544305 | C1 | 3/2015 |
| RU | 2592458 | C2 | 7/2016 |
| RU | 2595524 | C2 | 8/2016 |
| RU | 2630441 | C2 | 9/2017 |
| WO | WO-9515624 A1 * | | 6/1995 ......... H04B 10/1149 |
| WO | 0165749 | A1 | 9/2001 |
| WO | 0225842 | A2 | 3/2002 |
| WO | 2010113317 | A2 | 10/2010 |
| WO | 2014065882 | A1 | 5/2014 |
| WO | 2017042593 | A1 | 3/2017 |

OTHER PUBLICATIONS

ISA/RU, Written Opinion in International Application No. PCT/US2019/012989 dated Apr. 11, 2019.

WIPO; International Preliminary Report on Patentability for International Patent Application No. PCT/US2019/012989 dated Jul. 23, 2020, 6 pages.

EPO, Extended European Search Report in European U.S. Appl. No. 19/738,129 dated Dec. 16, 2020, pp. 1-7.

USPTO, Non-Final Rejection in U.S. Appl. No. 16/663,549 dated Sep. 16, 2020.

EPO; Communication pursuant to Article 94(3) EPC for European Patent Application No. 19738129.6 dated Jun. 17, 2022, 6 pages.

ISA/RU, International Search Report and Written Opinion in International application No. PCT/US2020/067619 dated Mar. 25, 2021.

EPO, Communication pursuant to Article 94(3) EPC for European Patent Application No. 19738129.6, dated Nov. 23, 2021, 8 pages.

Khalid, A.M. et al., "1-GB/s Transmission Over a Phosphorescent White LED by Using Rate-Adaptive Discrete Multitone Modulation", IEEE Photonics Journal, vol. 4, No. 5, Oct. 2012, 10 pages.

USPTO; Non-Final Office Action for U.S. Appl. No. 17/181,045 dated Mar. 31, 2022, 18 pages.

USPTO; Final Office Action for U.S. Appl. No. 17/181,045 dated Jun. 28, 2022, 10 pages.

EPO; Communication pursuant to Article 94(3) EPC for European Patent Application No. 19738129.6 dated Dec. 9, 2022, 4 pages.

EPO, Office Action in corresponding European Patent Application No. 19738129.6, mailed Jul. 18, 2023, 5 pages.

USPTO; Non-Final Office Action for U.S. Appl. No. 18/146,036 dated Jun. 8, 2023, 12 pages.

USPTO, Non-Final Office Action for corresponding U.S. Appl. No. 17/810,444 dated Jun. 21, 2024, 15 pages.

* cited by examiner

TABLE DIAGRAM
910

32 BIT WALSH (AKA WALSH-HADAMARD) CODE GENERATION:

2x2: $\begin{vmatrix} 1 & 1 \\ 1 & -1 \end{vmatrix}$   4 x 4: $\begin{vmatrix} 2x2 & 2x2 \\ 2x2 & -2x2 \end{vmatrix} = \begin{vmatrix} 1 & 1 & 1 & 1 \\ 1 & -1 & 1 & -1 \\ 1 & 1 & -1 & -1 \\ 1 & -1 & -1 & 1 \end{vmatrix}$

FIG. 9B

TABLE DIAGRAM
920

0s ON WIRAYS™ CHANNEL = 1 IN MATRIX, W(32) =

FIG. 9C

GRAPH 3600

METHODS, DEVICES, AND SYSTEMS FOR TIMING AND BANDWIDTH MANAGEMENT OF ULTRA-WIDEBAND, WIRELESS COMMUNICATION CHANNELS

PRIORITY CLAIM

This application is a continuation of U.S. patent application Ser. No. 18/146,036 entitled "METHODS, DEVICES, AND SYSTEMS FOR TIMING AND BANDWIDTH MANAGEMENT OF ULTRA-WIDEBAND, WIRELESS COMMUNICATION CHANNELS," which was filed on Dec. 23, 2022 and is being issued as U.S. Pat. No. 11,901,940 on Feb. 13, 2024, which is a continuation of U.S. patent application Ser. No. 17/181,045 entitled "METHODS, DEVICES, AND SYSTEMS FOR TIMING AND BANDWIDTH MANAGEMENT OF ULTRA-WIDEBAND, WIRELESS COMMUNICATION CHANNELS," which was filed on Feb. 22, 2021, issued as U.S. Pat. No. 11,539,433 on Dec. 27, 2022, which is a continuation of U.S. patent application Ser. No. 16/663,549 entitled "METHODS, DEVICES, AND SYSTEMS FOR TIMING AND BANDWIDTH MANAGEMENT OF ULTRA-WIDEBAND, WIRELESS COMMUNICATION CHANNELS," which was filed on Oct. 25, 2019, issued as U.S. Pat. No. 10,931,371 on Feb. 23, 2021, which is a continuation of PCT Patent Application No. PCT/US2019/012989 entitled "METHODS, DEVICES, AND SYSTEMS FOR TIMING AND BANDWIDTH MANAGEMENT OF ULTRA-WIDEBAND, WIRELESS COMMUNICATION CHANNELS," which was filed on Jan. 10, 2019, which claims benefit of and priority to U.S. Provisional Patent Application No. 62/615,858 entitled "METHODS, DEVICES, AND SYSTEMS FOR TIMING AND BANDWIDTH MANAGEMENT OF ULTRA-WIDEBAND, WIRELESS COMMUNICATION CHANNELS," which was filed on Jan. 10, 2018, the contents of which are all incorporated by reference herein.

TECHNICAL FIELD

Disclosed herein are methods, devices, and system for providing timing and bandwidth management of ultra-wideband, wireless data channels.

BACKGROUND

The ever-increasing consumer appetite for mobile multimedia content is driving the strong demand for smart phone and tablets based on 4G & 5G radio technology. Today's mobile devices equipped with high-resolution displays and cameras are capable of capturing a large amount of multimedia content that can be stored locally on the device. However, transferring and sharing of such content among devices requires short-range connectivity modems capable of delivering speeds of 20 gigabits per second (Gbps) or greater.

The dilemma for the mobile industry is that the capability of radio, wireless modems such as WiFi are not keeping up with the exponential growth of multi-media content on smart phones and tablets. In fact, without data compression, wired connectivity via cables is the only way to transport large amounts of data among devices or between the device and the cloud. While new generation WiFi standards (802.11ax, 802.11ad) are to increase network speed, these new standards are still inadequate to meet the throughput requirement of Ultra-High-Definition (HDMI2.0 or 4K, 20 Gbps) video content.

The data throughput of radio transceivers is inherently limited by the availability of commercial radio spectrum and their limited tuning range. For example, in IEEE802.11ac standard, the channel bandwidths are specified at either 80 MHz or 160 MHz in the 5 GHZ ISM band. With channel bonding, WiFi 802.11ac transceivers have been operated at speeds of 866 Mbps. A single user operating at such speeds will use up the entire bandwidth of the local network! The latest generation of 802.11ax utilizes Mu-MIMO feature (Multi-user, Multi-Input, Multi-Output) using smart antenna technology to focus dedicated radio beams on individual users thereby increasing total bandwidth through spatial diversity. Mu-MIMO is expected to deliver up to 1.7 Gbps using a 4×4 MIMO configuration. The IEEE802.11ad standard (WiGig™) takes advantage of higher spectrum availability in the 57-64 GHz band (V-band).

With about 7 GHz spectrum available, speeds of 5 Gbps have been demonstrated and potential speeds of 7 Gbps using multi-carrier OFDM modulation are being pursued. Millimeter-wave radio transceivers have significant complexity and costs associated therewith and suffer from multipath and other channel impairments in an indoor operation. Additionally, due to excessive atmospheric absorption at V-band, the range of 802.11ad WiFi modems is limited to 2-3 meters even with complex antenna beam forming feature.

While 802.11ad modems are available in the market, the industry is continuously looking for higher bandwidth wireless modems for next-generation devices. Some such devices and systems are disclosed in PCT application WO 2017/139317 titled ULTRA-WIDEBAND, WIRELESS OPTICAL HIGH SPEED COMMUNICATION DEVICES AND SYSTEMS, the contents of which are incorporated by reference herein. To support such ultra-wideband devices and their associated transmission channels, new methods, devices, and systems are needed for timing and bandwidth management.

SUMMARY

Disclosed herein are methods, devices, and systems for providing timing and bandwidth management of ultra-wideband, wireless data channels (including radio frequency and wireless optical data channels). According to one embodiment, a hub apparatus is disclosed for providing out-of-band bandwidth management for a free-space-optical (FSO) data channel associated with a first device. The hub apparatus includes a processor, a memory coupled with the processor, a FSO transmitter coupled with the processor, and a FSO receiver coupled with the processor.

In some embodiments, the FSO data channel may be configured to operate at a bit rate greater than 1 gigabit per second (Gbps). In other embodiments, the FSO data channel may be configured to operate at a bit rate greater than 20 Gbps. The FSO transmitter may be configured to transmit a control signal that includes timing information and bandwidth management information. The timing information may provide a timing accuracy better than 1000 picoseconds (ps). (For example, the timing accuracy may be 900 ps). In other embodiments, the timing accuracy may be better than 500 ps. In other embodiments, the timing accuracy may be better than 50 ps. In other embodiments, the timing accuracy may be better than 5 ps. The control signal may include a plurality of pulses wherein each pulse provides a portion of the timing information and a portion of the bandwidth assignment information. A rising edge or a falling edge of each pulse may provide the portion of timing information. In some embodiments, the portion of the bandwidth management information may be a data symbol and the data symbol may be a binary data symbol. The data symbol may also be a pulse width modulated symbol.

In some embodiments, the control signal may further comprise optical power level control information for the FSO data channel. The optical power level control information may be configured to reduce multipath interference associated with the FSO data channel. The control signal may also be configured to provide adaptive data rate control for the FSO data channel and the hub apparatus may be configured to estimate channel performance associated with the FSO data channel.

The first device may be configured to receive the control signal and transmit on the FSO data channel based on the timing information and the bandwidth management information. The FSO data channel may be a time division multiplexed (TDM) data channel including a plurality of time slots and the bandwidth management information may be formatted to assign at least one time slot to the first device for transmission.

In certain embodiments, the FSO transmitter may be configured to have an on-to-off-duty cycle of less than 2 percent. The FSO transmitter may include at least one non-coherent optical source (e.g. a light emitting diode). In other embodiments, the FSO transmitter may include at least one coherent optical source (e.g. a laser). In some embodiments, the FSO transmitter may be configured to operate at least partially within an infra-red spectrum. The FSO transmitter may also be configured to operate at least partially within at least one of a visible light spectrum, a deep infra-red spectrum, an ultra-violet spectrum, and a deep ultra-violet spectrum. In other embodiments, the FSO receiver may include an array of optical detectors.

In certain embodiments, the first device may be a smart watch, a smart phone, a tablet, a laptop, a personal computer, a digital camera, a digital camcorder, a computer monitor, a TV, a projector, a wireless access point, or an internet-of-things (IOT) device. In other embodiments, the first device may be an Unmanned Air System (UAS) or an automotive system. The first device may also be a virtual reality (VR) system and/or an augmented reality (AR) system.

In certain embodiments, the FSO data channel may provide transport for an uncompressed audio interface and/or an uncompressed video interface of the first device. The FSO data channel may provide transport for a high definition video interface of the first device. The high definition video interface may be a High-Definition Multimedia Interface (HDMI), a DisplayPort interface, or a Digital Visual Interface (DVI).

In other embodiments, the FSO data channel may provide transport for a high speed computer interface of the first device. The high speed computer interface may be a Peripheral Component Interconnect Express (PCI-Express) interface, a Universal Serial Bus (USB) interface, a Serial ATA (SATA) interface, or an Ethernet interface. The high speed computer interface may also be a gigabit interface converter (GBIC) interface port, a small form-factor pluggable (SFP) interface port and a 10 Gigabit Small Form Factor Pluggable (XFP) interface port.

According to another embodiment, a method is implemented on a hub apparatus for providing out-of-band timing and bandwidth management for a FSO data channel associated with a first device. The hub apparatus includes a processor, a memory coupled with the processor, a FSO transmitter coupled with the processor, and a FSO receiver coupled with the processor. The method includes transmitting a control signal comprising timing information and bandwidth management information. The timing information may provide a timing accuracy better than 1000 ps. In other embodiments, the timing accuracy may be better than 500 ps. In other embodiments, the timing accuracy may be better than 50 ps. In other embodiments, the timing accuracy may be better than 5 ps.

According to another embodiment, a first device is configured to receive out-of-band timing and bandwidth management for a FSO data channel, the first device includes a processor, a memory coupled with the processor, a first FSO transceiver coupled with the processor and configured to receive a control signal comprising timing information and bandwidth management information, and a second FSO transceiver coupled with the processor and configured to communicate with a second device using the FSO data channel. The timing information may provide a timing accuracy better than 1000 ps. In other embodiments, the timing accuracy may be better than 500 ps. In other embodiments, the timing accuracy may be better than 50 ps. In other embodiments, the timing accuracy may be better than 5 ps.

According to another embodiment, a hub apparatus is disclosed for providing out-of-band bandwidth management for a wireless data channel associated with a first device. The hub apparatus includes a processor, a memory coupled with the processor, a wireless transmitter coupled with the processor, and a wireless receiver coupled with the processor.

The wireless transmitter may be configured to transmit a control signal that includes timing information and bandwidth management information. The timing information may provide a timing accuracy better than 1000 ps. In other embodiments, the timing accuracy may be better than 500 ps. In other embodiments, the timing accuracy may be better than 50 ps. In other embodiments, the timing accuracy may be better than 5 ps. The control signal may include a plurality of pulses wherein each pulse provides a portion of the timing information and a portion of the bandwidth assignment information. A rising edge or a falling edge of each pulse may provide the portion of timing information. In some embodiments, the portion of the bandwidth management information may be a data symbol and the data symbol may be a binary data symbol. The data symbol may also be a pulse width modulated symbol.

The first device may be configured to receive the control signal and transmit on the wireless data channel based on the timing information and the bandwidth management information. The wireless data channel may be a time division multiplexed (TDM) data channel including a plurality of time slots and the bandwidth management information may be formatted to assign at least one time slot to the first device for transmission.

In certain embodiments, the wireless transmitter may be an FSO transmitter and the wireless receiver may be an FSO receiver. In other embodiments, the wireless transmitter may be a radio frequency (RF) transmitter and the wireless receiver may be an RF receiver. The wireless transmitter may be configured to have an on-to-off-duty cycle of less than 2 percent. The wireless transmitter may include at least one non-coherent optical source (e.g. a light emitting diode). In other embodiments, the wireless transmitter may include at least one coherent optical source (e.g. a laser). In some embodiments, the wireless transmitter may be configured to operate at least partially within an infra-red spectrum. The wireless transmitter may also be configured to operate at least partially within at least one of a visible light spectrum, a deep infra-red spectrum, an ultra-violet spectrum, and a deep ultra-violet spectrum. In other embodiments, the wireless receiver may include an array of optical detectors.

In certain embodiments, the first device may be a smart watch, a smart phone, a tablet, a laptop, a personal computer, a digital camera, a digital camcorder, a computer monitor, a TV, a projector, a wireless access point, or an internet-of-things (IOT) device. In other embodiments, the first device may be an Unmanned Air System (UAS) or an automotive system. The first device may also be a virtual reality (VR) system and/or an augmented reality (AR) system.

In certain embodiments, the wireless data channel may provide transport for an uncompressed audio interface and/or an uncompressed video interface of the first device. The wireless data channel may provide transport for a high definition video interface of the first device. The high definition video interface may be a High-Definition Multimedia Interface (HDMI), a DisplayPort interface, or a Digital Visual Interface (DVI).

In other embodiments, the wireless data channel may provide transport for a high speed computer interface of the first device. The high speed computer interface may be a Peripheral Component Interconnect Express (PCI-Express) interface, a Universal Serial Bus (USB) interface, a Serial ATA (SATA) interface, or an Ethernet interface. The high speed computer interface may also be a gigabit interface converter (GBIC) interface port, a small form-factor pluggable (SFP) interface port and a 10 Gigabit Small Form Factor Pluggable (XFP) interface port.

According to another embodiment, a method is implemented on a hub apparatus for providing out-of-band timing and bandwidth management for a wireless data channel associated with a first device. The hub apparatus includes a processor, a memory coupled with the processor, a wireless transmitter coupled with the processor, and a wireless receiver coupled with the processor. The method includes transmitting a control signal comprising timing information and bandwidth management information. The timing information may provide an accuracy of greater than 50 ps.

According to another embodiment, a first device is configured to receive out-of-band timing and bandwidth management for a wireless data channel, the first device includes a processor, a memory coupled with the processor, a first wireless transceiver coupled with the processor and configured to receive a control signal comprising timing information and bandwidth management information, and a second wireless transceiver coupled with the processor and configured to communicate with a second device using the wireless data channel. The timing information may provide an accuracy of greater than 50 ps.

BRIEF DESCRIPTION OF THE DRAWINGS

The present embodiments are illustrated by way of example and are not intended to be limited by the figures of the accompanying drawings. In the drawings:

FIG. 9B depicts a table illustrating 32 bit Walsh (aka Walsh-Hadamard) code generation according to an embodiment of the subject matter described herein.

FIG. 9C depicts a table illustrating a matrix according to an embodiment of the subject matter described herein.

DETAILED DESCRIPTION

Figure 1:
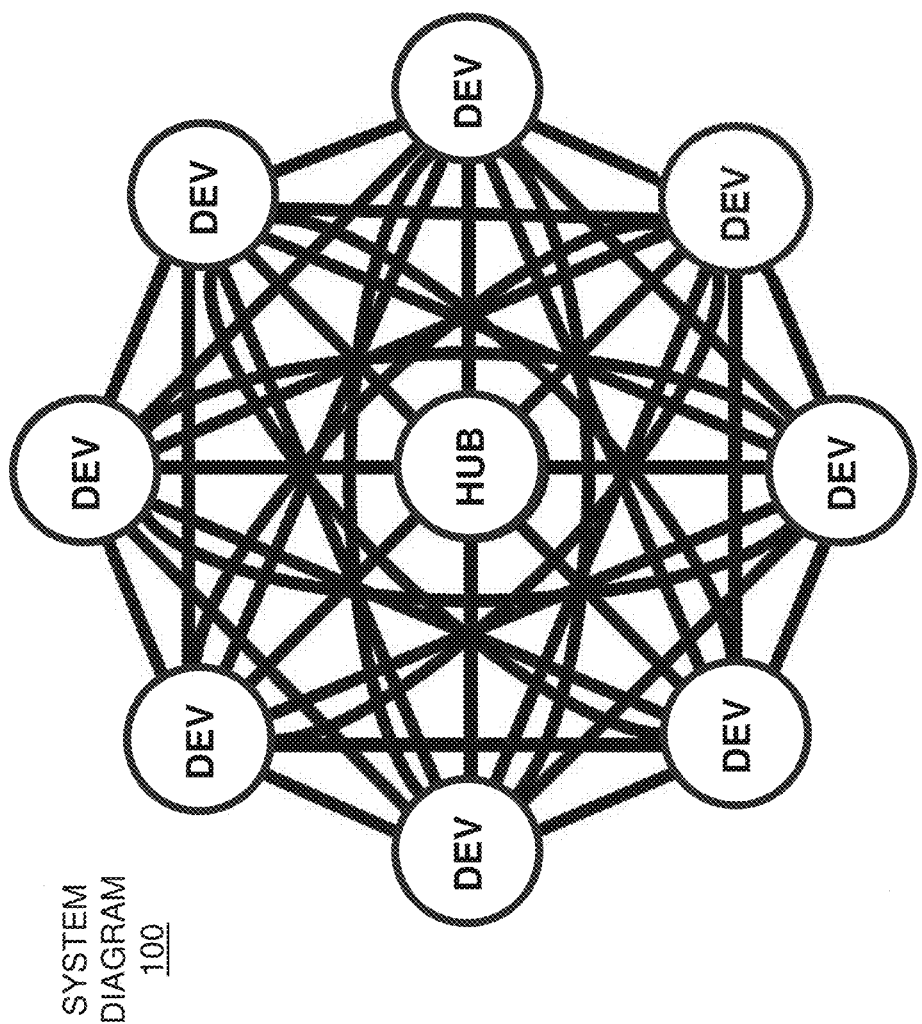
FIG. 1 depicts a system diagram illustrating the WiRays™ System including a HUB node (i.e. Hub apparatus) and multiple DEV nodes (i.e. FSO devices) according to an embodiment of the subject matter described herein.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

WiRays™ System.

Methods, devices, and systems are disclosed in the following paragraphs for providing timing and bandwidth management of ultra-wideband, wireless data channels (including radio frequency and wireless optical data channels). More specifically a WiRays™ System is described which provides timing and bandwidth management via a hub apparatus to a plurality of Free Space Optical (FSO) devices (i.e. wireless optical devices). The following specifics of the WiRays™ System will be described:

High level overview
Modulation and channels
   Signals including separate control and data channels
     Connections between a HUB node (i.e. Hub apparatus) and multiple DEV nodes (i.e. FSO devices)
   Timing information
     Clocking including a control channel as the clock distribution medium
     States of connections that follow the Infrared Link Access Protocol (IrLAP)
     Node identification for HUB and DEV nodes
     Transmission of data per channel type: control; and data
     Scheduling overview and scheduling of the control channel
     Scheduling of the data channel
Propagation
   Control channel multipath
   Data channel multipath
Use cases
   Startup scenarios
   Supported interfaces
   Applications
   Summarization of key features Overview FIG. 1 depicts a system diagram 100 illustrating the WiRays™ System including a HUB node (i.e. hub apparatus) and multiple DEV nodes (i.e. FSO devices) The HUB node provides timing and bandwidth management of ultra-wideband, wireless data channels associated with the DEV nodes. The HUB node and/or the DEV nodes may comprise one or more arrays of optical sources and/or optical detectors. Some such devices and systems are disclosed in U.S. Provisional Application No. 62/634,958; titled METHODS, DEVICES, AND SYSTEMS FOR INTEGRATION, BEAM FORMING AND STEERING OF ULTRA-WIDEBAND, WIRELESS OPTICAL COMMUNICATION DEVICES AND SYSTEMS, the contents of which are incorporated by reference herein.

The DEV nodes by FSO devices and the HUB node may provide timing and bandwidth management via FSO communication. Characteristics of the WiRays™ System include optical wireless (i.e. FSO) communication; very high data rates and low latency; and a hub-and-spoke network topology. The hub apparatus may be an access point to a higher level network such as Ethernet or the like. In some embodiments, the hub apparatus may stand alone. Range is 10 meter radius circle centered at the Hub. The HUB node is at the center. Nodes at the ends of the spokes are referred to as DEV nodes. FSO communication occurs between the HUB and the DEV spokes. Communication occurs between DEV nodes scheduled by the HUB. DEV nodes may be spaced at twice the 10 meter radius. Security through encryption is handled at a higher layer than the PHY.

Multiple WiRays™ networks connected at a higher layer as in, for example an Ethernet, are coordinated in terms of channel (wavelength) assignments at layers above the PHY. Management of the transmit power of the transmitters in the WiRays™ system is done so as to balance the need for strong primary rays to combat interference with the need to conserve power consumed by all nodes but especially mobile and battery powered DEV nodes.

Principles

The data rate shall be maximized while the latency is minimized. Achieving the highest data rates depends on low latency. WiRays™ use cases require minimum latency. The medium used for WiRays™ is light and use of light for related purposes is not limited by any authority. The bandwidth available in the optical spectrum is very large compared to what is available in the radio portion of the electromagnetic spectrum. Movement of nodes relative to one another is less than 5 meters per second. Scheduling of communications activities is separated from the transmission of data so that, once set up, data communications operate at maximum speed with little or no interruption.

Signals

Figure 2:
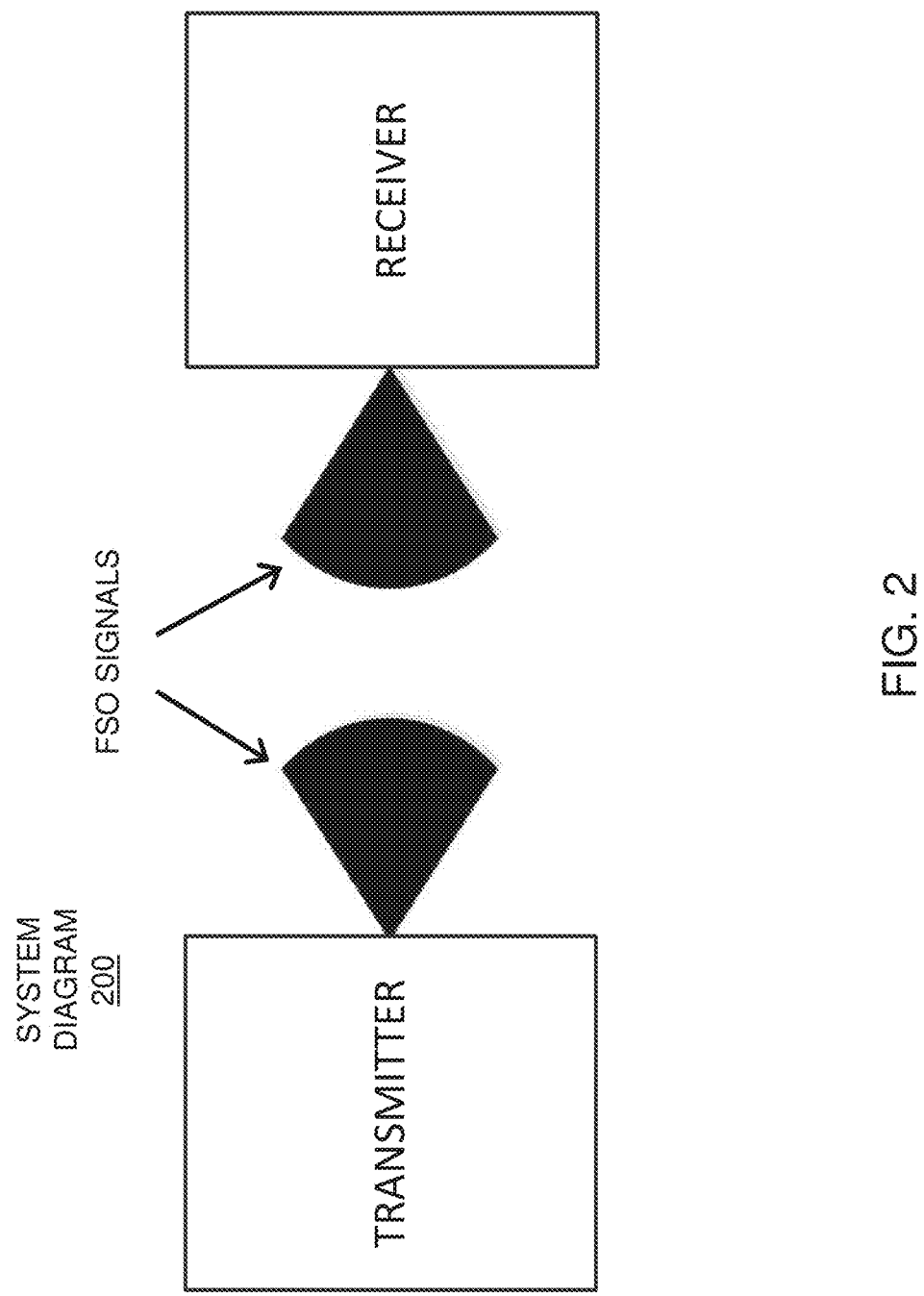
FIG. 2 depicts a system diagram illustrating an FSO communication link according to an embodiment of the subject matter described herein.

FIG. 2 depicts a system diagram 200 illustrating an FSO communication link. The FSO communication link may have 20 Gbps data bandwidth or greater utilizing wide-angle diffused non-coherent light and a non-negative signal. Multiple ray paths are possible from transmitter to receiver means that signals go around obstacles and causes inter-symbol interference (ISI). Modulation techniques may include one or more than one of the following:

On/Off Keying (OOK)
Pulse Width Modulation (PWM)
Pulse Position Modulation (PPM)
Pulse Interval Modulation (PIM)
Pulse Amplitude Modulation (PAM)

Provisions are included for multiplexing slower rate, multi-lane interfaces over the WiRays™ PHY using a convergence layer at the MAC level.

MIMO using multiple rays on the same wavelength spaced and oriented for diversity, multiple parallel rays on different wavelengths, and multiple rays arranged to cover 360° for mobility. Minimize probability of an unrecoverable collision of optical rays.

Strategy

The strategy in WiRays™ is to separate the communications into at least two channels: a "control" or "scheduling" channel and, at least one "data" channel. The control channel operates at higher power than the data channel and runs at a lower data rate and more robust modulation than the data channel. The receiver detects the occurrence of pulses when they happen with time resolution not exceeding 50 picoseconds.

The control channel handles interrupting events such as adding a node to the network, changing timing of signals and other control functions. The data channel is optimized to transport data at the full rate supported by the WiRays™ technology using a Serializer/Deserializer (SERDES) interface. The propagation properties of the scheduling channel (i.e. control channel) are similar enough to those of the data channel that it can be used to characterize the optical wireless channel so that the data channel throughput is optimized.

WiRays™ deals with collisions from multipath and multiple transmitters using the control channel to estimate the data channel. Multiple effects are possible from signal collisions or Inter-Symbol Interference (ISI) depending on the modulation used and the way that signals are scheduled in the system. WiRays™ scheduling is done on the separate control channel using PWM for linearity and ISI tolerance. WiRays™ uses scheduling strategies and limiting non-synchronized communications to avoid collisions. Once synchronized, communications are timed to avoid collisions.

The WiRays™ data channel uses On-Off-Keying (OOK) in order to achieve maximum data rates. The WiRays™ data channel may use Pulse Position Modulation (PPM), Pulse Width Modulation (PWM), Pulse Interval Modulation (PIM), and/or Pulse Amplitude Modulation (PAM) based on signal conditions.

WiRays™ supports multiple data channel transceivers that use different wavelengths of light in order to avoid interference between transmitters. WiRays™ includes control channel tracking to mitigate multipath on the data channel exploiting the commonalities between the two channels.

WiRays™ supports power level change to deal with multipath on both the control and data channels. There is a provision in the PHY definition for a fast power adjustment using a single bit, up/down control in a rapidly repeating control code on the WRASH channel for the WRASH and for each individual wavelength WRAD channel. WiRays™ also supports adaptive data rate and adaptive receiver bandwidth to effectively respond to channel conditions.

Connections

Multiple physical optical channels:

Single WiRAys Scheduling channel (WRASH) optimized for scheduling

10 MHz clock and scheduling and management information from HUB node to and from multiple end nodes.

Relatively higher power so that the WRASH can be established under relatively poor channel conditions.

Bidirectional, half-duplex.

Intermittent, sparse transmission on WRASH allows detection of timing of pulses for synchronization and for estimating multipath in the optical wireless channel Reverse direction used for DEV-to-HUB scheduling and management.

Data transmitted is received by the transmitting transceiver.

The HUB node transmits on the WRASH channel using the "WRASHdn" connection so-called because it is the downlink from HUB to DEV node. Each DEV node receives that transmission on their WRASHdn connection.

For the uplink, the DEV node transmitters and the HUB receiver use the WRASHup connection.

There is a single WRASH channel with all signals superimposed.

One or more WiRAys Data channels (WRAD) optimized for data

20 Gbps data between HUB and DEV nodes and between DEV nodes.

Multiple Data (WRAD) channels may have different wavelengths to avoid interference.

Bidirectional, half-duplex.

The reverse direction may be used for DEV-to-HUB scheduling and management communications when not busy. This can be used for fast reverse channel information, as needed Data transmitted is received by the transmitting transceiver.

The HUB node transmits on a WRAD channel using the "WRADdn" connection so-called because it is the downlink from HUB to DEV node. Each DEV node receives that transmission on their WRADdn connection.

For the uplink, the DEV node transmitters and the HUB receiver use the WRADup connection.

When there are multiple WRAD channels, they are distinguished by an index number in brackets [ ] such as WRADdn[0]

There is one WRAD channel per wavelength with all signals combined.

Figure 3:
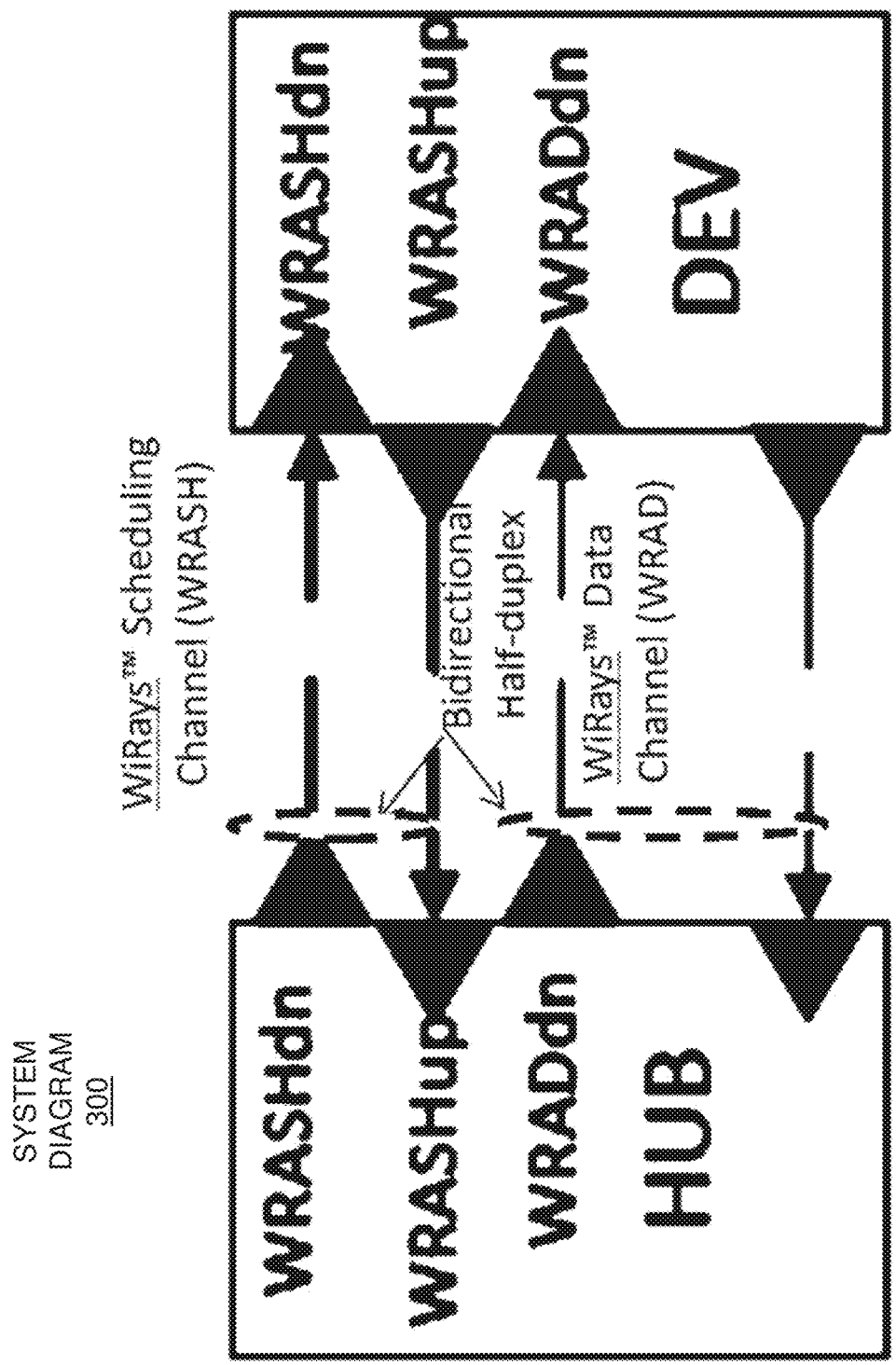
FIG. 3 depicts a system diagram illustrating a Basic Single Channel Point-to-point (SCP2P) WiRays™ Configuration according to an embodiment of the subject matter described herein.

FIG. 3 depicts a system diagram 300 illustrating a Basic Single Channel Point-to-point (SCP2P) WiRays™ configuration.

Figure 4:
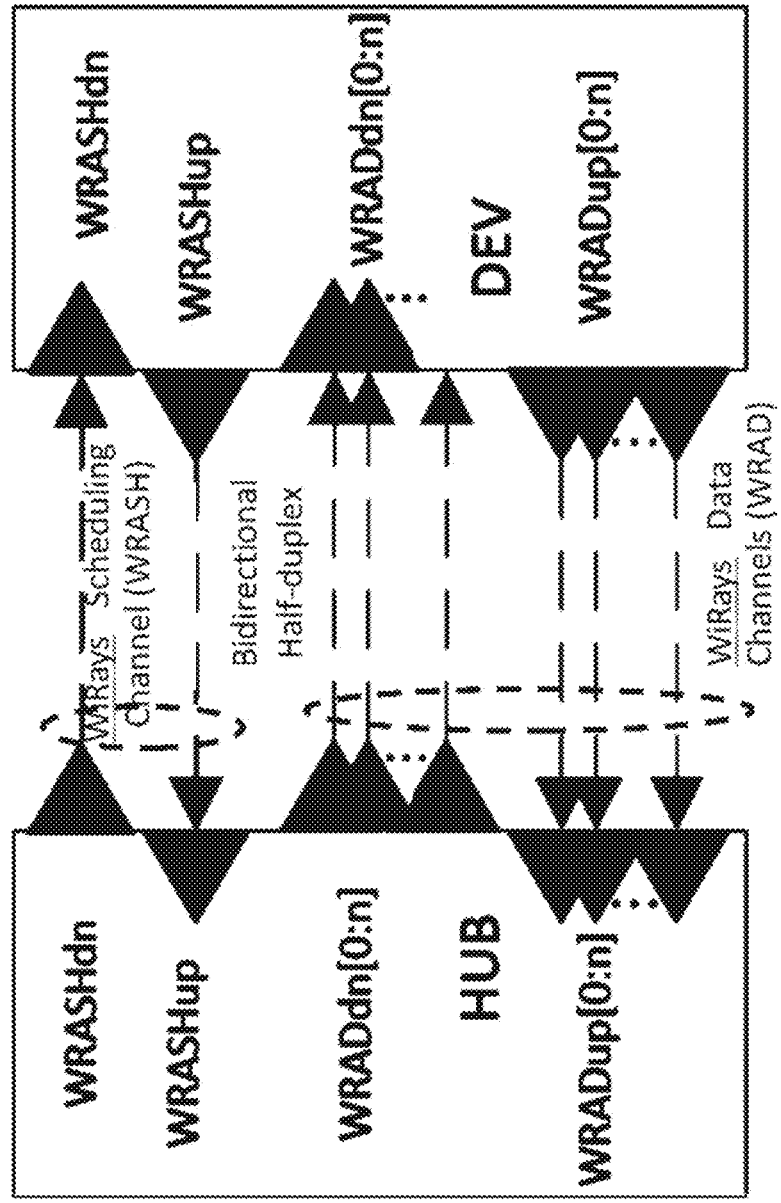
FIG. 4 depicts a system diagram illustrating a Multichannel WRAD Point-to-point (MCP2P) WiRays™ configuration according to an embodiment of the subject matter described herein.

FIG. 4 depicts a system diagram 400 illustrating a Multichannel WRAD Point-to-point (MCP2P) WiRays™ Configuration.

Figure 5:
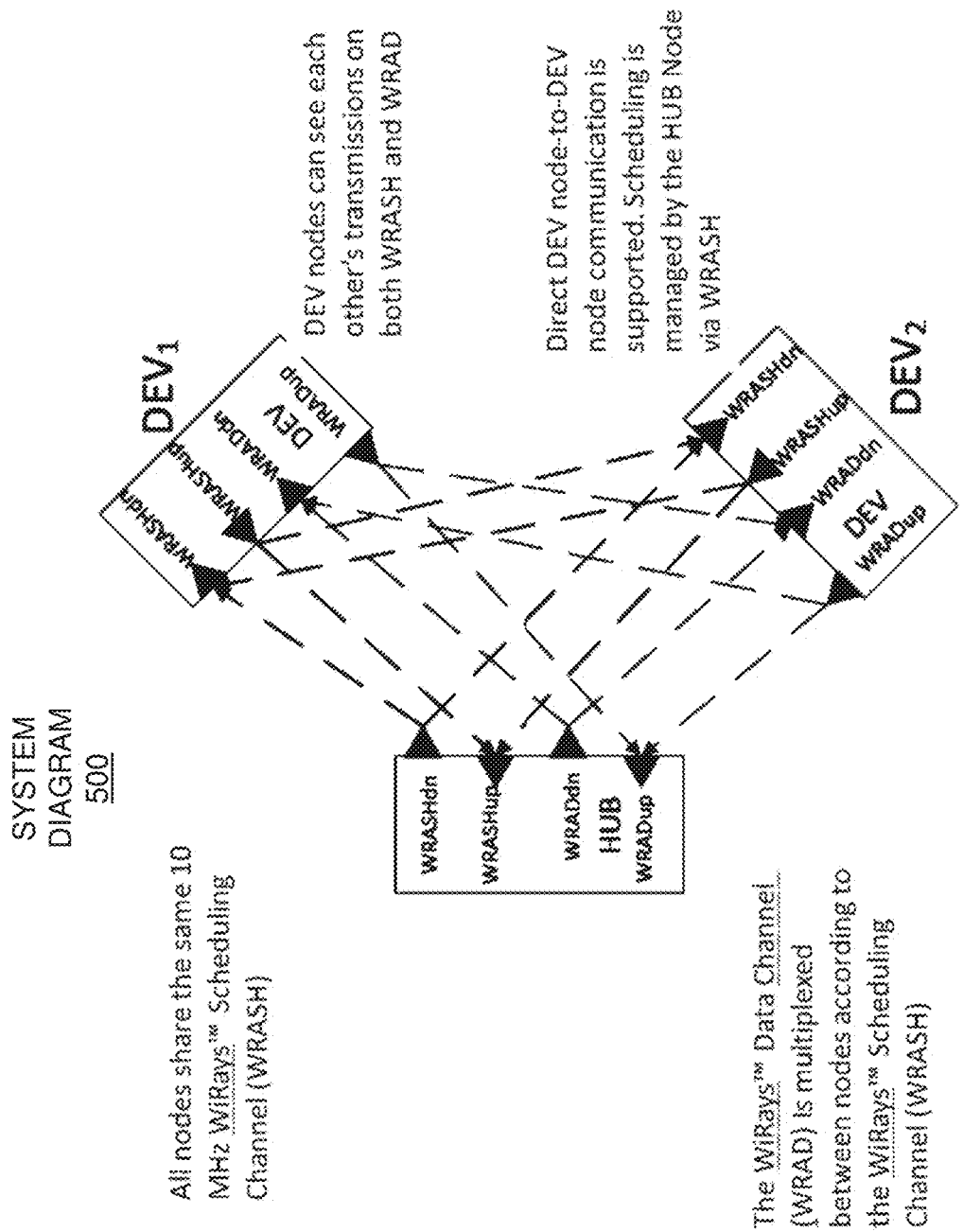
FIG. 5 depicts a system diagram illustrating a Single Channel Point-to-multipoint (SCP2MP) WiRays™ configuration according to an embodiment of the subject matter described herein.

FIG. 5 depicts a system diagram 500 illustrating a Single Channel Point-to-multipoint (SCP2MP) WiRays™.

All nodes share the same 10 MHz WiRays™ Scheduling Channel (WRASH)

DEV nodes can see each other's transmissions on both WRASH and WRAD

Direct DEV node-to-DEV node communication is supported. Scheduling is managed by the HUB Node via WRASH The WiRays™ Data Channel (WRAD) Is multiplexed between nodes according to the WiRays™ Scheduling Channel (WRASH)

Figure 6:
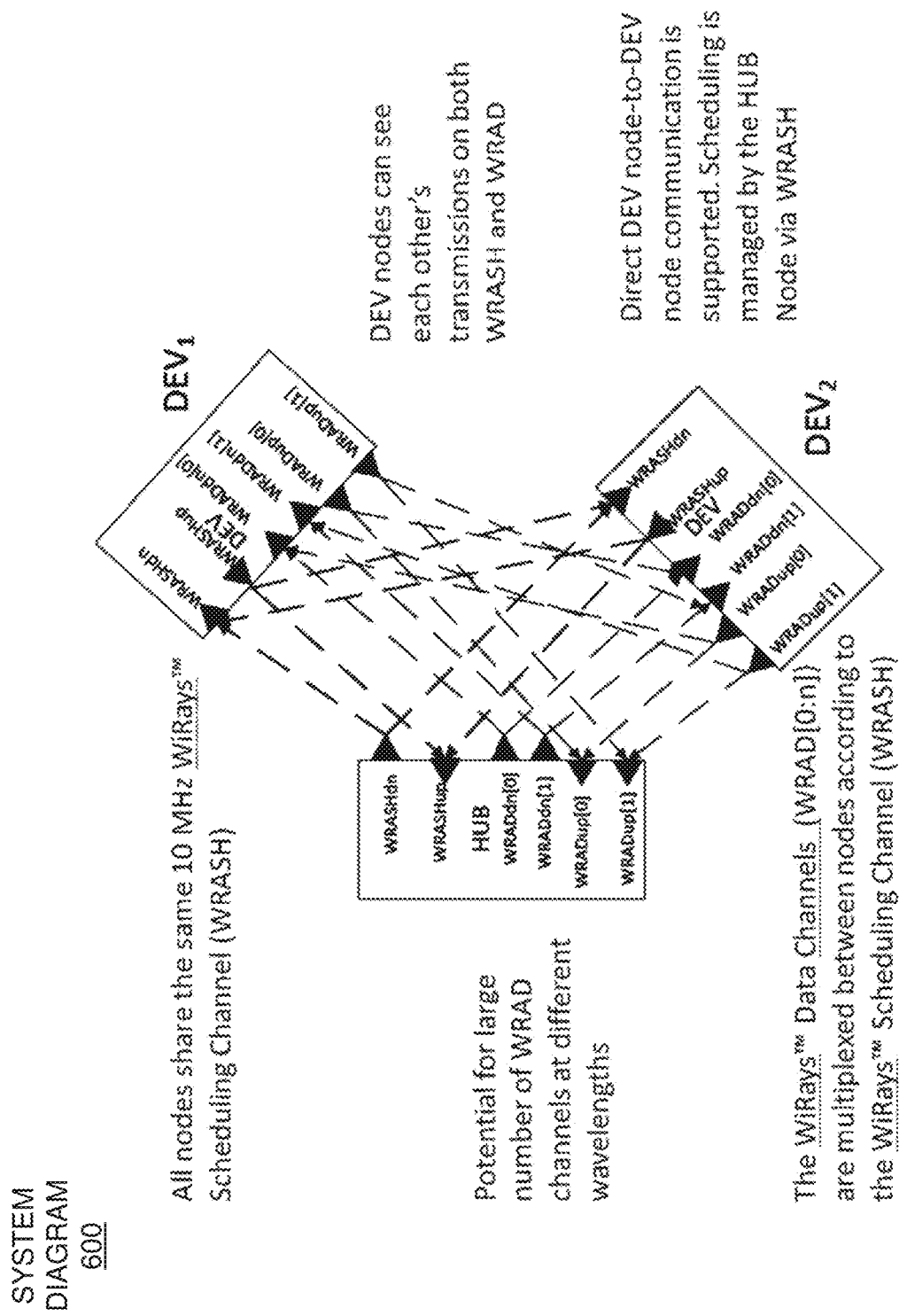
FIG. 6 depicts a system diagram illustrating a Multichannel P2MP (MCP2MP) WiRays™ configuration according to an embodiment of the subject matter described herein.

FIG. 6 depicts a system diagram 100 illustrating a Multichannel P2MP (MCP2MP) WiRays™ configuration.

All nodes share the same 10 MHz WiRays™ Scheduling Channel (WRASH)

Potential for large number of WRAD channels at different wavelengths

The WiRays™ Data Channels (WRAD[0:n]) are multiplexed between nodes according to the WiRays™ Scheduling Channel (WRASH)

DEV nodes can see each other's transmissions on both WRASH and WRAD

Figure 7:
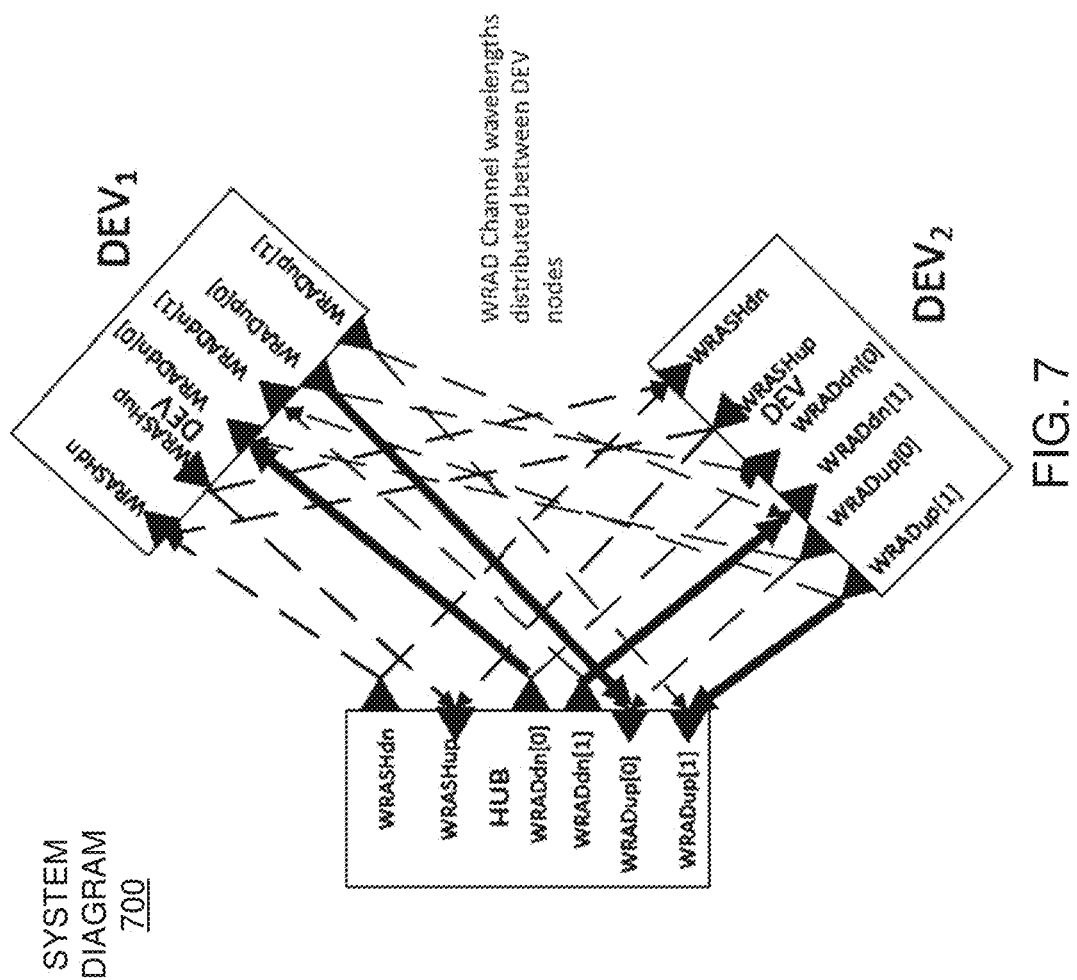
FIG. 7 depicts a system diagram illustrating a P2MP, multichannel (MCP2MP) WiRays™ configuration according to an embodiment of the subject matter described herein.

Direct DEV node-to-DEV node communication is supported. Scheduling is managed by the HUB Node via WRASH Practical Scenarios FIG. 7 depicts a system diagram 700 illustrating a P2MP, multichannel (MCP2MP) WiRays™ configuration.

WRAD Channel wavelengths distributed between DEV nodes

A practical MCP2MP case is where the HUB node communicates with multiple DEV nodes each on a separate channel. In this example, $DEV_1$ uses WRADdn/up[0] while $DEV_2$ uses WRADdn/up[1].

Figure 8:
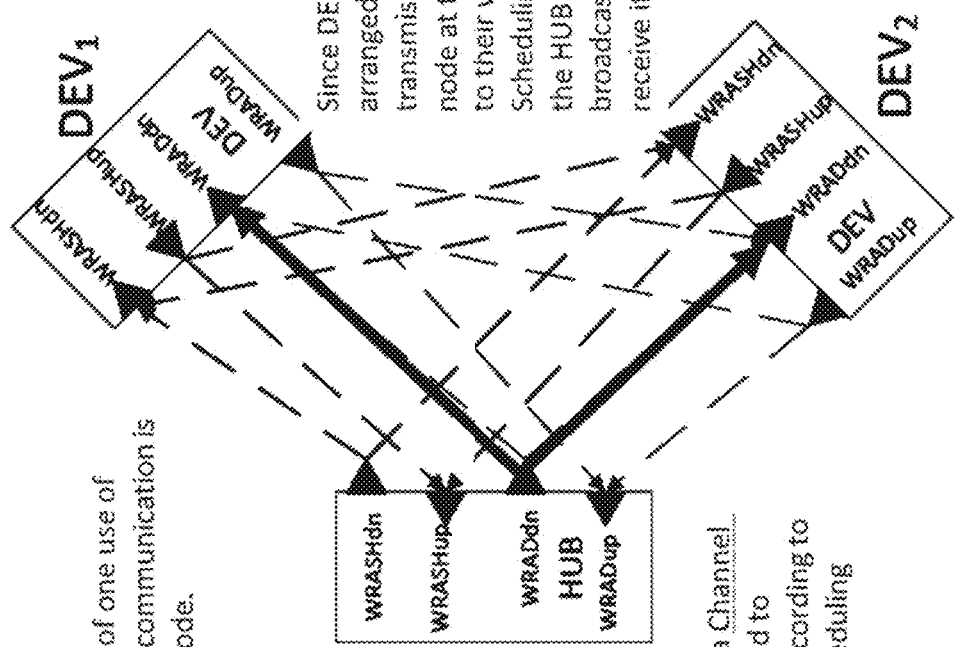
FIG. 8 depicts a system diagram illustrating a Single Channel Broadcast (SCP2BC) WiRays™ configuration according to an embodiment of the subject matter described herein.

FIG. 8 depicts a system diagram 800 illustrating a Single Channel Broadcast (SCP2BC) WiRays™ configuration.

A practical example of one use of point-to-multipoint communication is for a "broadcast" mode Since DEV node frames are arranged so that they receive transmissions from the HUB node at the same time relative to their view of the frame (see Scheduling description, below), the HUB sends one copy of the broadcast message and all receive it correctly. The WiRays™ Data Channel (WRAD) is assigned to multiple nodes according to the WiRays™ Scheduling Channel (WRASH).

Timing

Clocking

Each DEV node's clock phase is synchronized to the HUB node clock via the 10 MHz Reference Clock sent on the WRASH channel. The 10 MHz clock is derived from a 100 MHz clock used by each end of the connection. Table shows the clock phase noise and jitter requirements.

TABLE 1

| Description | Condition | Min | Typ | Max | Unit |
|---|---|---|---|---|---|
| Transmitter REFCLK Phase Noise (622 MHz) | 100 Hz | — | — | −70 | dBc/Hz |
| | 1 kHz | — | — | −90 | dBc/Hz |
| | 10 kHz | — | — | −100 | dBc/Hz |
| | 100 kHz | — | — | −110 | dBc/Hz |
| | ≥1 MHz | — | — | −120 | dBc/Hz |
| Transmitter REFCLK Phase Jitter (100 MHz) | 1.5 MHz to 100 MHz | — | — | 4.2 | Ps (rms) |

States

Figure 9A:
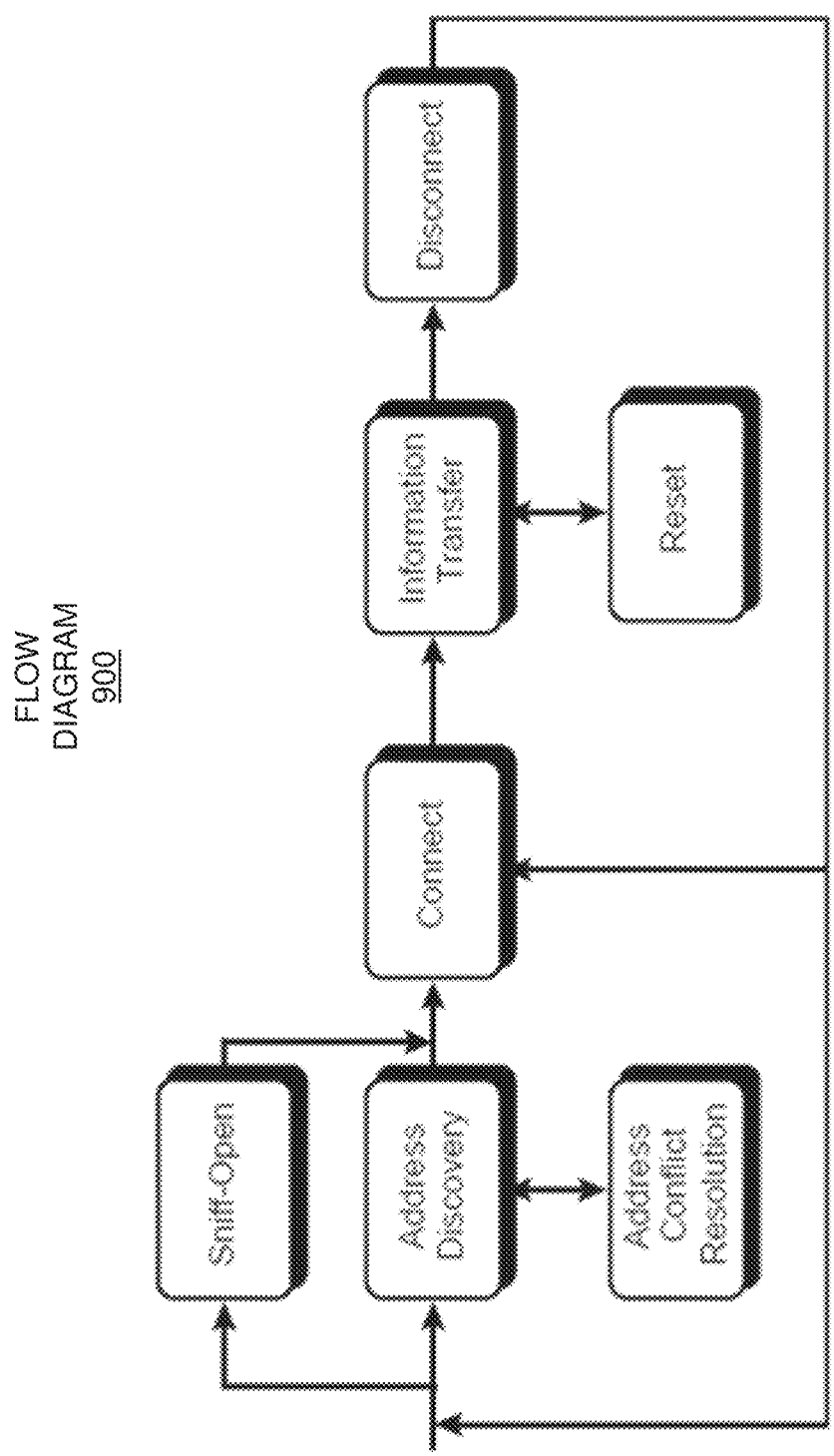
FIG. 9A depicts a flow diagram illustrating states of the PHY according to an embodiment of the subject matter described herein.

FIG. 9A depicts a flow diagram 900 illustrating states of the PHY. Discovery and connect includes a 10 MHz forward scheduling channel for timing and an HDLC-based IRLap Device Discovery and Address Resolution process. For information transfer, data is communicated over the bidirectional 20/40 Gbps WiRays™ optical physical data channel. The PHY tracks timing as nodes move location. For disconnect, connection to a node is terminated when the error rate exceeds a set limit or when the data rate falls below a set limit for a set time. The state of the connection is reset to Discovery and Connect. For reset, connection to a node is reset when the error rate exceeds a set limit or when the data rate falls below a set limit for a set time. Reset involves re-establishing timing as would occur with a Disconnect and Connect sequence.

Node Identification

As described above, the HUB node identifies itself by periodically transmitting the sync code (0xFE6B2840), a known value that is recognized across the network. The HUB node never transmits this code except as the sync code. In addition, the HUB node has a unique "System ID" or SID that distinguishes it from the HUB node for other networks. DEV nodes may connect to any HUB node that is within range or may select a HUB node according to SID. The DEV nodes are identified by unique codes that are represented in the physical layer as orthogonal codes such as Walsh codes.

Network nodes that can access and/or be accessed from a network like Ethernet, must be addressable using a "Medium Access Control" or MAC address. Such network-oriented identifications are translated to an orthogonal code for the purpose of distinguishing one DEV node from another at the physical layer. Optionally, DEV node identifiers can be assigned, statically, by setting the DEV node ID value via a configuration step. DEV nodes are characterized by a "DEVTYPE" field that describes the capabilities of the DEV node in terms of number of channels with separate wavelengths that are supported, power control capabilities, and others.

Walsh codes are selected to be used for DEVIDs because (1) they can be identified as being a Walsh code and, therefore, an identifier of a DEV node which is useful for monitoring the availability of the WRASH channel during initial synchronization; and (2) They provide some degree of error protection since there is a very large Hamming distance between the codes.

Figure 9C:
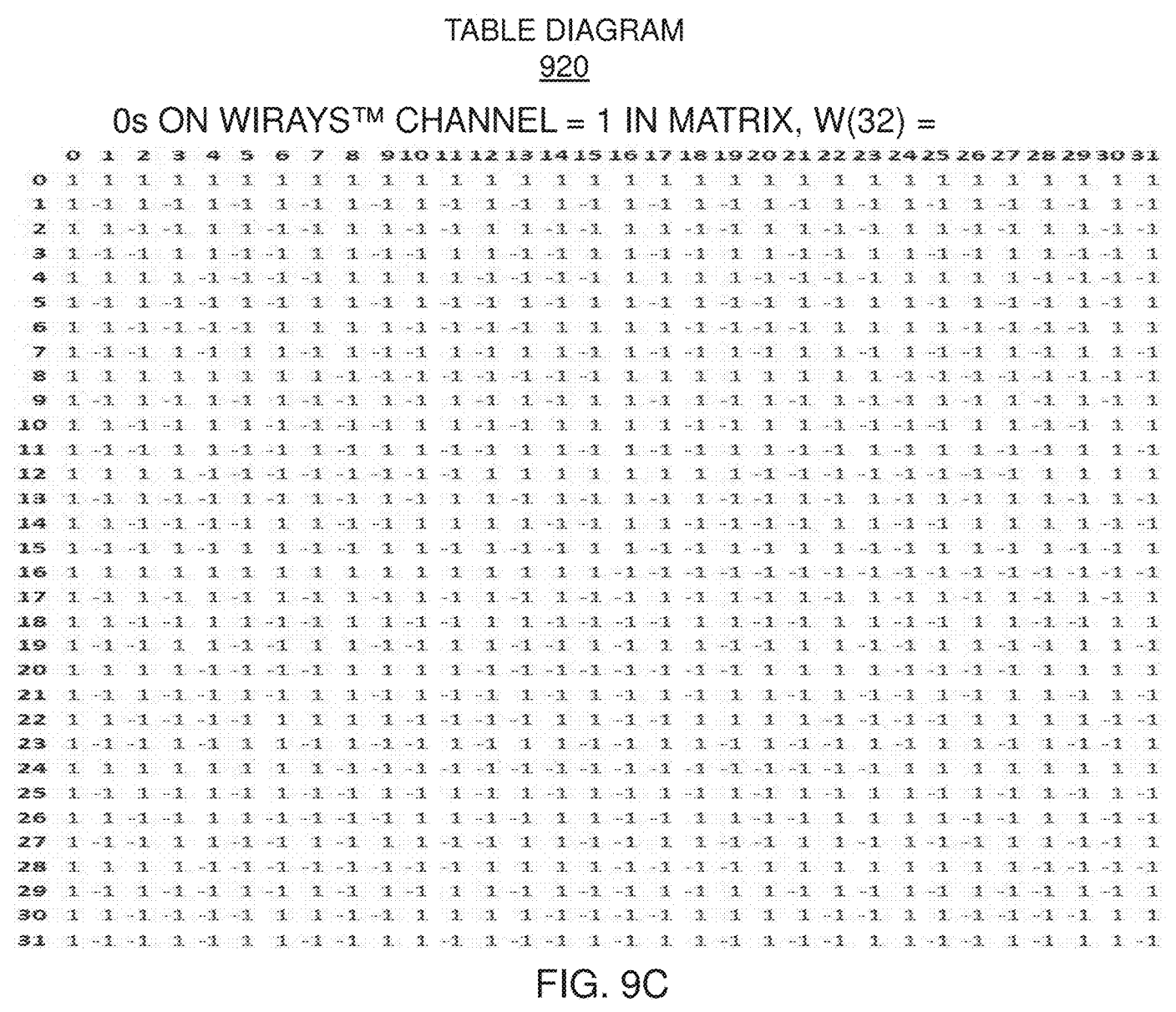

There are 31 Walsh codes available. Walsh code 0, all 0s, is not used. DEV nodes shall not send any bit strings on the WRASH channel that are the same as any 32 bit Walsh code. The following shows how a 32 bit Walsh code is generated. The basic 2×2 array is arranged as shown to produce 4×4, 8×8, 16×16 and 32×32 matrices. Each row of the matrix is a Walsh code. The representation in the example is "Non-Return to Zero" (NRZ) where a 1 is replaced by a −1 and a 0 is replaced by a 1, as noted. See FIG. 9B illustrating table diagram 910 and FIG. 9C illustrating table diagram 920.

To match a received bit pattern to find what Walsh code it represents:

For each row in the matrix:
  Compute the dot product of the received pattern with the Walsh code for that row: multiply bit by bit and sum all products.
Find the row in Walsh codes that gives maximum dot product.
The row with the maximum sum is the decoded code.
The dot product of a row with itself is =32.
All dot products of $W(x,32)$ with $W(y,32)$, $y< >x=0$.
In the presence of errors, the dot product yields <32.
Still choose maximum.

Transmission

WiRays™ achieves maximum data rate with minimum latency by separating scheduling messages from data transmission. Data rate and latency are optimized when the flow of data is uninterrupted. Taking the intermittent scheduling functions out of the primary data flow removes interruptions. The WiRays™ system design optimizes scheduling by (1) Using the 10 MHz Reference Clock signal also as a scheduling message stream by encoding 0s and 1s using pulse width modulation onto the clock pulses (see Scheduling, below); (2) Interleaving message streams between the HUB node and multiple DEV nodes on the WRASH channel during Discovery and Connect; (3) Applying a Carrier Sense Multiple Access/Collision Avoidance (CSMA/CA) approach to Discovery and Connect (i.e. collisions are avoided through scheduling and the logic of the protocol); (4) Using the reverse WRASH channel for Discovery and Connect interactions and other DEV-to-HUB messages; (5) using the reverse WRAD channel when data communications are not active for DEV-to-HUB messages other than Discovery and Connect; and (6) interacting with unsynchronized DEV nodes one at a time, subject to potential collisions, until they are synchronized and, then, using a time-division approach to interactions once they are.

The WiRays™ system design optimizes data transmission by (1) distinguishing "asynchronous" data that must be received correctly and completely using retransmission, if necessary, from what is termed "isochronous" data that must be received in a time-accurate manner, such that retransmission is not possible; (2) Splitting multiple, independent data streams into separate and non-interfering physical channels, if possible; (3) Adjusting power levels to minimize errors and dynamically so that different power is transmitted to different DEV nodes. (4) Packing the transmission medium with data consistent with being able to track any timing changes that may occur due to changes the channel or changes in distance between transmitter and receiver; and (5) Using all available information to deal with channel impairments that can cause errors that may require retransmission of asynchronous data or incorrect results with isochronous data.

Scheduling—Overview and Control Channel

Figure 10:
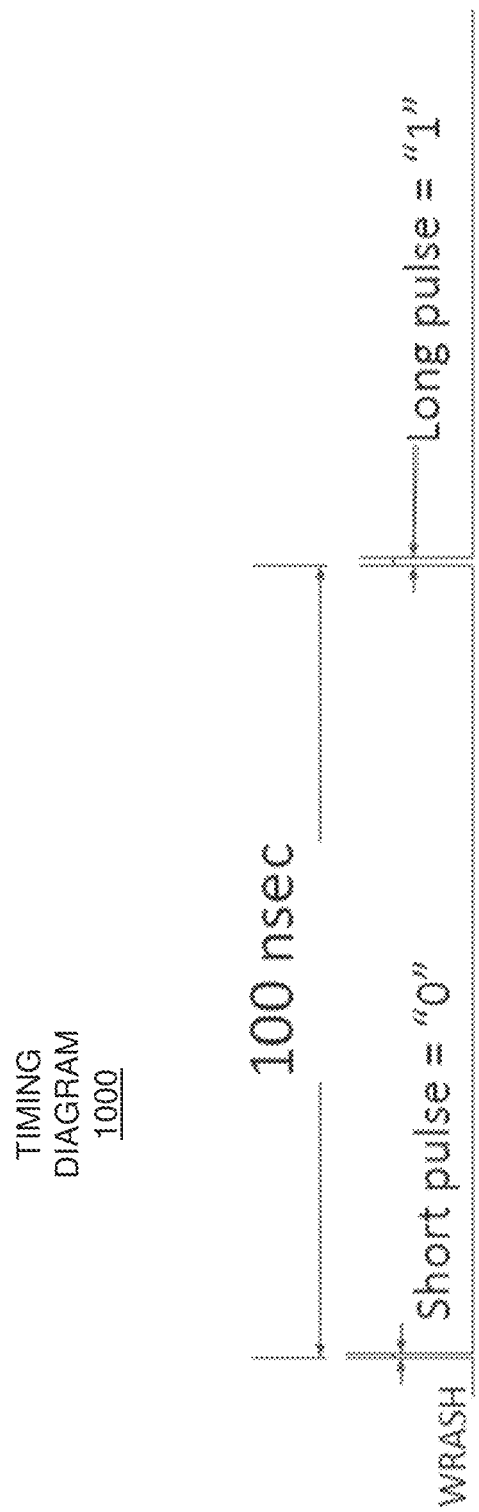
FIG. 10 depicts a timing diagram illustrating scheduling according to an embodiment of the subject matter described herein.

FIG. 10 depicts a timing diagram 1000 illustrating scheduling. Scheduling is based on the Reference Clock that is sent on the WRASH by the HUB node to all DEV nodes. It is assumed that the HUB and DEV nodes use that clock to generate the reference clock for 20 Gbps transmissions and receptions.

Figure 11:
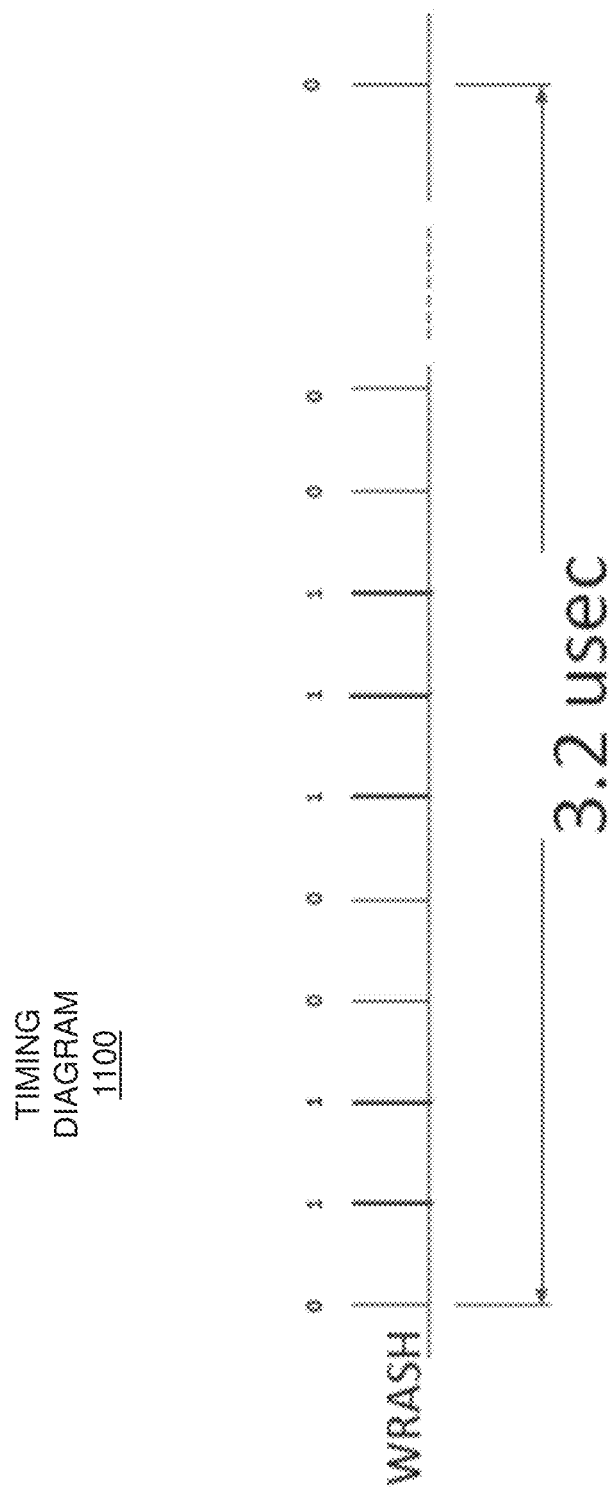
FIG. 11 depicts a timing diagram illustrating scheduling according to an embodiment of the subject matter described herein.

FIG. 11 depicts a timing diagram 1100 illustrating scheduling. In addition to being a clock pulse, the WRASH pulse train is pulse-width modulated with either a "0" indicated by a short pulse or a "1" indicated by a long pulse. Each pulse is individually modulated as necessary to create a desired bit sequence over 32 successive 100 nsec pulse periods. The WRASH pulse train is organized into, for example, 32 bits.

One such code is the synchronization code. It is a code word that has very poor autocorrelation when not aligned in time. This code is sent by the HUB node on the WRASH channel frequently. It is used by DEV nodes to find the frame boundaries on the WRASH channel.

Along with the synchronization code, the HUB node sends other information as multi-bit codes or sequences of such multi-bit codes on the WRASH channel. The DEV nodes use the WRASH channel to communicate to the HUB node and to estimate timing to other DEV nodes. WiRays™ nodes detect pulses on the WRASH channel by detecting the rising edge or onset of the pulse.

Multiple bits are always sent on the WRASH channel as, for example, 32 bit sequences and evaluated as a unit or Information Element. In that way, timing can be determined as the average time of pulse timing over all, for example, 32 bit times.

The HUB node monitors transmissions from DEV nodes to determine "time-of-flight" (TOF) of signals from the DEV node to the HUB node. This is done by knowing that the DEV node times an uplink (DEV-to-HUB) signal that it sends on WRASHup at a fixed delay from receipt of the Reference Clock signal from the HUB node. The TOF is ½× (round-trip delay—fixed RX-TX interval in the DEV node).

The HUB node uses the TOF measurement to establish scheduling on both the WRASH and WRAD channel(s) individually for each DEV node. The HUB node tracks TOF per DEV node as changes occur due to movement of DEV nodes relative to the HUB node.

Physical Layer Scheduling—Time-of-Flight

Figure 12:
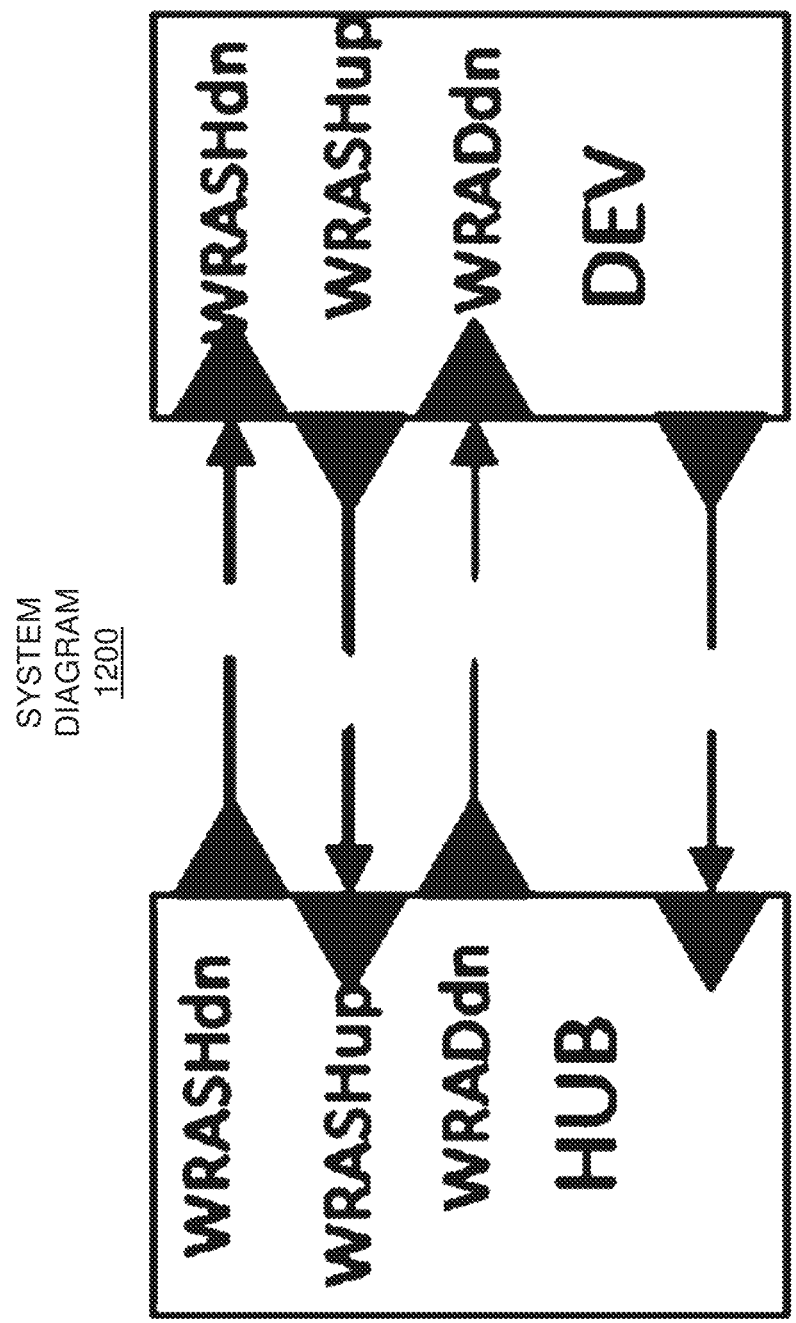
FIG. 12 depicts a system diagram illustrating time of flight considerations on forward scheduling channel according to an embodiment of the subject matter described herein.
Figure 13:
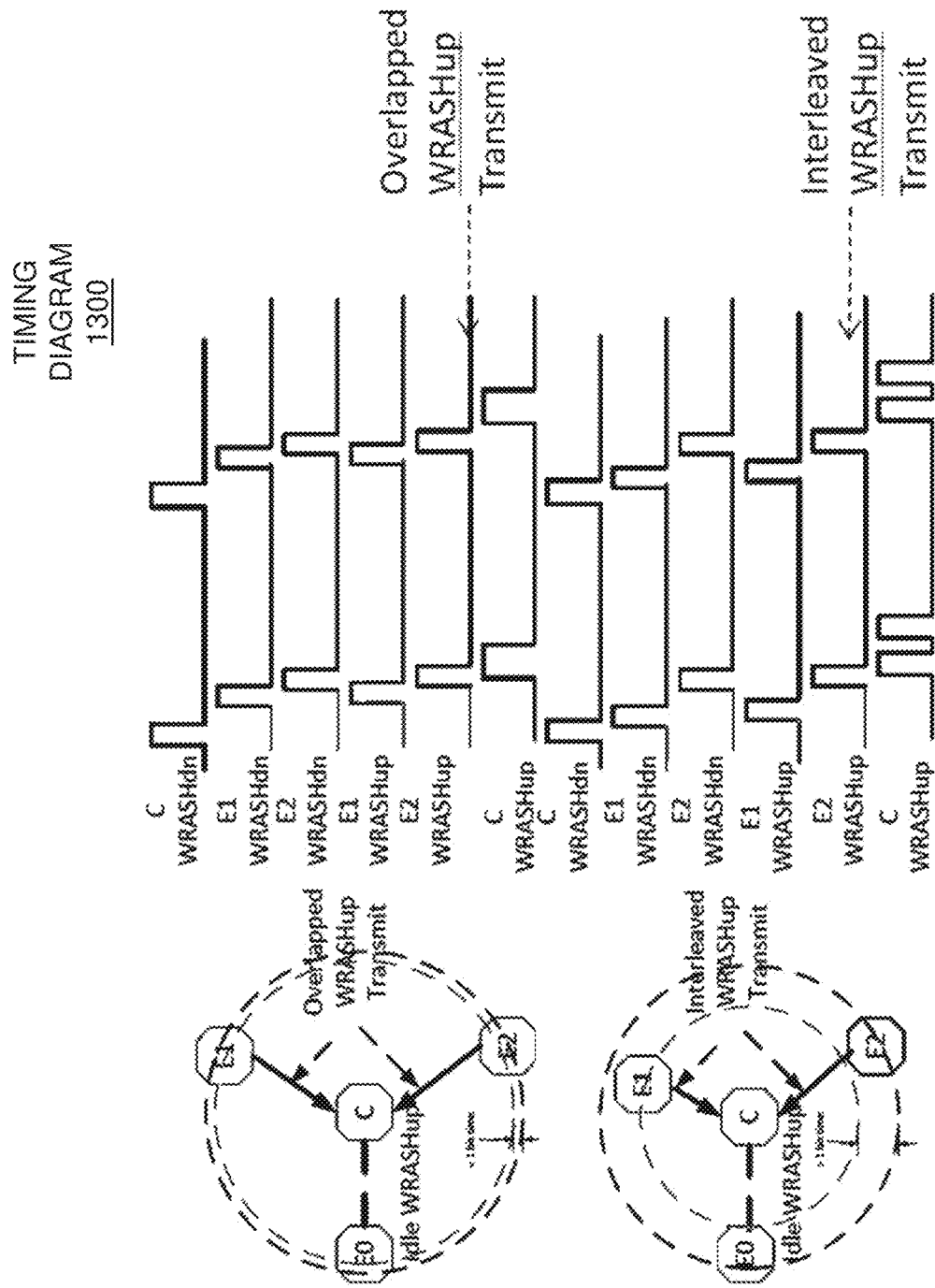
FIG. 13 depicts a timing diagram illustrating time of flight issues according to an embodiment of the subject matter described herein.

FIG. 12 depicts a system diagram 1200 illustrating time of flight considerations on forward scheduling channel. Time of flight causes overlapped or interleaved pulses on WRASH when 2 DEV nodes (E1, E2) transmit signals that arrive at the HUB node (C) at times that are close to within a pulse width. FIG. 13 depicts a timing diagram 1300 illustrating time of flight issues.

Figure 14:
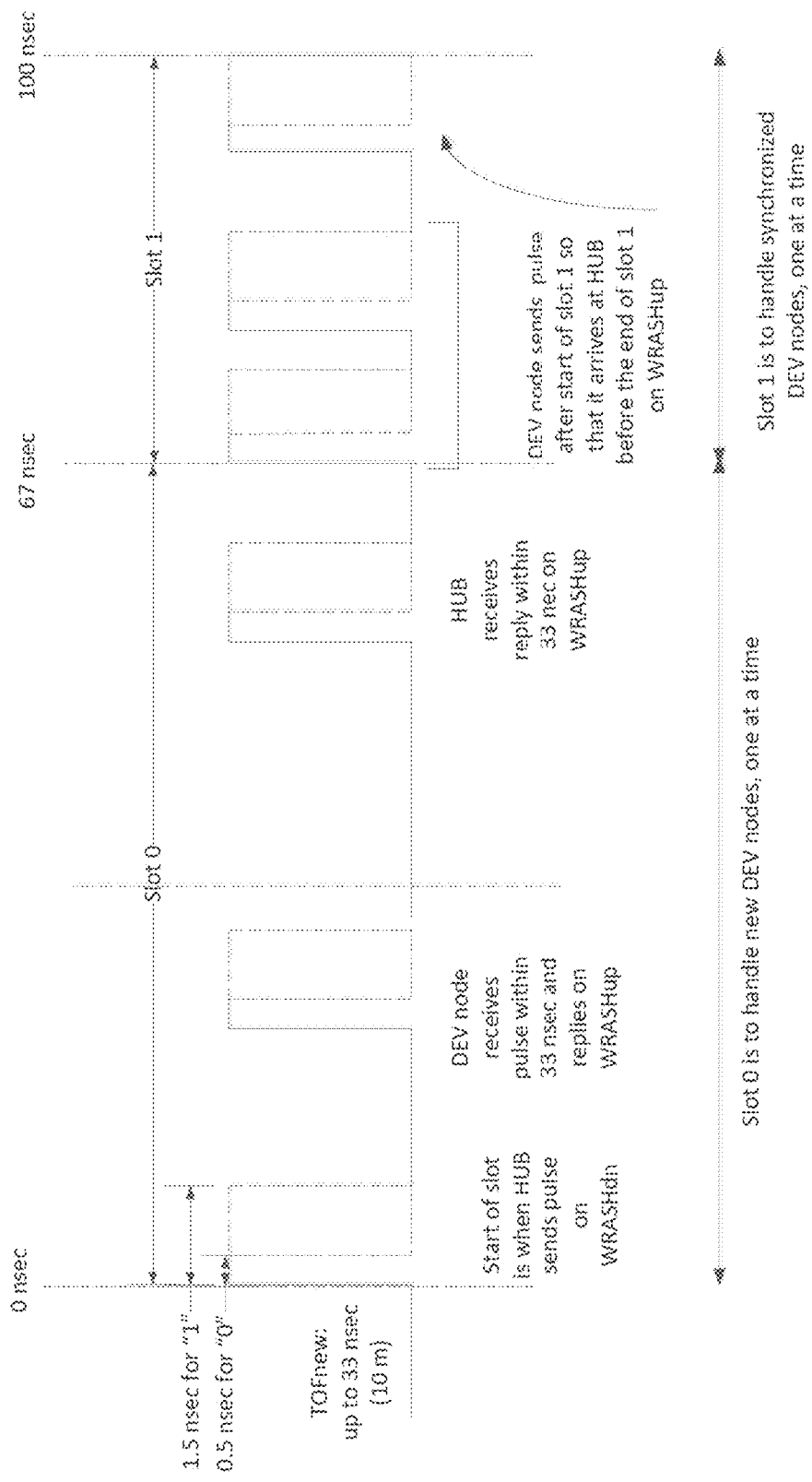
FIG. 14 depicts a timing diagram illustrating pulse trains from a device node to a hub apparatus according to an embodiment of the subject matter described herein.

FIG. 14 depicts a timing diagram 1400 illustrating pulse trains from DEV-to-HUB. This exchange of pulse trains from DEV-to-HUB is done in such a way as to avoid collisions. Note that slot 0 and slot 1 are times within a specific 100 nsec clock interval but transmissions (and receptions) occur over multiple, for example 32, intervals and possibly multiple sets of such intervals such that a pulse train is received and contains a DEVID so that one pulse train can be distinguished from others. Each pulse in the pulse train is transmitted at the same time within its respective 100 nsec interval so that timing can be gauged. The approach taken involves two "slots":

Slot 0 is used for transmissions from DEV to HUB before a DEV node is synchronized. Transmissions happen somewhat independent of any scheduling except to the extent that the DEV node that is attempting to connect to the network uses the time of arrival of the WRASH pulse from the HUB to determine when to transmit.

Slot 1 is used for transmissions from DEV nodes that are synchronized based on their known Times-Of-Flight. Once synchronized, the DEV nodes have a specific time that they transmit such that their transmission arrives at the HUB within slot 1. DEV nodes share the slot 1 and avoid collisions by waiting to transmit until polled by the HUB node.

Slot 0 is 67 nsec=the maximum round-trip delay from HUB to DEV and DEV back to HUB during sync acquisition. Slot 1 is 33 nsec, occupying the remainder of the 100 nsec WRASH clock interval.

Slot 0:

Slot 0 is 67 nsec wide since it is possible that the TOF for a DEV node is up to 33 nsec (10 meters). The start of the slot is the absolute time at which the HUB node sends the clock pulse on WRASHdn. 67 nsec allows for the maximum round-trip from HUB to DEV node and back within the slot 0 time.

Only one DEV node may communicate within slot 0 of any particular 100 nsec clock interval without chance of collisions. If more than one does, there is a potential for a collision. If a collision occurs when more than one DEV node attempts to transmit in a particular slot 0, it is possible that the HUB will fail to detect a valid DEVID and will simply ignore the transmission. That will result in a timeout and retry on the part of all the DEV nodes in question.

If a collision does not occur when more than one DEV node attempts to transmit in a given slot 0, the HUB will accept the first one successfully received. The other will timeout and retry.

Slot 1 occupies the remainder of the 100 nsec interval and is used by synchronized DEV nodes to transmit messages to the HUB node. It is also used by only one synchronized DEV node to transmit in a given 100 nsec interval. DEV nodes wait until polled by the HUB before transmitting in slot 1 thus avoiding collisions.

DEV nodes use slot 1 such that they initiate their transmission before the absolute time of the start of slot 1 at the HUB node. This is to ensure that a new DEV node that is monitoring the WRASH channel doesn't mistake a synchronized node's transmission as a busy condition on the WRASH channel.

DEV-DEV TOF Measurement

Figure 15:
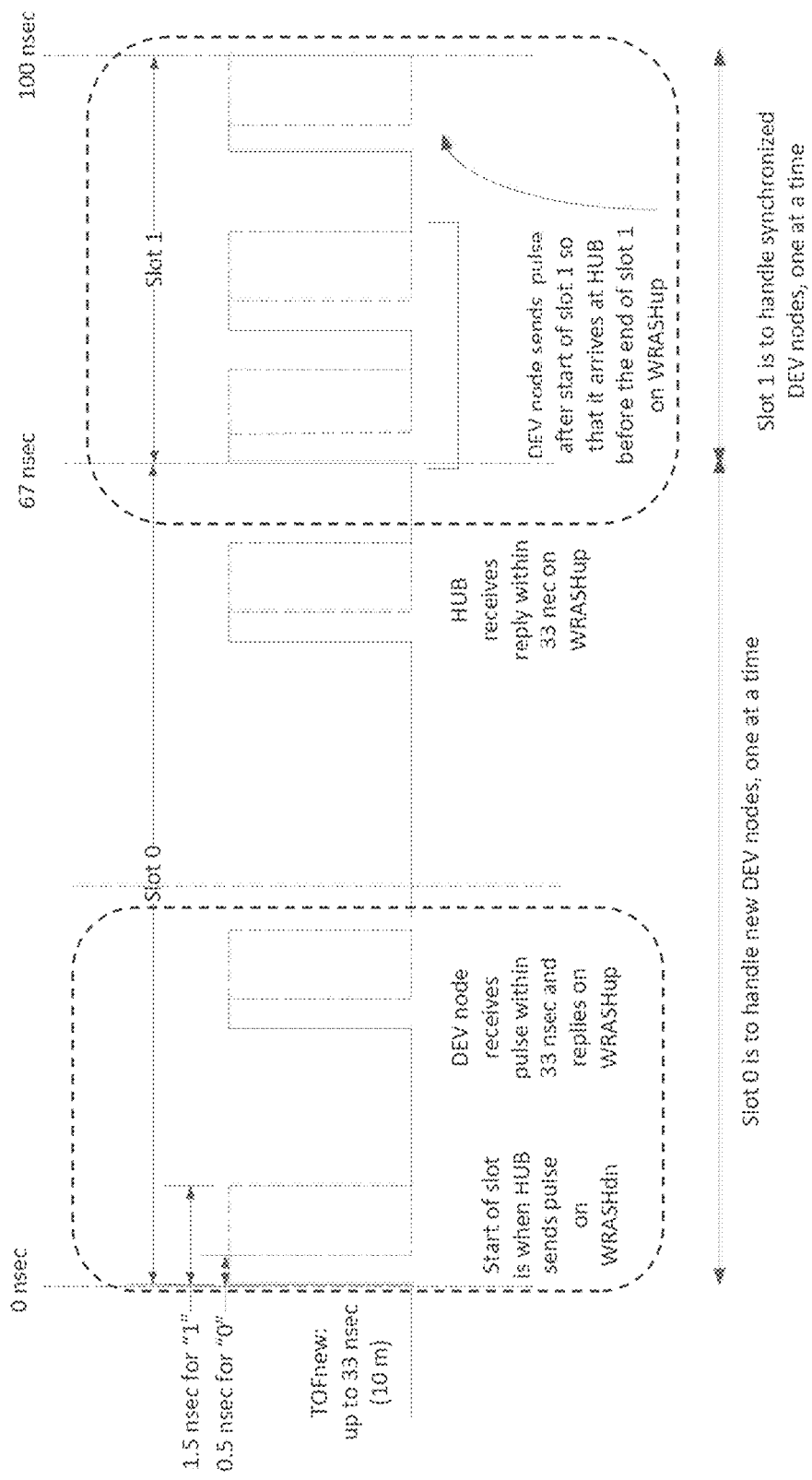
FIG. 15 depicts a timing diagram illustrating synchronized device nodes according to an embodiment of the subject matter described herein.
Figure 16:
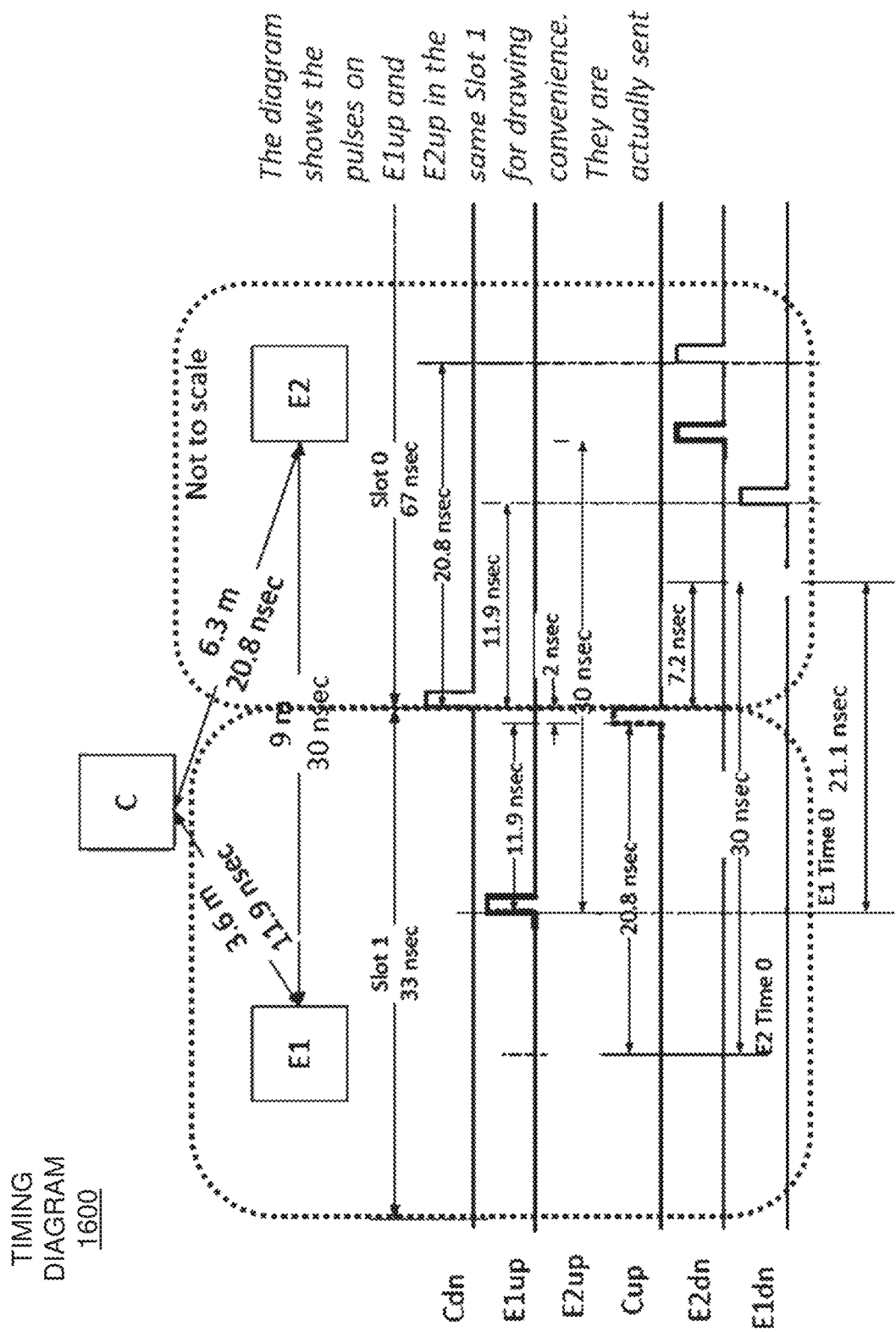
FIG. 16 depicts a timing diagram illustrating synchronized device nodes according to an embodiment of the subject matter described herein.

FIG. 15 depicts a timing diagram 1500 and FIG. 16 depicts a timing diagram 1600 both illustrating synchronized DEV nodes. Synchronized DEV nodes use slot 0 and 1 to measure the TOF between them. They do so by waiting to be instructed by the HUB to initiate the measurement and, then, by sending a normal transmission at their "Time 0". Since the TOF can exceed 33 nsec, the opposite DEV node may not receive it during slot 0 but may, instead, get it during slot 1.

The example shows how the DEV nodes can determine the TOF between them. The 3 nodes, a HUB and 2 DEV nodes, are arranged as shown in the top of the diagram such that the spacing and times-of-flight are as indicated. The pulses shown are the 2 nsec intervals during which a PWM pulse is sent. "Cdn" shows the normal clock pulse sent from the HUB on its WRASH transmitter.

The E1up and E2up lines show the pulse times for the two transmitters on the two DEV nodes, E1 and E2, respectively. A pulse sent from E1 on E1up at E1 Time 0 would arrive at the Cup port on the HUB node at the same time as a pulse sent from E2 on E2up at E2 Time 0.

The pulse on E2up in the example would be received on Cup and on E1*dn*, shown as pulses on both lines. E1 would measure the arrival of that pulse as 21.1 nsec into its Slot 0 time. As the DEV nodes know both TOF values, E1 can determine that the difference in the two is 8.9 nsec. Adding 8.9 nsec to the measured arrival of the pulse of 21.1 nsec, the result is 30 nsec.

Since the measurement uses slot 0 for transmitting pulses, it is possible that a new node could attempt to connect to the network during the same 100 nsec interval and collide with the DEV-DEV measurement transmission. In that case, an invalid DEVID (over the full bit stream transmitted) will indicate that the collision has occurred and the process will be repeated.

WRASHdn and WRASHup Activity Summary

Figure 17:
FIG. 17 depicts a timing diagram illustrating a pulse train transmitter from the hub apparatus to a device node according to an embodiment of the subject matter described herein.

Looking at the WRASH channel with an oscilloscope, 32 pulse sequences are observable. Multiple sequences would be interleaved when there is HUB<->DEV communications activity. As shown earlier, the pulse sequence sent by the HUB node is an ongoing stream organized into groups of 32 bits each of which is an information element (IE):

FIG. 17 depicts a timing diagram 1700 illustrating a pulse train transmitter from the HUB to a DEV. The bit values shown in this diagram are only for illustration. They don't represent any particular information.

Each DEV node receives its own version of this pulse train. Each version is the original sequence delayed by the Time-of-Flight (TOF) from the HUB node to that DEV node.

Figure 18:
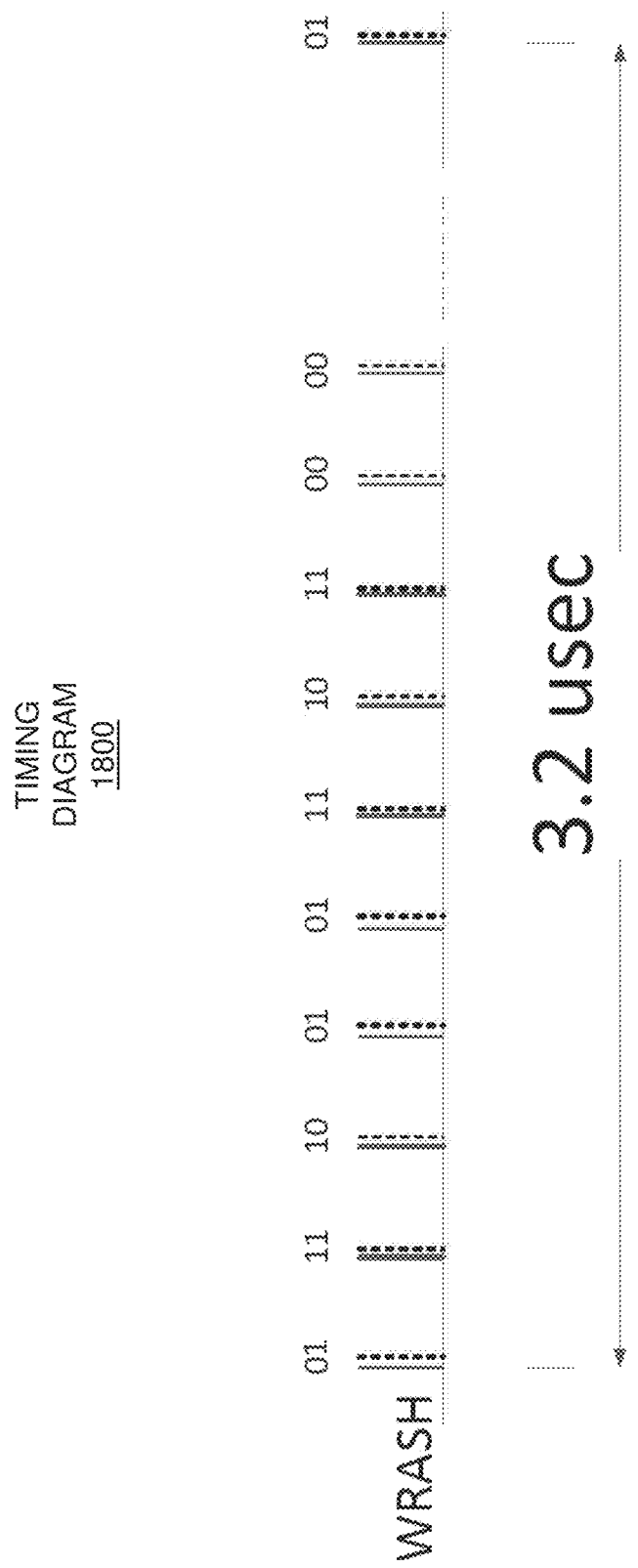
FIG. 18 depicts a timing diagram illustrating a received pulse train at a device node according to an embodiment of the subject matter described herein.

DEV nodes attempt to connect by transmitting on this same WRASH channel during Discover and Connect. They first find the boundary of the 32 pulse sequences sent by the HUB node, using the SYNC code (a main IE sent by the HUB node) and respond with their own pulse train after receiving the last bit of the sync code. The DEV node's view would look like FIG. 18:

FIG. 18 depicts a timing diagram 1800 illustrating a received pulse train at DEV node. The DEV node sees what it receives (solid) and what it sends (dotted).

Figure 19:
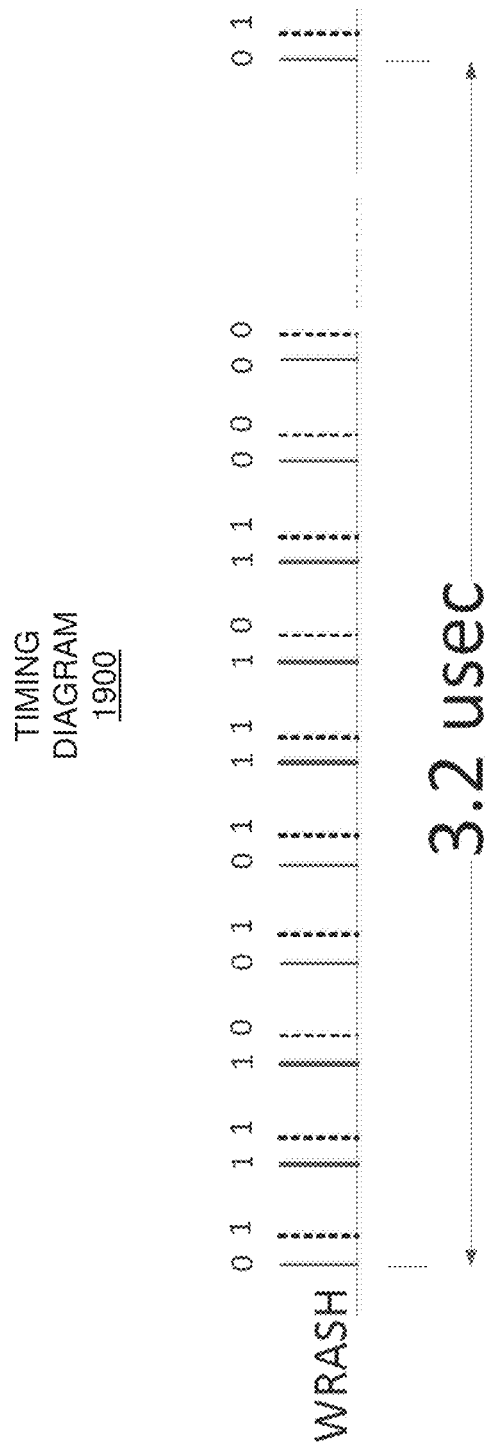
FIG. 19 depicts a timing diagram illustrating a view of the pulse train received at the HUB according to an embodiment of the subject matter described herein.

FIG. 19 depicts a timing diagram 1900 illustrating a view of the pulse train received at the HUB. The view of this same sequence, at the HUB node, is different due to the TOF from the DEV node back to the HUB node.

The HUB node sees its own transmission (solid) on its receiver connection plus what the DEV node transmitted (dotted) delayed by twice the TOF from its transmission:

Other DEV nodes will also see both transmissions on their connections to the WRASH channel. First, they will have their own time of arrival of the pulses from HUB as well as a different TOF for the pulses from the original DEV node. If the other DEV node is closer to the original DEV node than it is from the HUB node, it will receive the transmission from HUB after it receives the one from the other DEV node. So, both of the sequences shown in FIG. 20 are possible.

Figure 20:
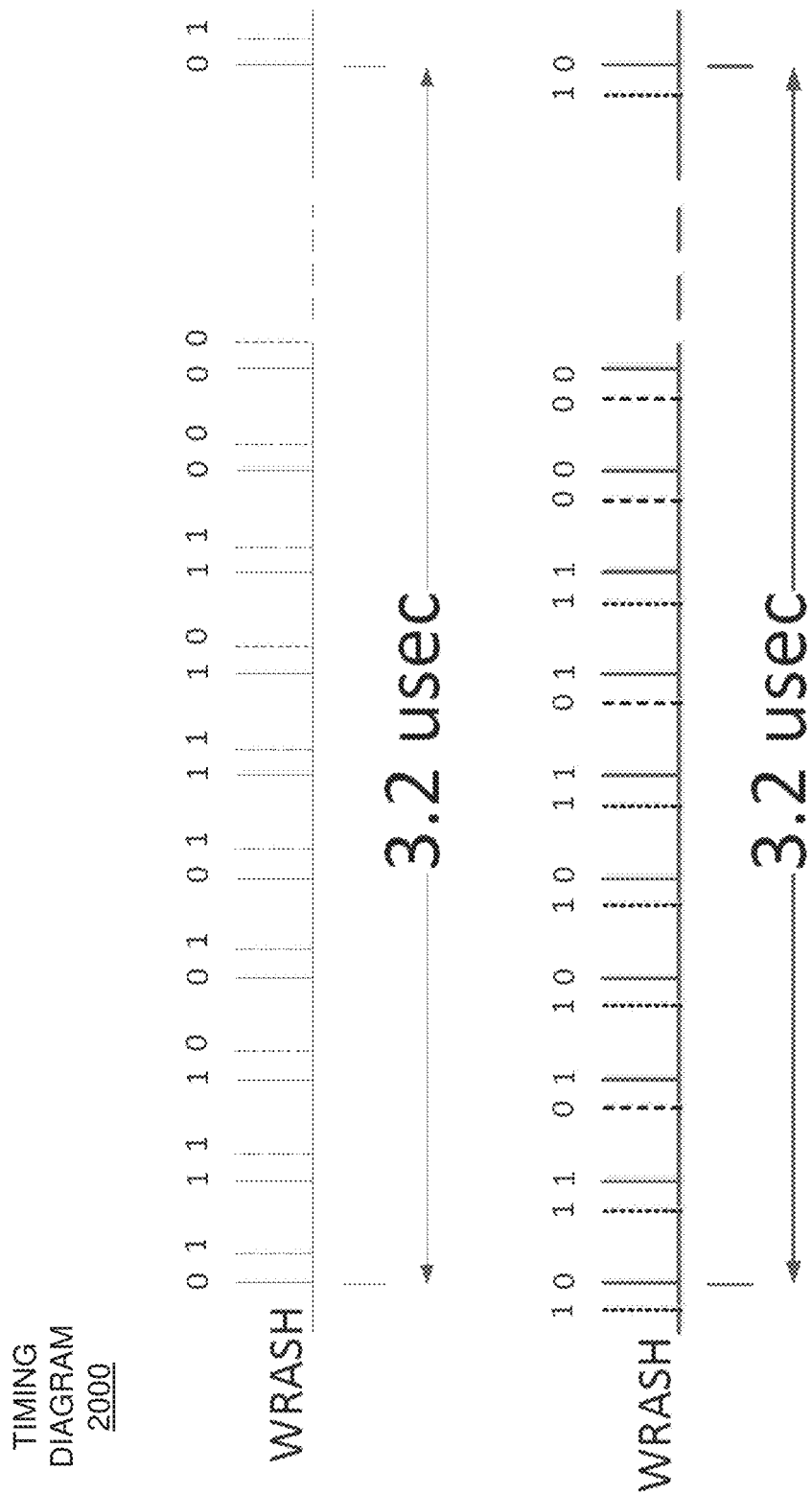
FIG. 20 depicts a timing diagram illustrating a received pulse train at two device nodes according to an embodiment of the subject matter described herein.

FIG. 20 depicts a timing diagram 2000 illustrating a received pulse train at two DEV nodes.

WiRays™ Data Channel Scheduling

The strategy to achieve the highest possible data rates with low latency is to remove interruptions from the WRAD channel and deal with them on the WRASH channel so that WRAD can fulfill challenging throughput goals while meeting stringent latency requirements. To this end, there are limited headers in the PHY data bursts and no byte counts or continuation indications. Bursts of fixed, pre-negotiated size and timing are used. Settings are renegotiated on the WRASH channel. Very limited parity checking is done on a burst basis.

Also again, there are 3 different operating modes of the WRAD channel. Broadly, there is either "asynchronous" operation or uni- or bi-directional "isochronous" operation. Asynchronous" refers to the case where there are no hard real-time events associated with the delivery of the data. Furthermore, the assumption is that the data must be received correctly or it has to be retransmitted.

"Isochronous" refers to the case where the time at which the data is available to the protocol layer that requested it is critical—that is, there are hard real-time requirements on the delivery of the data. The time and rate at which the data arrives is more important than whether it is 100% correct or not. There are two sub-modes of the operation of "isochronous" mode:

Uni-directional—all data for some considerable period of time will transfer from one side of the connection to the other side, only. No guarantee will be made, at the physical layer, that data are delivered without errors.

Bi-directional—data must flow in both directions at some rate with great certainty that the data will arrive in time in spite of possible errors. The application will continue to function in spite of momentary errors.

Examples of each of these three conditions are:

Asynchronous—typical file transfers or general data transmission where errors cannot be accepted, Isochronous/uni-directional—streaming video to a player, and Isochronous/bi-directional—streaming video in both directions in, for example, an "augmented reality" application where video data is acquired at the DEV node, processed by an application of some sort operating on the data at the "HUB" node, altered according to some data from an independent source, and sent back to the DEV node for display of the combination of the original video and the added information.

For unidirectional isochronous data, the procedure is to send series of bursts of length and frequency according to the multipath effects. If there are no multipath effects, the HUB and DEV nodes negotiate a burst size according to implementation considerations.

For bidirectional asynchronous and isochronous data, to the extent that it is balanced in terms of data rates, schedule according to the multipath effects but benefit from multiple channels and the ability to transmit in both directions in an overlapping manner. If it is largely one direction in isochronous mode, treat as for unidirectional isochronous. For asynchronous data that is primarily one direction, acknowledge with short reverse messages.

In all cases where WRAD data packets are scheduled between HUB and DEV nodes, the transmission of a burst from a DEV node to the HUB node shall be done so that it arrives at the HUB node in a time-slot relative to the WRASH clock interval. That is, the WRASH clock is the time base for all WiRays™ communications on both the WRASH and WRAD channels. This permits efficient scheduling of streams of data to the HUB node from multiple DEV nodes when there is a single wavelength in use. When the HUB node sends packets to the DEV nodes, again, they are scheduled in time slots relative to the DEV node's WRASH clock interval. There are 10 time slots per WRASH clock interval or 10 nsec per slot. At 20 Gbps, each slot represents 200 bits of data or 25 octets. The receiver's slots are used for alignment.

Unidirectional Isochronous Mode

In unidirectional mode, the WRAD channel runs at the maximum data rate that it can. It is limited only by the degree to which multipath causes ISI (see the Propagation section below). Still, it is necessary to have a check on the bit error rate if only to tell when communications are totally failing. So, the provision is made to use a variable number of octets at the end of the 200 bits of data for a parity or error detection word. The number of octets to use is configurable when a DEV node is set up to communicate with the HUB node.

Bidirectional Asynchronous and Isochronous Modes

Figure 21:
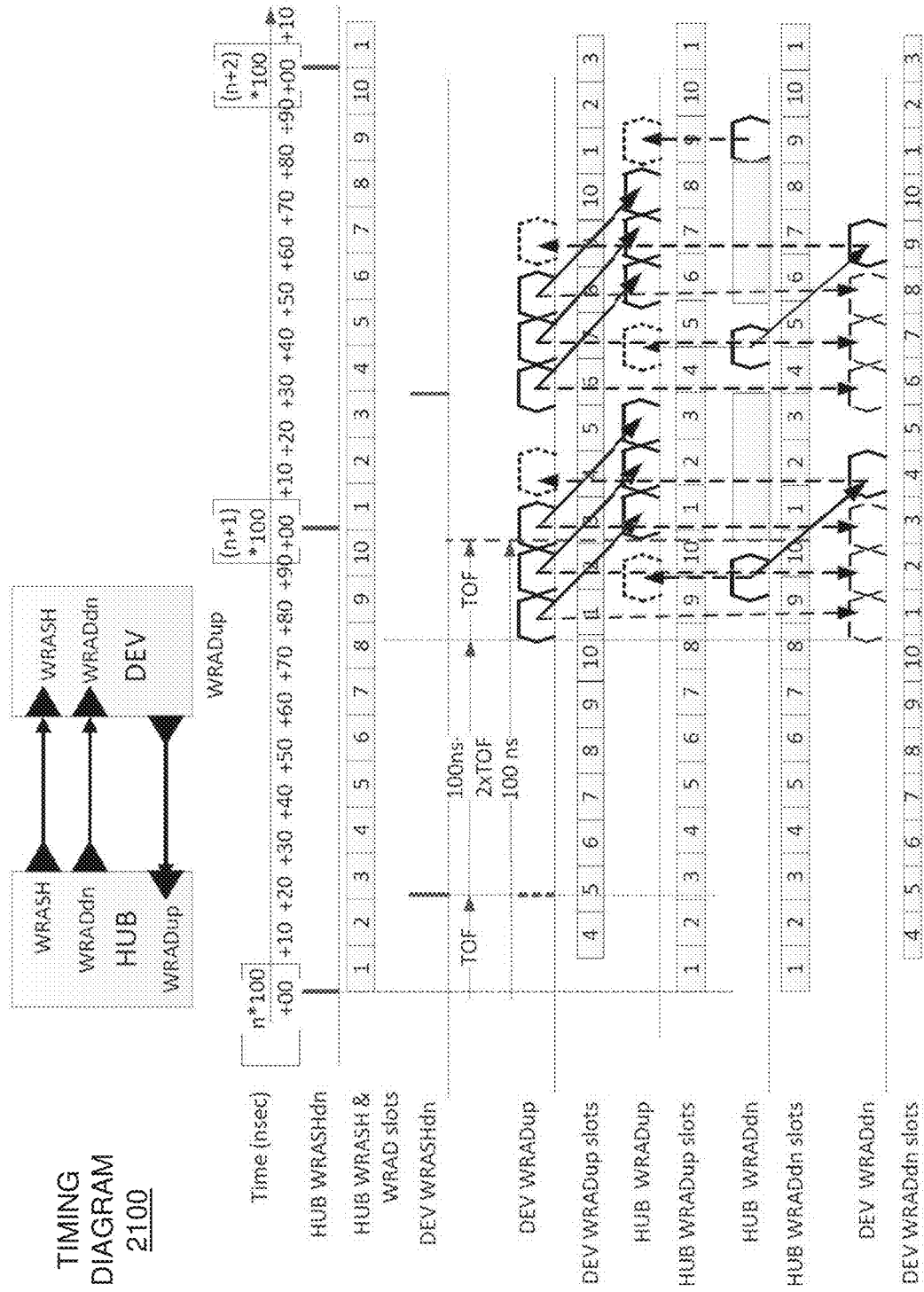
FIG. 21 depicts a timing diagram illustrating a transmission from the device node according to an embodiment of the subject matter described herein.

FIG. 21 depicts a timing diagram 2100 illustrating a transmission from the Dev node. Scheduling of the WRAD channel in bidirectional modes has to account for the fact that TOF is long relative to a WiRays™ bit time and the fact that the WiRays™ transceivers are half-duplex. To illustrate the point, FIG. 21 shows an asynchronous transmission of three bursts of data (75 octets) sent from an DEV node to the HUB node and a single burst reply from HUB to DEV. Dotted lines show that transceivers receive what they send.

Note that the reply from HUB is sent overlapped in time with the three bursts sent from the DEV node. The example shown above is just one possible configuration. The slot structure is intended to give a consistent frame of reference for timing bursts. Slots on both ends are set to facilitate reception of data. It is assumed that a transmitting node can begin transmitting at a time that is not aligned with its slots. The receiver, however, must know when to begin detecting data and, so, uses its slot structure to do so.

In the example, the DEV node sets its slots by knowing the TOF and subtracting 2 times that amount of time from the WRASH clock interval (100 nsecs in the example). That will ensure that data sent from the DEV node to the HUB node will arrive aligned with the HUB node's slots. In unidirectional isochronous mode the transmitter sends data aligned with the receiver's WRASH clock interval. It is not possible to give examples of all possible scheduling configurations. This standard supplies the means for the nodes to negotiate an optimal arrangement. These include the (1) the mode—asynchronous or isochronous and uni- or bi-directional; and (2) the number of bursts to be sent in each direction before switching direction.

One special case that deserves mention is that of a broadcast of data from the HUB to all DEV nodes using a single WRAD channel. As noted in the Connections section, above, "Since DEV node frames are arranged so that they receive transmissions from the HUB node at the same time relative to their view of the frame, the HUB sends one copy of the broadcast message and all receive it correctly."

Figure 22:
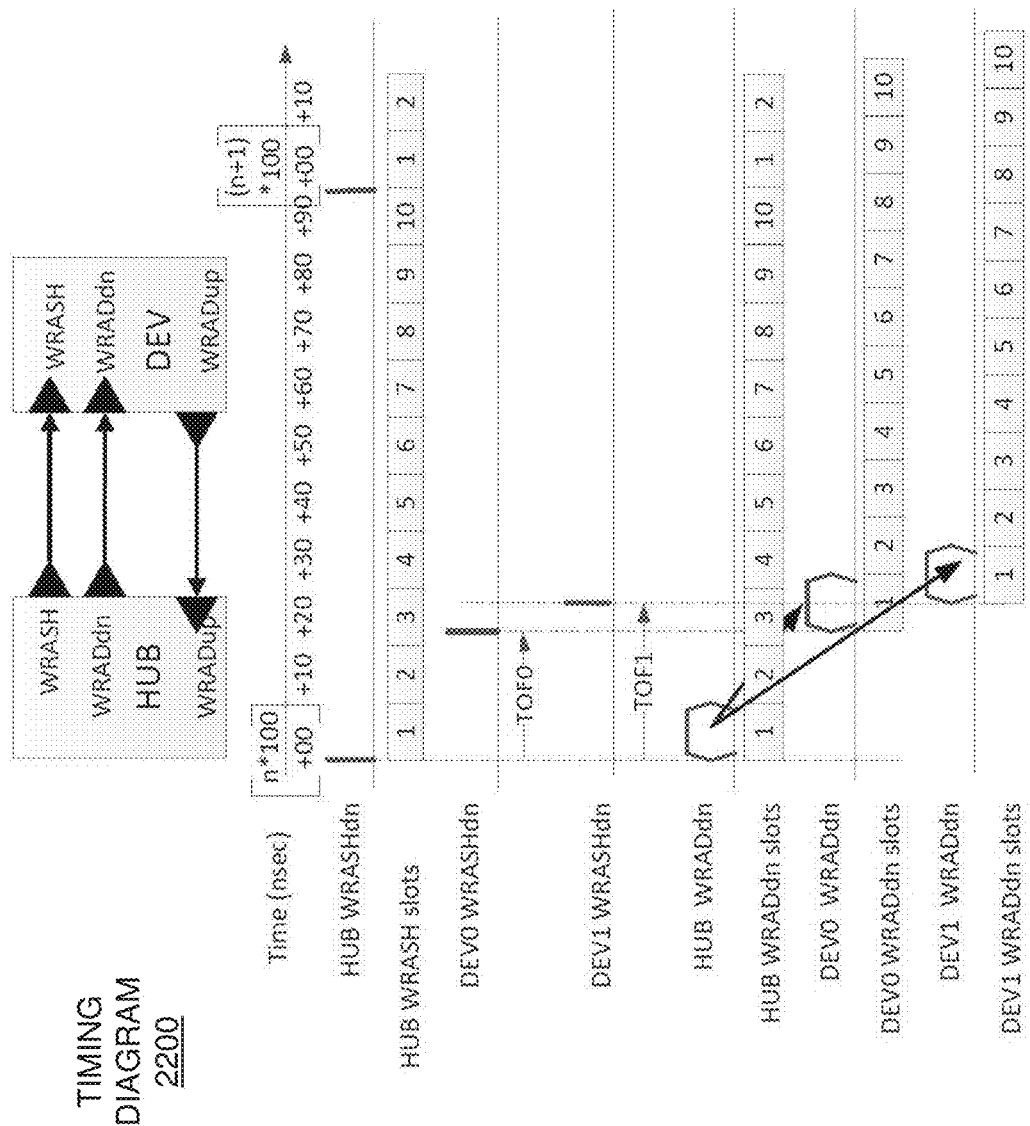
FIG. 22 depicts a timing diagram illustrating burst scheduling according to an embodiment of the subject matter described herein.

FIG. 22 depicts a timing diagram 2200 illustrating burst scheduling. In terms of burst scheduling, this means that the HUB is the transmitter and, so must transmit the data such that it arrives in the time slots of the DEV nodes receiving it. Since there are multiple DEV node receivers, there is no need for a reply to the broadcast message from DEV nodes to the HUB node. So, the result is that the HUB does not need a slot structure aligned for transmitting to a particular DEV node but can use one based on its WRASH clock interval. FIG. 22 shows this case.

Note that the slot settings for the DEV nodes are different between the two examples due to the difference in the negotiated communications settings between the HUB and DEV node(s).

Propagation

WRASH Channel Multipath

Every node has the ability to transmit on the WRASH channel. When any node does so, all other nodes see that transmission. It is possible that multiple copies of signal rays pass between the HUB and DEV nodes in both directions due to multipath reflections. If there is a ray that follows the line-of-sight (LOS), it will arrive first. Others will either extend the pulse or add pulses after the first one as shown earlier (Signals section). The multiple pulse case is shown below. If there is an obstacle that blocks the LOS ray, any other rays will arrive with a TOF that depends on the length of the path from transmitter to receiver.

In all cases, all pulses must arrive before the end of the 100 nsec pulse interval. So, the DEV node uses the leading edge of the first pulse received and ignores any copies during the initial sync acquisition. It is possible that pulses will arrive at the receiver after 100 nsec. This becomes a source of interference that is dealt with as such. When pulses are overlapped, it is not possible to distinguish the pulses from individual rays.

When pulses are not overlapped, the multiple pulses are used to estimate the difference in the time-of-flight of the main (first) pulse and the reflection of that pulse.

Again, in the case where there is an obstacle that blocks the LOS ray, it is still possible that multiple reflections will arrive at the receiver with enough energy to be detected. It is possible that multiple reflections can arrive at the receiver along with the LOS ray causing 3 or more overlaps and/or multiple pulses.

The HUB and DEV nodes constantly estimate the multipath delay, Tmp, (and Time-Of-Flight) on each HUB-DEV WRASH channel in both directions. DEV nodes estimate time-of-flight and multipath timing on the path between itself and each other DEV node using the WRASH transmissions from each DEV node.

As described earlier, for all of the nodes to be able to identify traffic on their WRASH receiver, each node is distinguishable:

The HUB transmits the sync code

Each DEV node sends its unique ID

Figure 23:
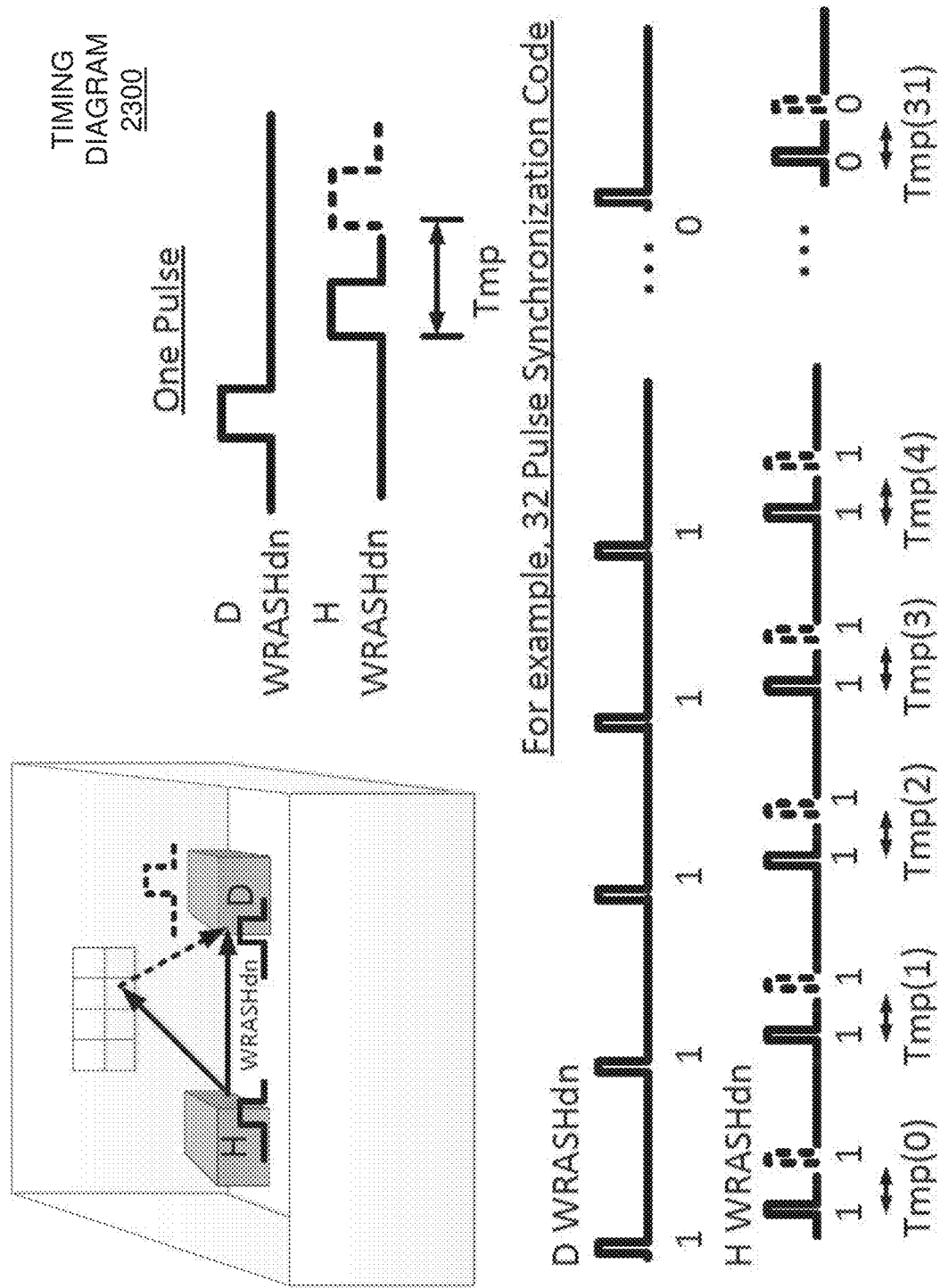
FIG. 23 depicts a timing diagram illustrating downstream multipath estimation according to an embodiment of the subject matter described herein.
Figure 24:
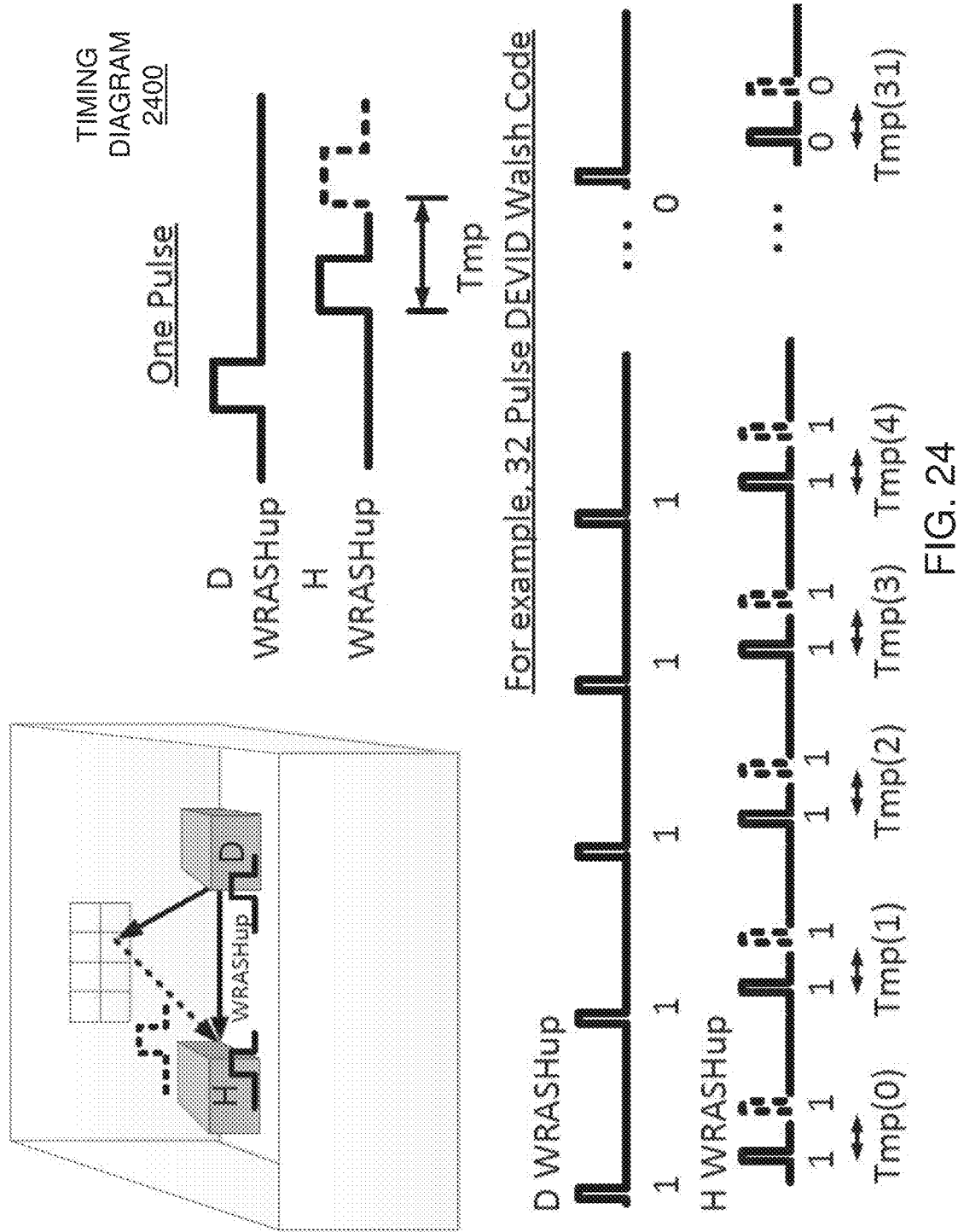
FIG. 24 depicts a timing diagram illustrating upstream multipath estimation according to an embodiment of the subject matter described herein.

FIG. 23 depicts a timing diagram 2300 illustrating downstream multipath estimation. FIG. 24 depicts a timing diagram 2400 illustrating upstream multipath estimation. Estimates can be made of the multipath in both directions. The colocation of the transmit LEDs and detectors means that the delay measured is very close whether HUB-to-DEV or DEV-to-HUB. Still, it is beneficial to get multiple estimates. Once multipath is determined for the WRASH communications between a particular DEV node and the HUB node, it is possible to compensate for it. This permits support of communication with multiple DEV nodes using scheduling. In addition, the presence of multipath means that multiple copies of transmissions are received and can be combined to improve the link margin for the WRASH connection involved. With the likelihood of multiple DEV nodes in a network combined with multipath and external sources of interference, it is beneficial to take advantage of the temporally sparse nature of the WRASH channel by scheduling when transmissions will occur. Transmissions from DEV nodes to the HUB node that are sent to establish initial synchronization cannot be completely scheduled and may produce collisions (see Use Cases).

Figure 25:
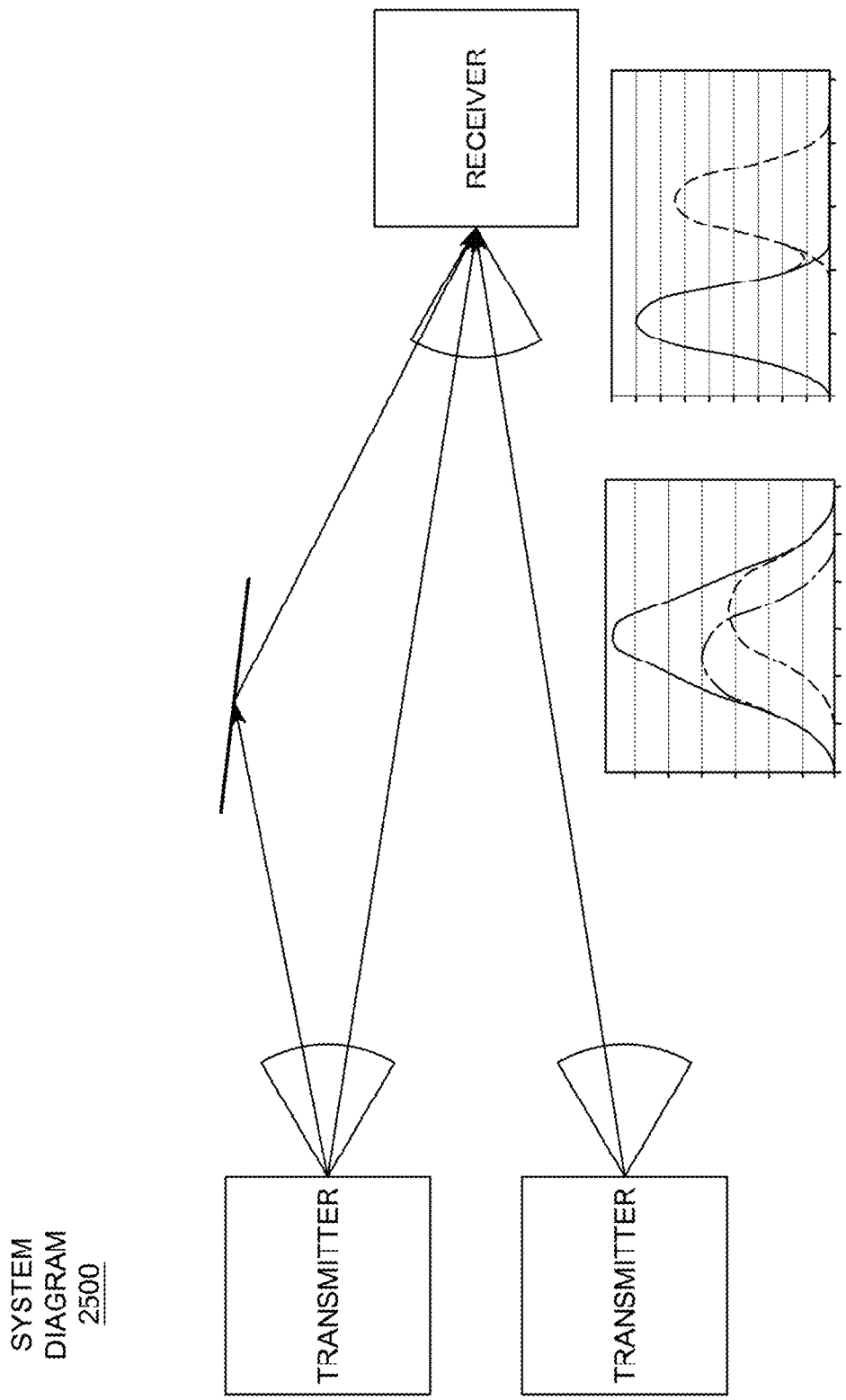
FIG. 25 depicts a system diagram illustrating multipath of an optical from a transmitter to a receiver according to an embodiment of the subject matter described herein.
Figure 26:
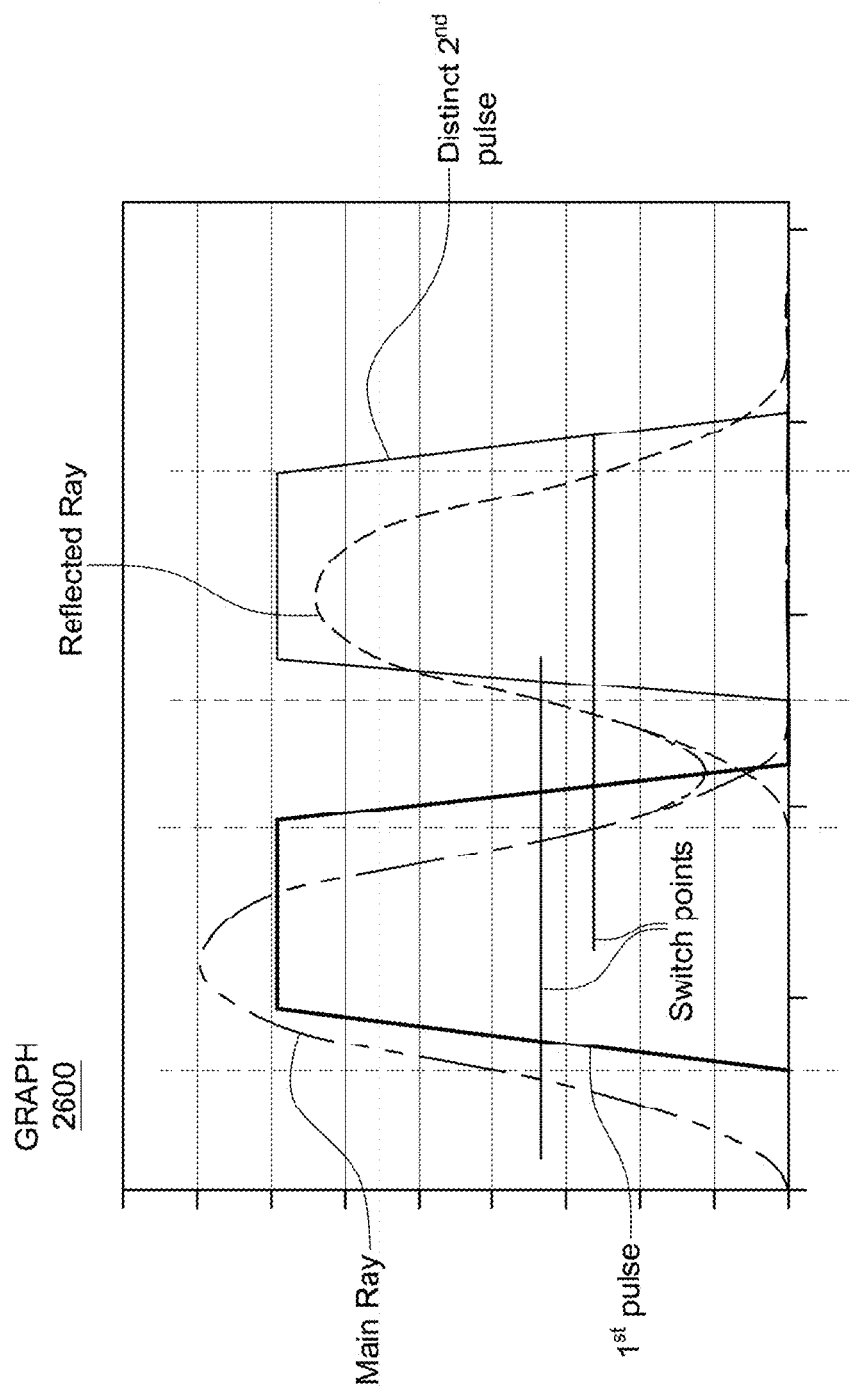
FIG. 26 depicts a graph illustrating multiple ray paths according to an embodiment of the subject matter described herein.

FIG. 25 depicts a system diagram 2500 illustrating multipath of an optical from a transmitter to a receiver. FIG. 26 depicts a graph 2600 illustrating multiple ray paths. Multiple simultaneous diffuse transmissions from different nodes and multipath signals means that interleaving and collisions of pulses are possible. Two or more overlapping pulses result in a wider pulse or two or more distinct pulses.

Multiple ray paths are possible from transmitter to receiver. If there is little overlap as in FIG. 26, the detector output is two distinct pulses—"interleaving".

Figure 27:
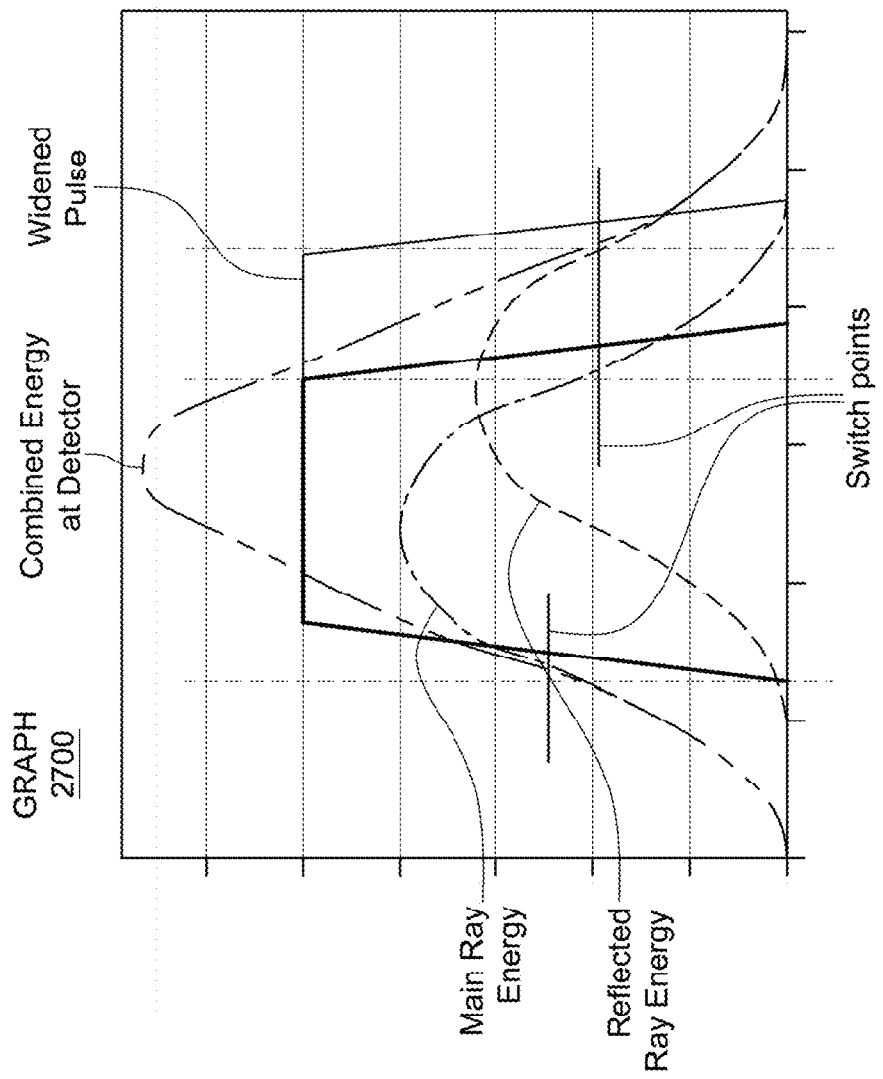
FIG. 27 depicts a graph illustrating significant overlap of multiple ray paths according to an embodiment of the subject matter described herein.

FIG. 27 depicts a graph 2700 illustrating significant overlap of multiple ray paths. With the significant overlap, the detector output is a wider pulse—"collision".

As noted earlier, two unsynchronized DEV nodes both attempting to register with the HUB node will try to send their DEVID codes aligned with the WRASHdn pulses that they receive. If two DEV nodes are at the same distance from the HUB node, they will receive the WRASHdn pulses fairly close in time and, so, their registration attempts can easily arrive at the HUB node within the collision interval. With a collision interval of 2 nsec and a slot 0 time of 67 nsec, there is a 1/33 chance of two nodes being at a close enough distance to collide.

Figure 28:
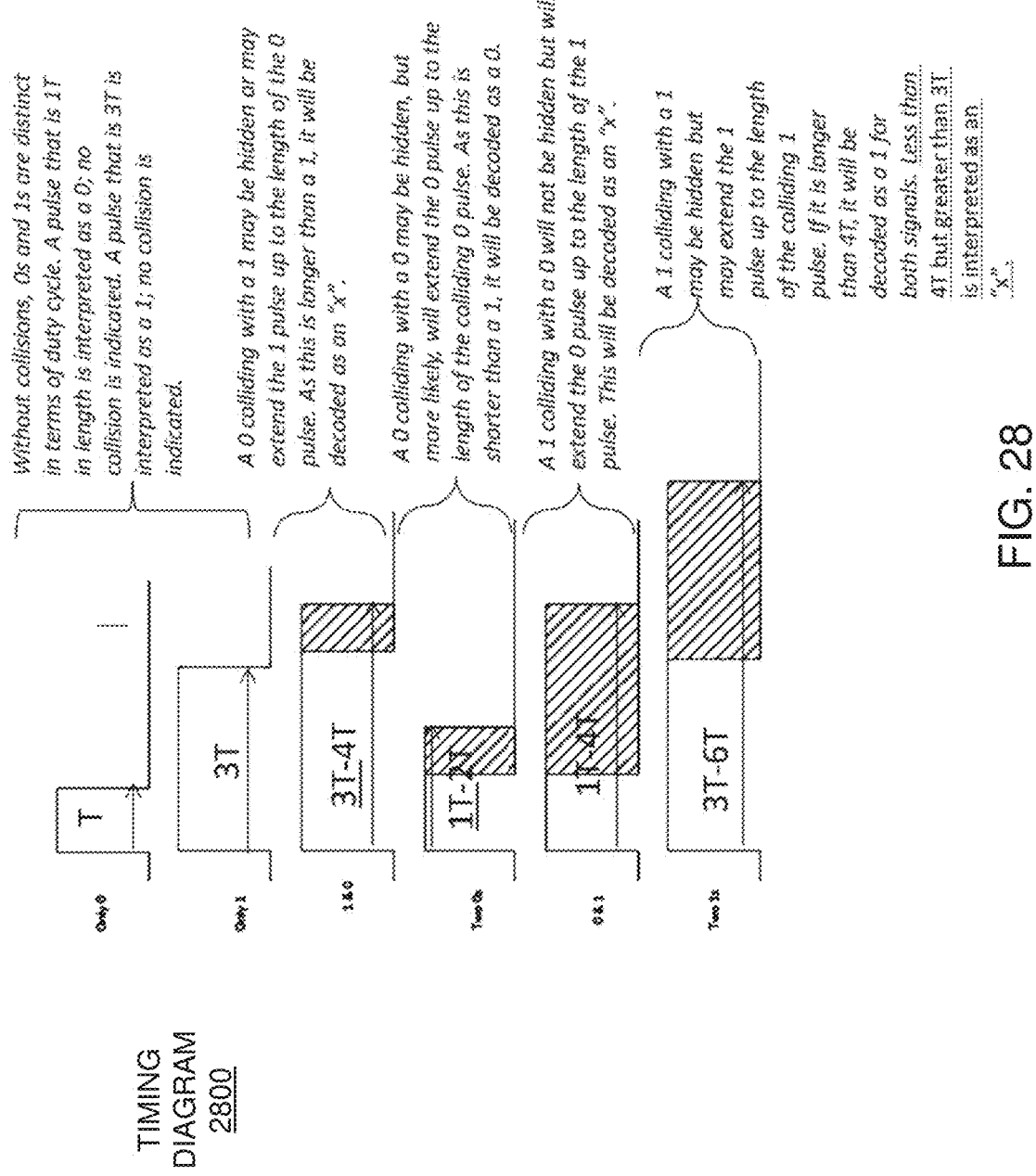
FIG. 28 depicts a timing diagram illustrating examples of multipath collisions according to an embodiment of the subject matter described herein.

This condition is mitigated somewhat by the fact that the different DEV nodes are assigned random back-off intervals such that they wait some number of WRASHdn frames before they attempt to transmit. Assuming 16 random back-off times, there is a 1/256 chance that two nodes will choose the same back-off time. The two probabilities of 1/33 1/256=1/8448 of a collision. If there is a collision, a node that doesn't get a response will time-out and, then, perform a random back-off. Collisions of 2 PWM pulses on the WRASH channel can cause pulse extension as shown, above. The effect on signal interpretation is as follows:

FIG. 28 depicts a timing diagram 2800 illustrating examples of multipath collisions. Without collisions, 0s and 1s are distinct in terms of duty cycle. A pulse that is 1T in length is interpreted as a 0; no collision is indicated. A pulse that is 3T is interpreted as a 1; no collision is indicated.

A 0 colliding with a 1 may be hidden or may extend the 1 pulse up to the length of the 0 pulse. As this is longer than a 1, it will be decoded as an "x".

A 0 colliding with a 0 may be hidden, but more likely, will extend the 0 pulse up to the length of the colliding 0 pulse. As this is shorter than a 1, it will be decoded as a 0.

A 1 colliding with a 0 will not be hidden but will extend the 0 pulse up to the length of the 1 pulse. This will be decoded as an "x".

Figure 29:
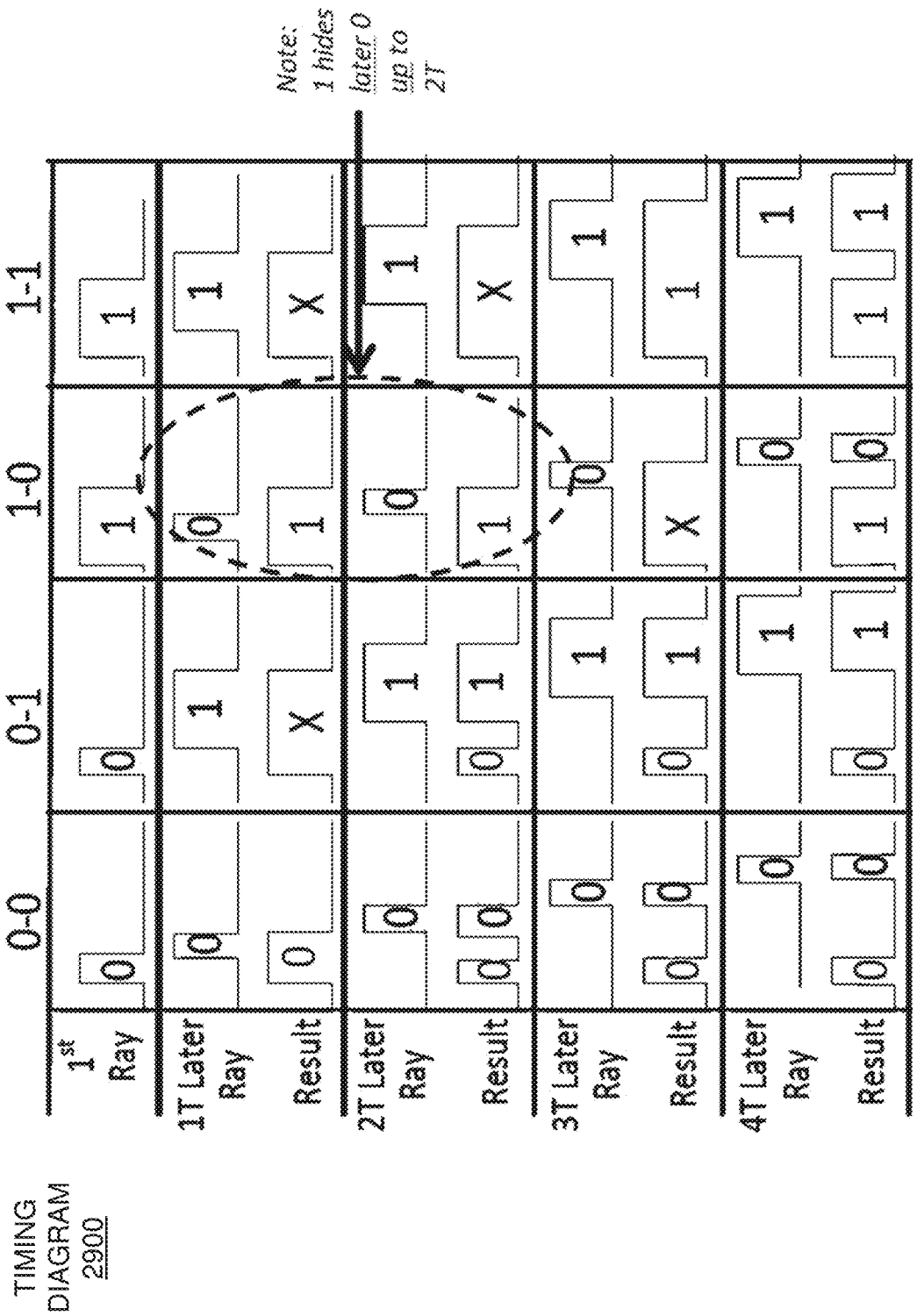
FIG. 29 depicts a timing diagram illustrating four possible sequences of multipath reception according to an embodiment of the subject matter described herein.

A 1 colliding with a 1 may be hidden but may extend the 1 pulse up to the length of the colliding 1 pulse. If it is longer than 4T, it will be decoded as a 1 for both signals. Less than 4T but greater than 3T is interpreted as an FIG. 29 depicts a timing diagram 2900 illustrating four possible sequences of multipath reception. Considering the four possible sequences of two binary values and delays of 1, 2, 3 and 4 times the 0 pulse width (1T, 2T, 3T and 4T), FIG. 29 shows the cases, on the result lines, where the original "$1^{st}$ Ray" is received unambiguously or ambiguously. If the second (reflected) ray is delayed 1T from the $1^{st}$ ray, a 0 in the $1^{st}$ ray followed by a 0 in the second ray will result in a correct result of 0 since the received pulse, in this case, is ≤2T in width. The case of 0 followed by 1, however, produces an ambiguous result since the combined pulse width received is between 3T and 4T. A pulse width between 2T and 3T, non-inclusive, is not possible since there is no overlap of 1T and 1T or 1T and 3T that would produce that. Note that a 1 followed within 2T by a 0 produces a 1, as it should. The rest of the diagram can be read in the same manner. Note that when the second ray is delayed at least 4T, all pulses are distinct and the original and the colliding values are received correctly.

In summary, if there is only one pulse received and:

TABLE 2

| If the received pulse width is: | It is interpreted as: |
|---|---|
| <T | Can't happen. So, noise. |
| ≥T, ≤2T | 0 |
| >2T, <3T | Can't happen. So, noise. |
| =3T | 1 |
| >3T, ≤4T | X |
| >4T | 1 |

If multiple pulses are received (i.e. separately) they will be either 1T=0 or 3T=1. Mitigation of bit errors due to collisions between transmissions from different unsynchronized DEV nodes or due to collisions of a single DEV node's transmission with a reflection of itself involves several factors.

Avoid the chance for collisions through scheduling and separating unsynchronized DEV node communications from synchronized ones.

When DEV nodes are unsynchronized, delay transmissions with random backoff so that collisions won't repeat.

Use an orthogonal encoding approach so that multiple, collided codes can be distinguished. So long as only two codes collide, there will be at most two nodes that are involved. HUB can just pick one to respond to and ignore the other. The other will timeout, execute a random back-off and try again. A 32 bit Walsh code is chosen because:

It is the same length as the sync code and can be transponded in the same time interval as the sync code,
It is a way of identifying an DEV node uniquely,
Walsh codes are good for error detection and correction,
They are easily created and decoded,
Allows 31 DEV nodes (not 32, per the following) per HUB If collisions occur between two DEVIDs, either from different DEV nodes or as a LOS and reflection from the same DEV node, it is possible to determine what node or nodes collided. The table, below, summarizes the results of collisions where the $1^{st}$ ray and a delayed ray result in ambiguous values of the Walsh codes received. The example shown uses an 8 bit Walsh code for brevity but the same pattern applies to the 32 bit Walsh code case. The X values show where the pulses received yield ambiguous results as explained above. Xs are represented by a value of 0 vs 1 and −1 for correlation. In spite of the unknown bit values, correlations with the Walsh table will yield multiple candidate codes. In general, the collision of two Walsh codes will result in a pattern that will correlate with at most two Walsh codes that collided for a given delay. In some cases, it is possible to identify a single Walsh code in spite of the collision. If it is not possible to rule out one of the two possibilities, the HUB node will just select one of the DEV nodes to respond to. If it chooses incorrectly, no DEV node will acknowledge the TAM that the HUB sends and the DEV will timeout and try again after the random backoff time.

Table 3 illustrated received bit sequences in the case of 1T. 2T or 3T collisions of 8 bit Walsh codes.

TABLE 3

| | <–Delay | | | Followed By | | | | |
|---|---|---|---|---|---|---|---|---|
| 1st Ray | W(7, 8) | W(6, 8) | W(5, 8) | W(4, 8) | W(3, 8) | W(2, 8) | W(1, 8) | W(0, 8) |
| 1T | | | | | | | | |
| W(0, 8) | 0XX0X00X | 00XXXX00 | 0X0XX0X0 | 0000XXXX | 0XX00XX0 | 00XX00XX | 0X0X0X0X | 00000000 |
| W(1, 8) | 0XX1X10X | 01XXXX01 | 0X0XX1X1 | 0101XXXX | 0XX10XX1 | 01XX01XX | 0X0X0X0X | 01010101 |

TABLE 3-continued

| <–Delay | | | | Followed By | | | | |
|---|---|---|---|---|---|---|---|---|
| 1st Ray | W(7, 8) | W(6, 8) | W(5, 8) | W(4, 8) | W(3, 8) | W(2, 8) | W(1, 8) | W(0, 8) |
| W(2, 8) | 0XX1X01X | 00XXXX11 | 0X1XX0X1 | 0011XXXX | 0XX10XX1 | 00XX00XX | 0X1X0X1X | 00110011 |
| W(3, 8) | 0XX0X11X | 01XXXX10 | 0X1XX1X0 | 0110XXXX | 0XX00XX0 | 01XX01XX | 0X1X0X1X | 01100110 |
| W(4, 8) | 0XX0X11X | 00XXXX11 | 0X0XX1X1 | 0000XXXX | 0XX01XX1 | 00XX11XX | 0X0X1X1X | 00001111 |
| W(5, 8) | 0XX1X01X | 01XXXX10 | 0X0XX0X0 | 0101XXXX | 0XX11XX0 | 01XX10XX | 0X0X1X1X | 01011010 |
| W(6, 8) | 0XX1X10X | 00XXXX00 | 0X1XX1X0 | 0011XXXX | 0XX11XX0 | 00XX11XX | 0X1X1X0X | 00111100 |
| W(7, 8) | 0XX0X00X | 01XXXX01 | 0X1XX0X1 | 0110XXXX | 0XX01XX1 | 01XX10XX | 0X1X1X0X | 01101001 |
| 2T | | | | | | | | |
| W(0, 8) | 00000000 | 00000000 | 00000000 | 00000000 | 00000000 | 00000000 | 00000000 | 00000000 |
| W(1, 8) | 0X01010X | 010X0X01 | 0X0X0101 | 01010X0X | 0X010X01 | 010X010X | 0X0X0X0X | 01010101 |
| W(2, 8) | 00X1001X | 00XX0011 | 001X00X1 | 001100XX | 00X100X1 | 00XX00XX | 001X001X | 00110011 |
| W(3, 8) | 0XX00110 | 01X00X10 | 0X1001X0 | 01100XX0 | 0XX00XX0 | 01X001X0 | 0X100X10 | 01100110 |
| W(4, 8) | 0000X11X | 0000XX11 | 0000X1X1 | 0000XXXX | 00001XX1 | 000011XX | 00001X1X | 00001111 |
| W(5, 8) | 0X01010 | 010XX010 | 0X0XX0X0 | 0101X0X0 | 0X0110X0 | 010X10X0 | 0X0X1010 | 01011010 |
| W(6, 8) | 00X1X100 | 00XXXX00 | 001XX100 | 0011XX00 | 00X11X00 | 00XX1100 | 001X1X00 | 00111100 |
| W(7, 8) | 0XX0X00X | 01X0X001 | 0X10X001 | 0110X00X | 0XX01001 | 01X0100X | 0X10100X | 01101001 |
| 3T | | | | | | | | |
| W(0, 8) | 00000000 | 00000000 | 00000000 | 00000000 | 00000000 | 00000000 | 00000000 | 00000000 |
| W(1, 8) | 010X0X01 | 0X01010X | 01010X0X | 0X0X0101 | 010X010X | 0X010X01 | 01010101 | 0X0X0X0X |
| W(2, 8) | 001X00X1 | 001100XX | 00X1001X | 00XX0011 | 001X001X | 00110011 | 00X100X1 | 00XX00XX |
| W(3, 8) | 01100XX0 | 0X1001X0 | 01X00X10 | 0XX00110 | 01100110 | 0X100X10 | 01X001X0 | 0XX00XX0 |
| W(4, 8) | 00001XX1 | 000011XX | 00001X1X | 00001111 | 0000X11X | 0000XX11 | 0000X1X1 | 0000XXXX |
| W(5, 8) | 010X10X0 | 0X0110X0 | 01011010 | 0X0X1010 | 010XX010 | 0X01010 | 0101X0X0 | 0X0XX0X0 |
| W(6, 8) | 001X1X00 | 00111100 | 00X11X00 | 00XX1100 | 001XX100 | 0011XX00 | 00X1X100 | 00XXXX00 |
| W(7, 8) | 01101001 | 0X10100X | 01X0100X | 0XX01001 | 0110X00X | 0X10X001 | 01X0X001 | 0XX0X00X |

Each bit sequence shown, other than W(0,8), occurs at most 2 times per delay time. So, a collision of 2 Walsh codes other than W(0,8) can be narrowed to the two that collided. For example, 00000000 occurs 8 times for each delay when 1st code is W(0,8)=00000000. So, don't use W(0,8) (W(0, 32)).

WRAD Channel Multipath

There is effectively no interference of the multiple WRAD channels with the WRASH channel or with each other. Multipath/InterSymbol Interference (ISI) of a channel with itself is a significant issue for indoor visible light communication systems:

ISI is caused by the arrival of reflections of the transmitted light ray at the receiver after the arrival of the "Line-Of-Sight" (LOS) ray. Surfaces producing reflections are assumed to be "Lambertian" meaning that they appear to absorb and, then, re-radiate energy as though they were point sources. This produces multiple re-reflections that contribute to the overall response of the channel. The steady-state condition of the channel resulting from multipath is a frequency response that is low-pass with a 3 dB cutoff of 10 to 50 MHz.

Different materials exhibit different reflectivity. So, it is possible to create an environment where the multipath effects are less significant and the low pass cutoff is at a higher frequency. It isn't clear that multipath can be eliminated, entirely. Multipath has to be taken seriously for WiRays™ data transmission on both the WRASH and WRAD channels. The fact that the WRASH channel operates at 10 MHz was arrived at by virtue of the Time-Of-Flight of signals (33 nsec assuming 10 meter range) and the need to be able to deal with 2 such intervals while establishing a connection with DEV nodes. 10 meters is chosen as a reasonable upper limit on the dimensions of an indoor space used for optical wireless communications. The channel impulse response is influenced heavily by the multipath which, in turn, is a result of the way that light rays travel around the indoor space due to reflections. The time that the light takes to follow the reflection paths is roughly equivalent to the 2×TOF for HUB-DEV communications. So, it is natural that there would be a 10 MHz bandwidth limitation on the WRASH channel. Through use of the WRASH channel to measure multipath, we can adapt to varying conditions. Some methods that are available include:

Create an environment without multipath,

Adjust the optical signal characteristics,

Change the modulation,

Add coding, and

Use opportunistic scheduling

Environment

The WiRays™ system supports room dimensions that are relatively large and open

Configurations and materials that minimize both reflective and Lambertian surfaces such as windows and white walls.

Reduce the apertures of both the transmitter and receiver to reduce multipath at the expense of limiting the available positions of HUB and DEV nodes. Consider MIMO with different wavelengths on channels that have the same "Field of View" (FOV) to permit limited apertures while keeping good coverage.

Limit interference from light sources not within the control of the WiRays™ system.

Optical Signal Characteristics

Higher power accentuates the LOS signal and makes it easier to detect successfully but at the expense of more power consumption. Consider dynamic power adjustment for periods with significant reflections.

Signal bandwidth-optical filters limit bandwidth and, to the extent that reflections alter the frequency content of re-radiated energy, those reflections will be attenuated Equalization techniques such as pre- and post-emphasis and waveshaping Modulation The modulation for WiRays™ is On-Off-Keying or OOK. Other modulations can be used such as:
  Pulse position
  Differential pulse position
  Pulse interval
  Pulse position+pulse width
  Pulse amplitude (various numbers of levels)

Some of these reduce the bandwidth that can be achieved with some improvements in the error rates. The benefit must be weighed against the added complexity and cost. Equalization improves error rates for modulations other than OOK such as M-ary Pulse Amplitude Modulation (M-PAM). Polarization reduces the impact of reflected light since polarity is not maintained in a reflection.

Coding

Traditional error detection and correction methods are available on the WRAD channel such as checksum, convolution coding, etc. Each of these reduces the maximum data rate that can be achieved. So, they are used only as needed.

Opportunistic Scheduling

The use scheduling to deal with multipath assumes the following:

Two or more transceivers are at each end of the link. The transceivers operate on different wavelengths and, so, do not interfere with one another. The use of two transceivers is needed to achieve full-duplex operation in any situation whether doing opportunistic scheduling or not.

A measurement of the multipath delay is required to be accurate to the time for 1 bit or 50 psec. The WRASH channel is used for this.

Use intermittent transmission on the two transceivers from the near end to the far end and also from the far end to the near end. Time the transmissions so that the reflection(s) of the LOS ray or first reflected ray in the non-LOS case is(are) ignored at the far end receiver for the duration of the significant channel impulse response caused by the reflection(s). Put another way, use the delay in the impulse response as a time to send a burst of pulses. Then go quiet until the channel stops reflecting.

Transmit in opposite directions on the two non-interfering transceivers simultaneously.

Dynamic adjustment of the timing and length of bursts of data is needed to utilize the channel optimally.

Figure 30:
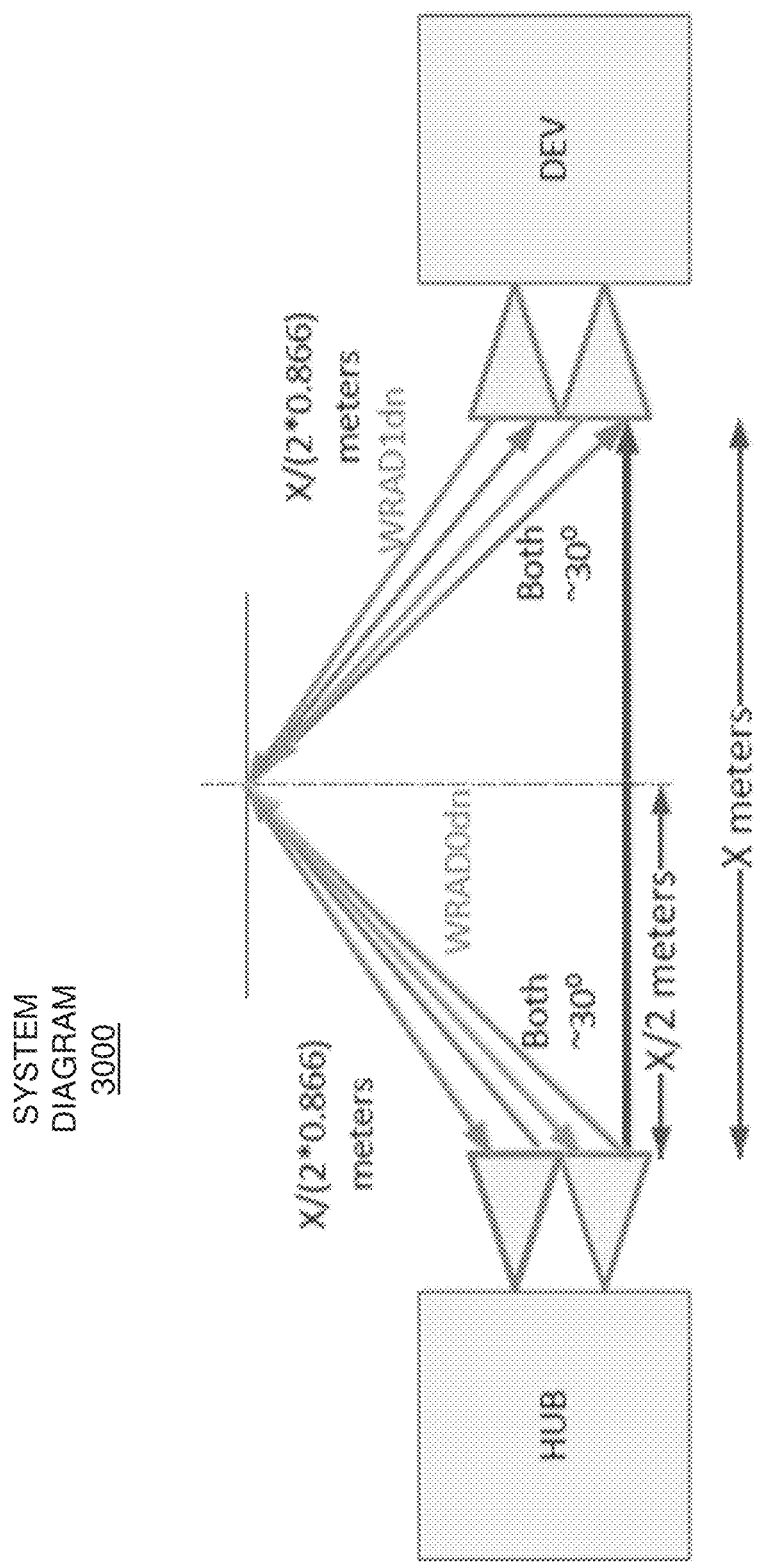
FIG. 30 depicts a system diagram illustrating using different wavelengths to avoid interference according to an embodiment of the subject matter described herein.

Example of a pair of nodes each with 2 WRAD transceivers and a reflecting surface (WRASH not shown):
  Distance HUB-to-DEV, X=10 m; TOF=33 nsec
  Added multipath distance is 1.54 meters or Tmp=5.1 nsec
  $5.1 \times 10^{-9}$ secs $20 \times 10^9$ bps=102 bits @ 20 Gbps
  Down and up channels experience the same delays
  WRAD0 and WRAD1 use different wavelengths; so, no interference FIG. 30 depicts a system diagram 3000 illustrating using different wavelengths to avoid interference.

Example—Down Channel (Repeats According to TOF and Tmp)

HUB transmits 100 bits on WRAD0*dn* and, then, waits 100 bit times before transmitting on WRAD0*dn*, again.

HUB sends another 100 bits of data on WRAD1*dn* immediately after finishing on WRAD0*dn*, DEV receives the first 100 bits on WRAD0*dn*.
DEV ignores the next 100 bits on WRAD0*dn* (reflection),
DEV receives the second 100 bits on WRAD1*dn*.
DEV ignores the next 100 bits on WRAD1*dn* (reflection)

Figure 31:
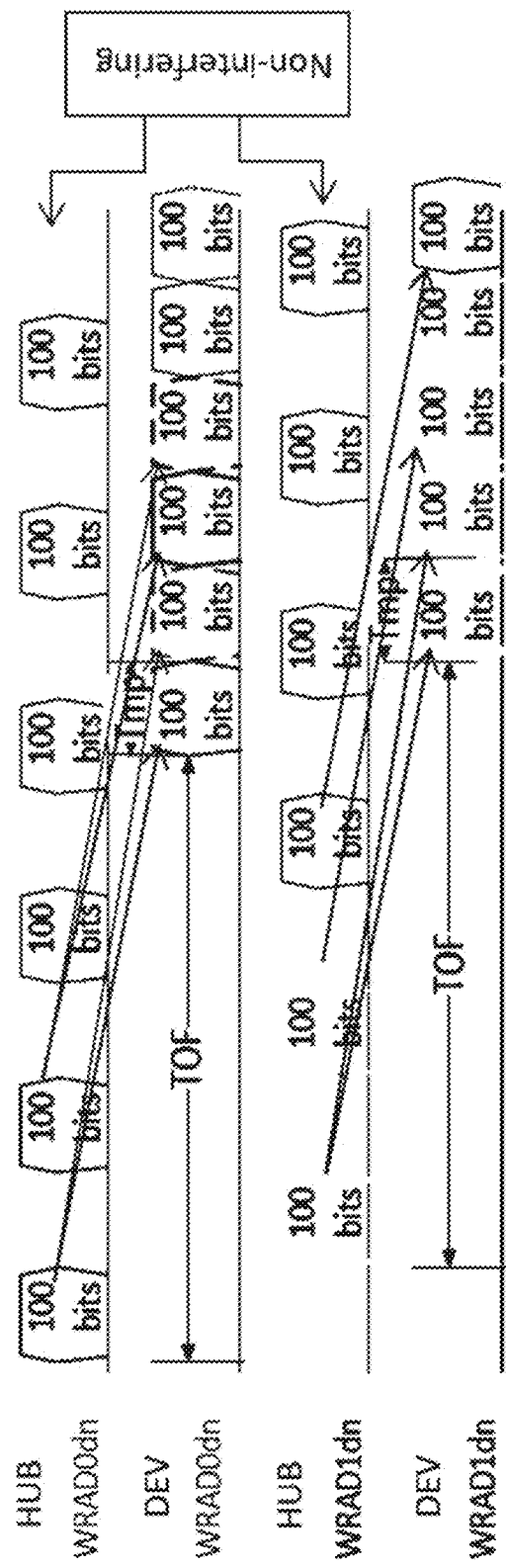
FIG. 31 depicts a timing diagram illustrating different wavelengths to avoid interference according to an embodiment of the subject matter described herein.

FIG. 31 depicts a timing diagram 3100 illustrating different wavelengths to avoid interference.

Example—Up Channel

Figure 32:
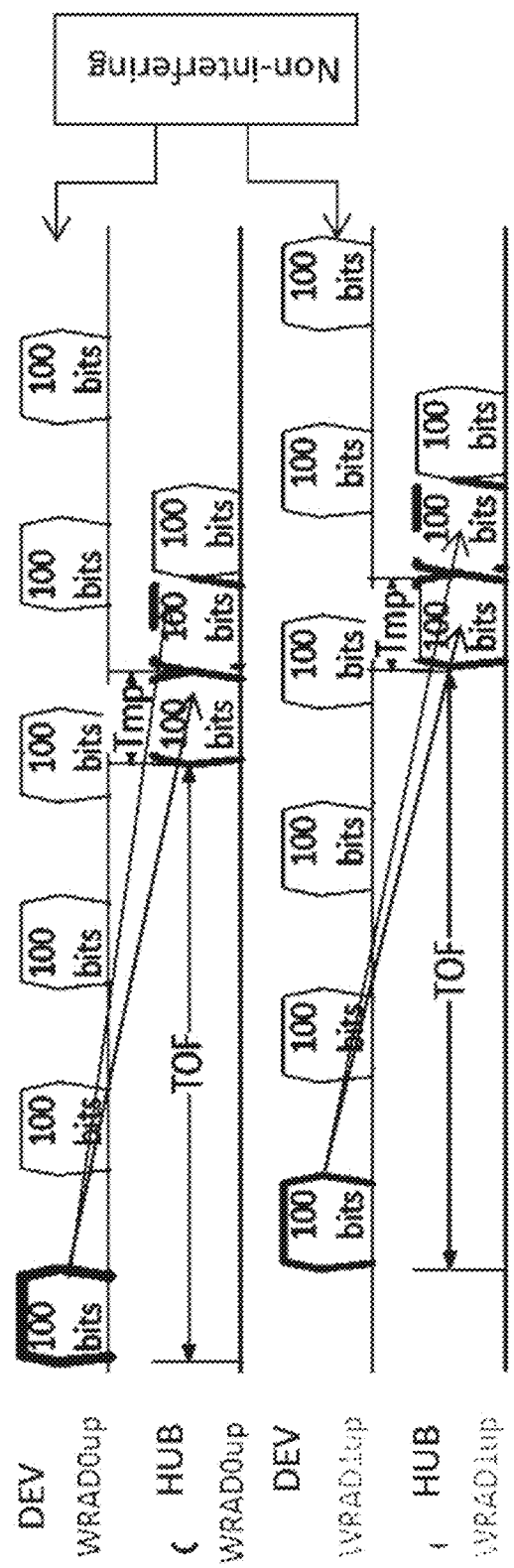
FIG. 32 depicts a timing diagram illustrating different wavelengths to avoid interference according to an embodiment of the subject matter described herein.

Assuming data is queued for the up channel, DEV transmits 100 bits on WRAD0up simultaneous with HUB sending on WRAD0*dn* (not shown) and waits 100 bit times, HUB receives the first 100 bits.
HUB ignores the next 100 bits (reflection),
This sequence repeats scheduled according to TOF and Tmp FIG. 32 depicts a timing diagram 3200 illustrating different wavelengths to avoid interference.

Figure 33:
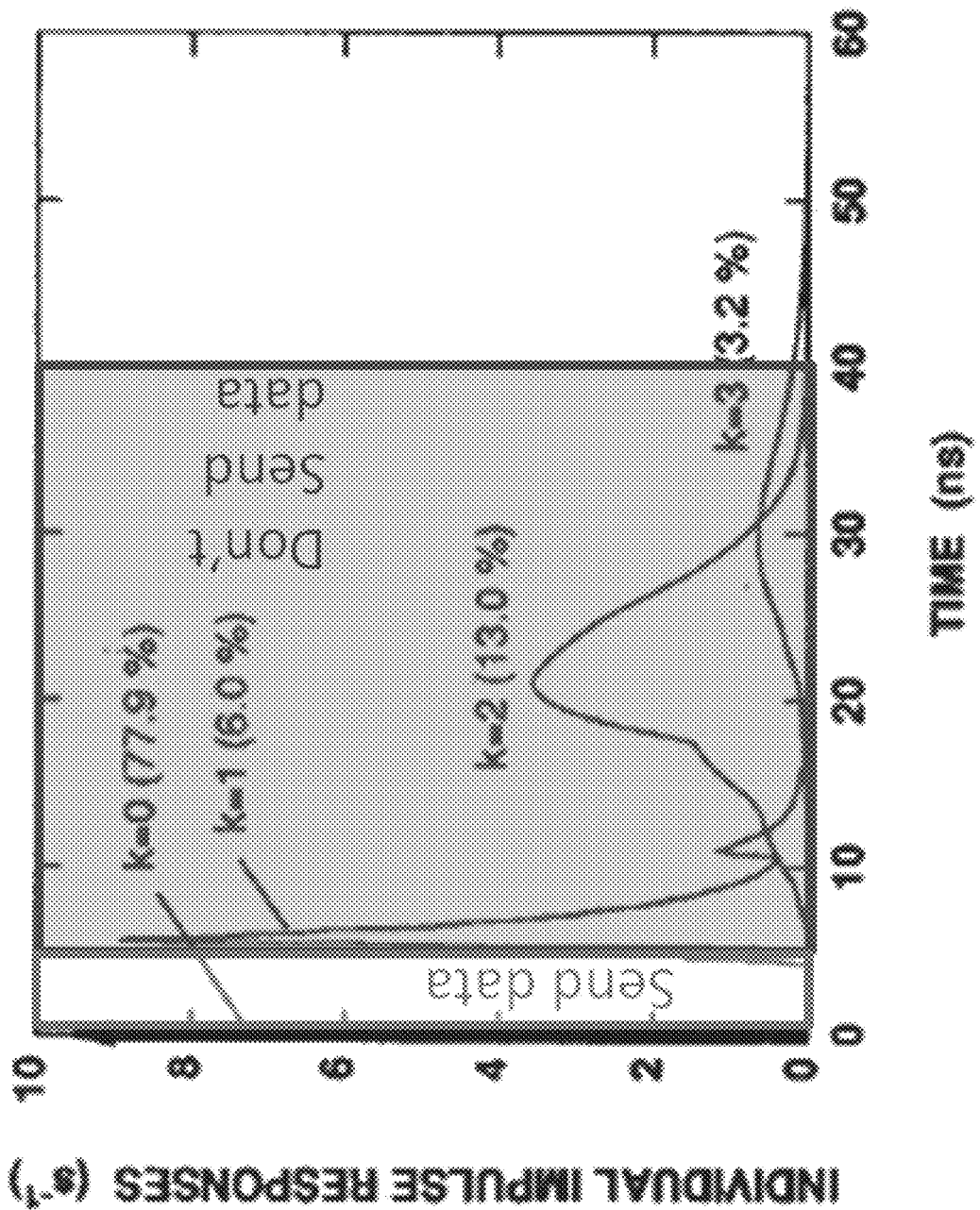
FIG. 33 depicts a graph illustrating an impulse response according to an embodiment of the subject matter described herein.

FIG. 33 depicts a graph 3300 illustrating an impulse response.

The graph 3300 of the simulation, taken from [4], of the impulse response of a room to a pulse from a laser diode, shows k=3 bounces of the K=0 original LOS ray. Note that the K=1 bounce is quite significant relative to the K=0 pulse. The opportunistic scheduling concept is to transmit data in the left region. Note also that there is an interval of approximately 4 ns between the K=0 pulse and the K=1 bounce.

The concept of opportunistic scheduling is to transmit a series of bits before the bounce(s) reach the receiver or during the 4 ns period shown in the graph. At 20 Gbps, that amounts to 80 bits that can be transmitted successfully. The time to quite the channel, according to the graph, could be as much as 40 ns. Therefore, a single channel could only support transmission 5 ns out of 40 ns or ⅛ of the time in each direction. That is 2.5 Gbps. It is possible to transmit in both directions at the same time, however, since the downward transmitter will be idle when the upward transmissions reach its receiver.

In cases where the Lambertian reflections come to the near end receiver either earlier or later than the multipath ray reaches the far end receiver, it is necessary to adjust the transmission time on the reverse direction to compensate. All of this taken together means that the presence of multipath can limit the time during which transmissions can occur on either the down channel or the up or both. Still, compared to the low data rate applications, this is a major increase in data rates. The work in the literature shows that multipath, resulting in a low-pass characteristic to the optical wireless channel, requires one to slow the rate of pulses, alter the modulation used and use equalization to minimize the distortion of pulses.

Figure 34:
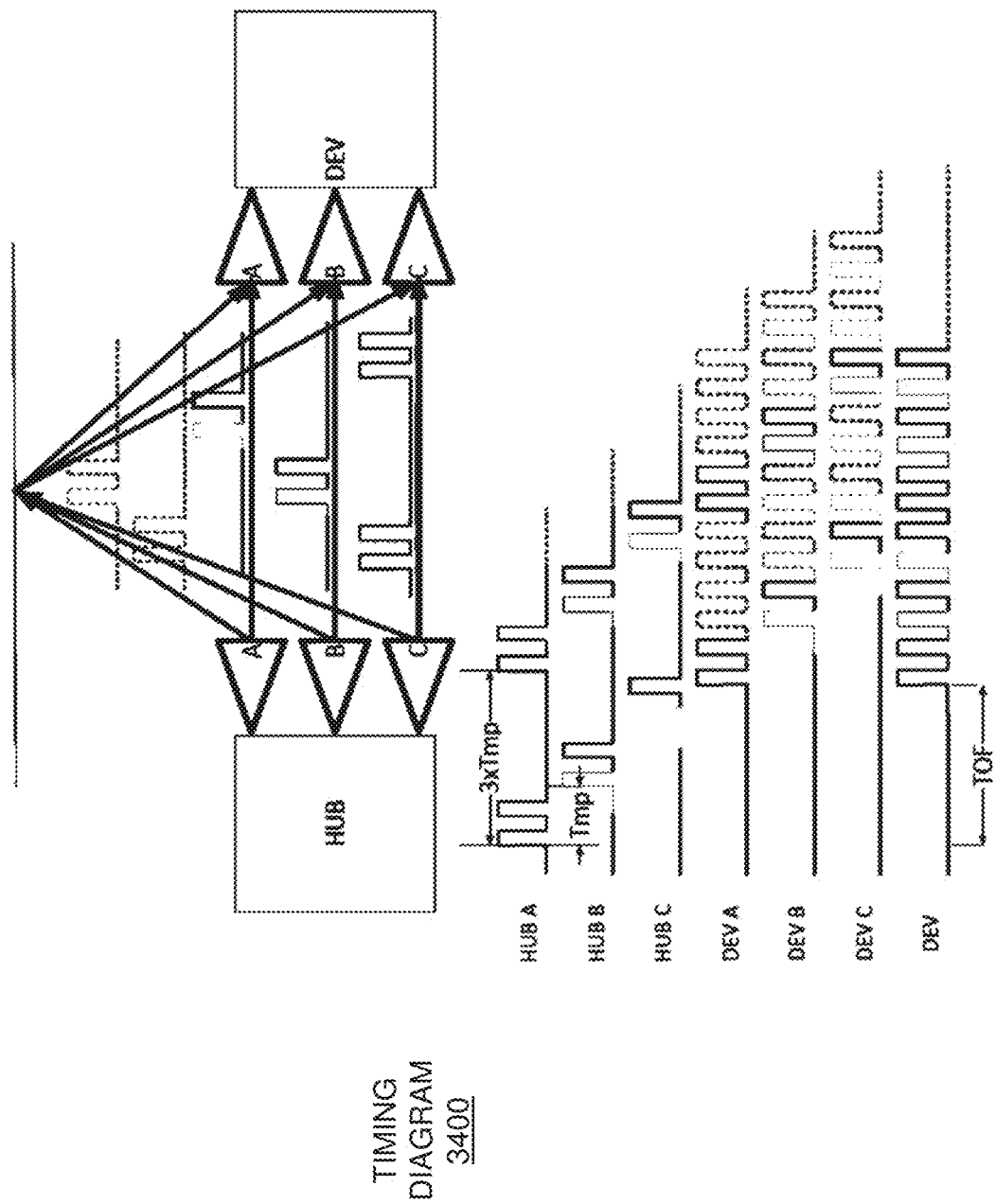
FIG. 34 depicts a timing diagram illustrating transmission of data during all available time according to an embodiment of the subject matter described herein.

The impulse response of a room to a diffuse propagation of an optical source is shown later in FIG. 32. Assume that the opportunistic scheduling results in the ability to transmit during the 1$^{st}$ third of the 30 nsec extent of the impulse response and to go quiet during the last 20 nsec of the interval as shown in FIG. 34. Using three different wavelengths (A,B and C) in a MIMO configuration of transceivers, we can transmit for 10 nsec on each of the wavelengths at times separated by 20 nsec.

FIG. 34 depicts a timing diagram 3400 illustrating transmission of data during all available time. The result achieves the full bandwidth of the transceivers. Reflections are shown as dotted versions of the pulses and are ignored by the receivers.

Figure 35:
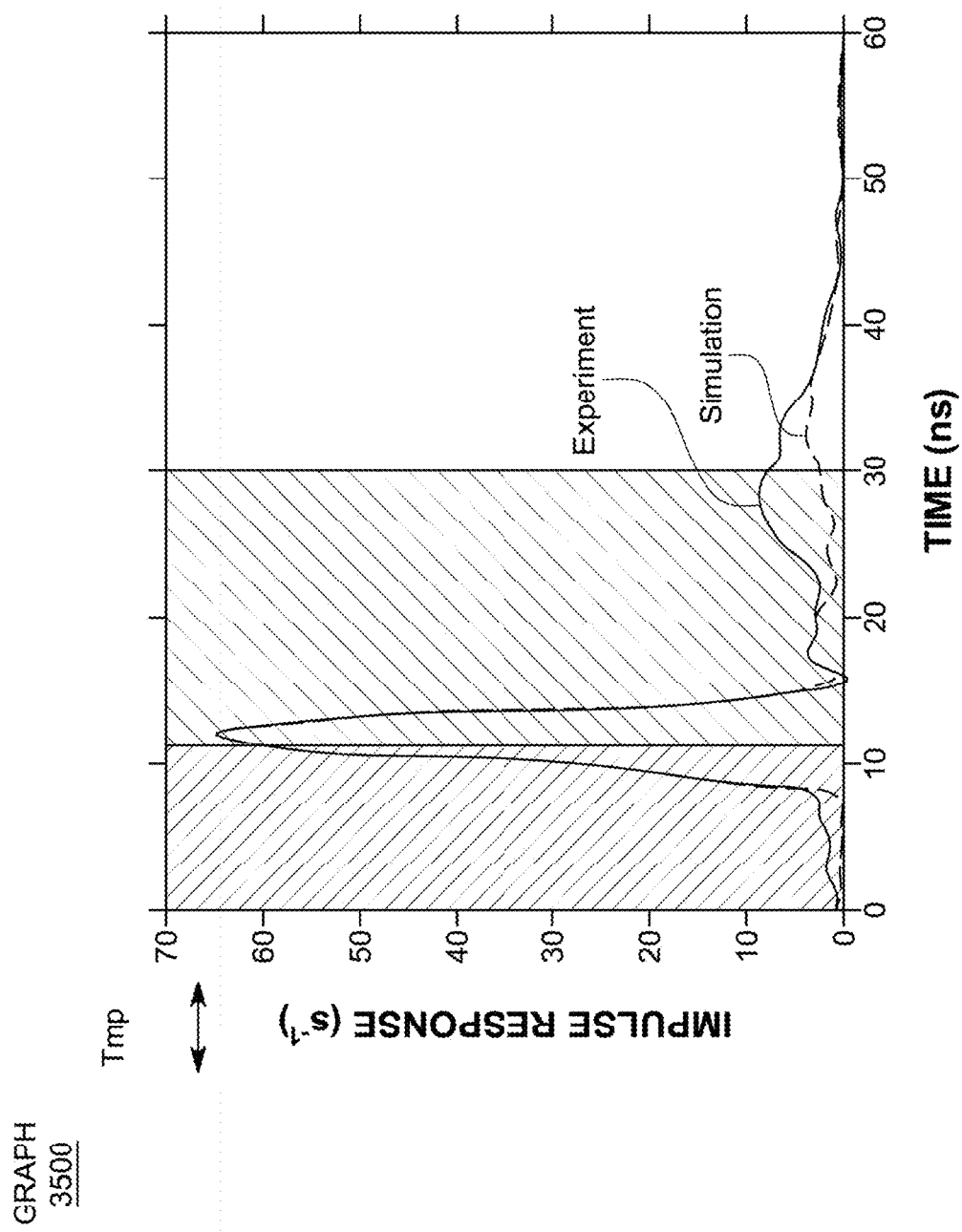
FIG. 35 depicts a graph illustrating an impulse response according to an embodiment of the subject matter described herein.

Note that FIG. 34 shows two square pulses during each 10 nsec transmission time but this is only to indicate when transmission can take place and does not represent the data rate during those intervals. The data rate is determined by the transceivers and not the channel. FIG. 35 depicts a graph 3300 illustrating an impulse response.

Depending on the magnitude of the impulse response in the channel, it may be possible to transmit during more than one interval as shown at right. If the transmission period is expanded to 10 nsec per 32 nsec, that is equal to 6 Gbps. The presence of the second burst of data will change the response so an iterative approach would be needed. Again, transmit during the early portions of the impulse response.

Figure 36:
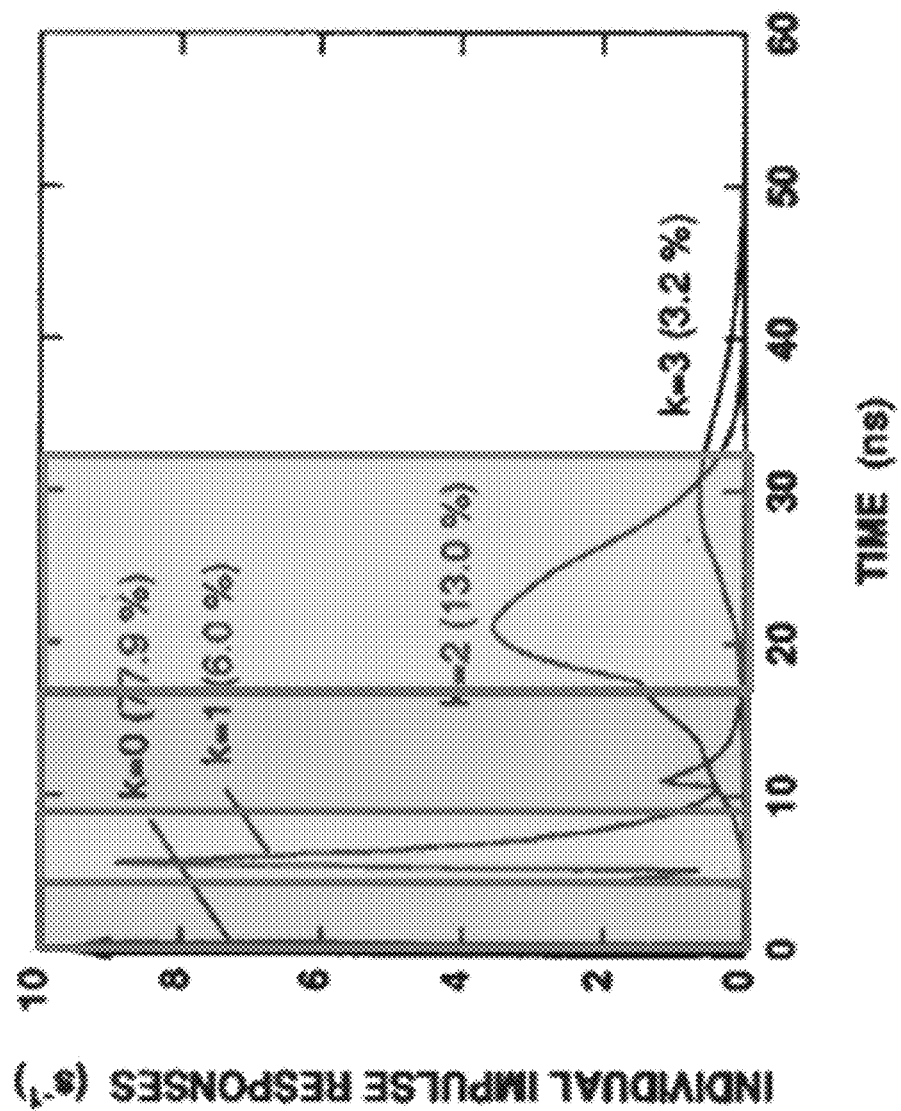
FIG. 36 depicts a graph illustrating an impulse response according to an embodiment of the subject matter described herein.

FIG. 36 depicts a graph 3600 illustrating an impulse response.

The impulse response will show different levels of response as it dies off (as shown). Therefore, the times during which data may be sent will vary through the complete response interval. The choice of when to transmit depends on the timing and strength of the "echoes". In the example given, it isn't clear that the k=2 pulse would, on its own, cause ISI but, when combined with the response from an earlier burst, it may.

The fact that WiRays™ has the ability to send and receive pulses at intervals much less than the impulse response time means that, where the traditional approaches use a single pulse per impulse response interval, WiRays™ is able to send many pulses since the channel is not really low-pass but only has that characteristic when pulses are on the order of 30-50 nsec in width.

Using a transient period to send pulses before the effects of multipath and/or Lambertian back-scattering are felt and holding off sending them until those effects dissipate results in a multiplication of the achievable data rates by a factor of the increase in the number of pulses per impulse response interval.

Use Cases
Startup Scenario

WiRays™ uses the following process to increase the likelihood of success of establishing initial synchronization and getting to the Connected state:

The HUB node sends messages comprising multiple 32 bit pulse trains with a sync code included in the message.

All DEV nodes find the clock pulse from HUB and base their timing from when they receive that clock.

All DEV nodes wait to receive the sync code from the HUB node.

Once the sync code is found, a DEV node that wishes to connect with the HUB node waits for a random number of WRASHdn frames before transmitting. While waiting, the DEV node monitors the WRASH channel for any transmissions other than the one from the HUB node interleaved within the one from the HUB node.

After the random number of WRASHdn frames with no other transmission detected, the DEV node transmits its ID and TYPE on the WRASH channel at a time related to when it perceives the arrival of the sync code.

When the HUB node successfully receives a legitimate ID and TYPE on WRASHup, it determines the TOF for the DEV node and sends a Time-Alignment Message (TAM) to assign the DEV node a specific time slot.

Additional DEV nodes can attempt to achieve sync using the same procedure as shown. Again, they watch for activity on the WRASHup channel and, when, none is detected for their randomly assigned number of WRASHdn frames, they can attempt to establish a connection. While DEV nodes are waiting for the WRASHup channel to become free, since they are held off by the first DEV node to "claim" the channel, they will acquire sync while they are held off. When the channel becomes free, there is the potential that multiple DEV nodes who wish to connect will attempt to do so at the same time. So, there is still a chance that the transmissions from multiple DEV nodes will collide.

In systems with multiple DEV nodes that are already connected, additional communication from the HUB node to the DEV nodes and in the reverse direction, occurs on the WRASH channel.

Figure 37:
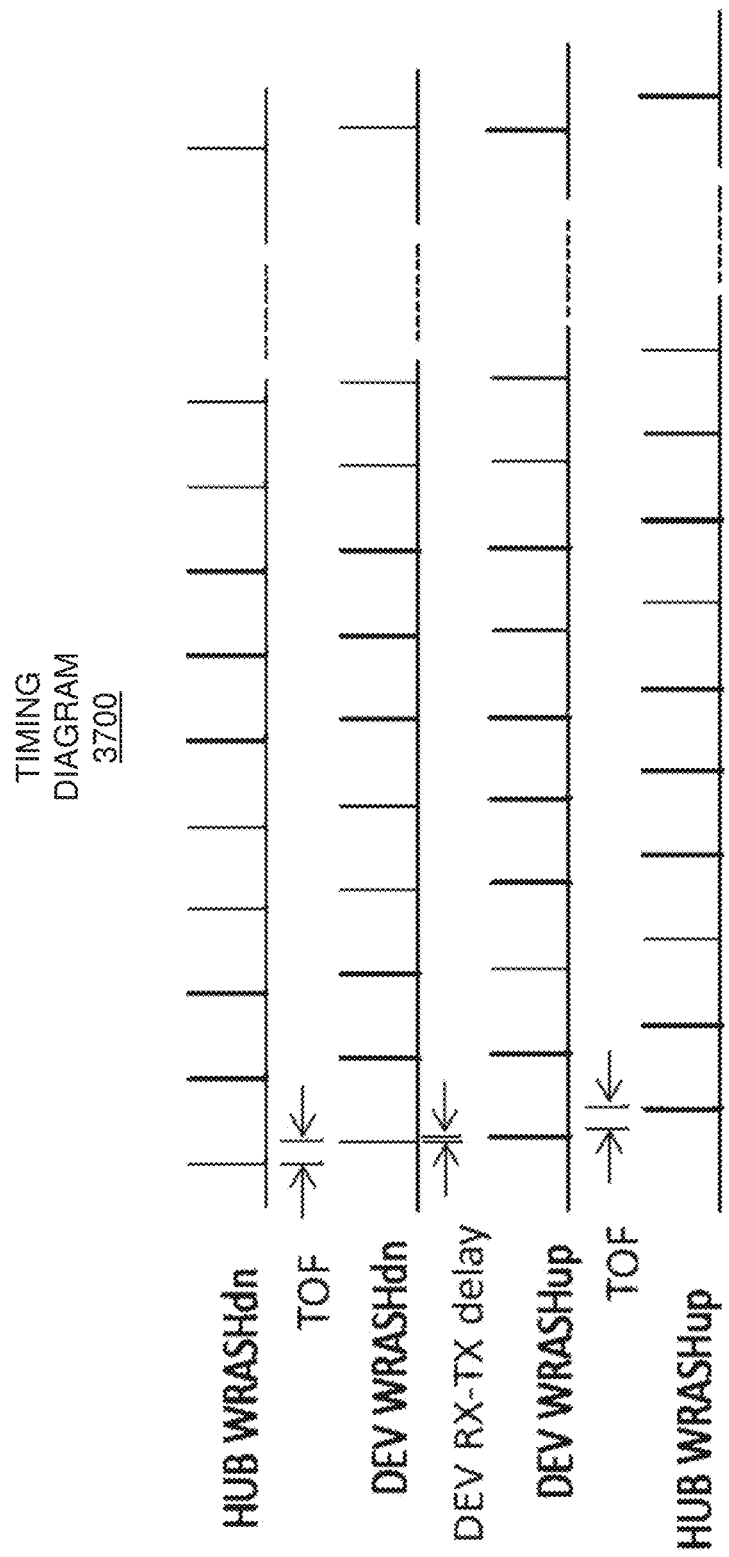
FIG. 37 depicts a timing diagram illustrating a composite pulse-train view according to an embodiment of the subject matter described herein.

There are various scenarios in which WiRays™ systems will be expected to operate:
  Single pair of nodes, nearly ideal environment
  Multiple DEV nodes, nearly ideal environment
  Multiple DEV nodes with varying challenges such as interference and multipath The following sections will describe how the WiRays™ system design deals with these challenges through example scenarios. For the purpose of describing the operation of the WRASH (and WRAD) channel in this document, we present the individual views of the pulses on the WRASH channel by showing what is transmitted from the HUB node and what is subsequently received on the DEV node as being on the WRASHdn channel. For the reverse, the WRASHup channel is presented. However, in reality, these are present on the WRASH channel simultaneously. "HUB WRASHdn" shows what the HUB transmits on the WRASH channel and "DEV WRASHdn" shows what is received by the DEV node. Similarly, "DEV WRASHup" describes what is transmitted by the DEV node and "HUB WRASHup" shows what is received by the HUB node. The timing shown aligns the pulses according to the absolute time. The HUB node timing represents the absolute time. So, the view of the WRASH channel while a DEV node is exchanging bits with the HUB node during synchronization will be presented as:

FIG. 37 depicts a timing diagram 3700 illustrating a composite pulse-train view.

The composite pulse-train view (i.e. the oscilloscope view) gets cluttered and so do the individual connection views.

Figure 38:
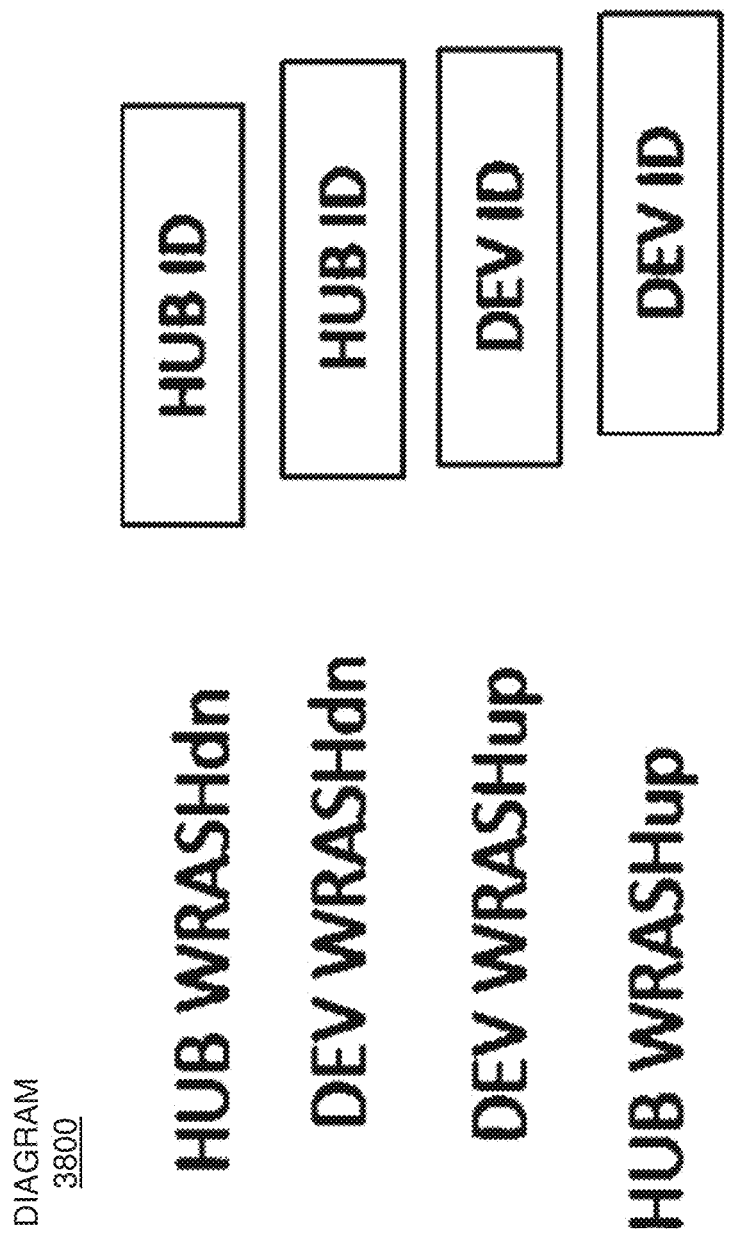
FIG. 38 depicts a diagram illustrating a compact view according to an embodiment of the subject matter described herein.

FIG. 38 depicts a diagram 3800 illustrating a compact view. The compact view shows each 32 bit sequence as a rectangle labeled with what the sequence represents.

For example, if the 32 bits shown in the FIG. 37 were showing the time in the connection sequence where the DEV node has just received and recognized the SYNC code from the HUB node and is in the process of sending its DEVID (while the HUB is sending its ID), then a compact version of this 32 bit IE sequence is shown in FIG. 38

Multiple sequential IEs are shown as adjacent rectangles with text that shows what they represent. In situations where the various nodes' views of the WRASH channel are important to the discussion, they will be represented appropriately for the subject at hand. It is just important to realize that all signals are travelling on the WRASH channel from all transmitters, simultaneously.

The logic of the WiRays™ system avoids collisions by keeping the WRASH channel sparse.

Figure 39:
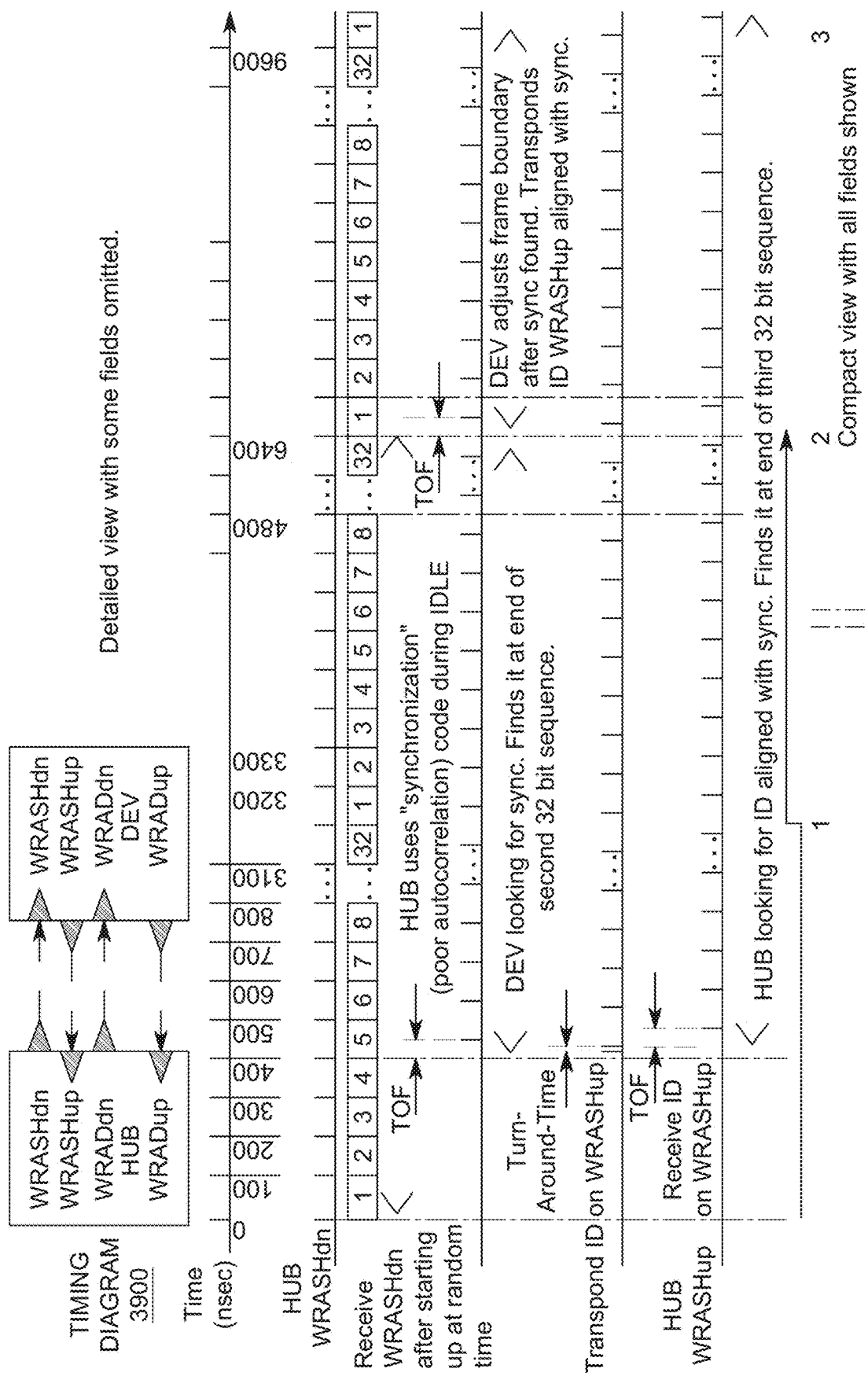
FIG. 39 depicts a timing diagram illustrating the sequence of sync acquisition in the case of a single device node and a channel with no multipath or other interferers according to an embodiment of the subject matter described herein.
Figure 40:
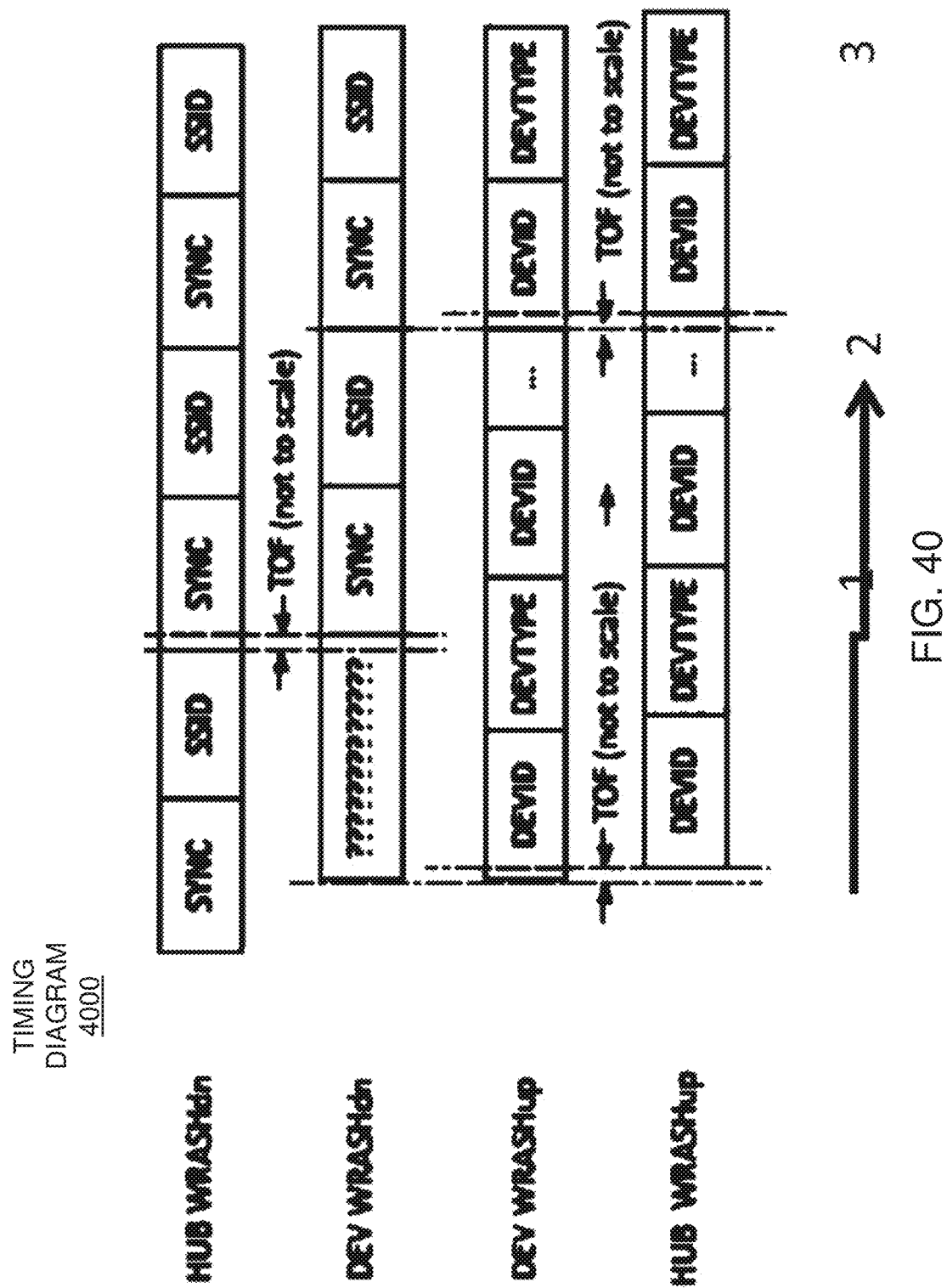
FIG. 40 depicts a timing diagram illustrating the sequence of sync acquisition in the case of a single device node and a channel with no multipath or other interferers according to an embodiment of the subject matter described herein.

FIG. 39 depicts a timing diagram 3900 and FIG. 40 depicts a timing diagram 4000 illustrating both illustrating the sequence of sync acquisition in the case of a single DEV node and a channel with no multipath or other interferers. The assumption is that the HUB node starts before the DEV node and begins broadcasting the sync pattern along with a System ID (SID) as a repeating sequence of 2 32 bit codes (procedure is similar if DEV starts first).

DEV node starts receiving bits after 1 TOF from when they are sent from the HUB node. This is, in general, at an unknown position in the sync+SID pattern. The DEV node returns its DEVID and DEVTYPE bit-by-bit. There is a slight delay (Turn-Around Time) after DEV receives a bit before it transmits to avoid a self-collision if it is very close to the HUB node.

After the DEV node detects the 32 bit sync sequence, it sends the DEVID+DEVTYPE aligned with bits in the sync sequence as it receives them.

The HUB node receives the DEVID bits after a TOF. The HUB node determines that a DEV node has sent its ID by recognizing a legitimate DEVID code.

Once the new DEV node is successfully identified, a Time-Alignment Message (TAM) is sent to the DEV node by the HUB node using the DEVID received. If no DEVID was successfully determined, the HUB goes back to sending the sync sequence. All waiting DEV nodes will go through random back-off and the sequence will start again.

The DEV node has the timing of the HUB node and can successfully receive the TAM just as it has with the initial sync code. No other nodes will interfere with the TAM since, if they are active and not already synchronized, they are either in random back-off mode or are waiting for a response to their DEVID which won't come.

Figure 41:
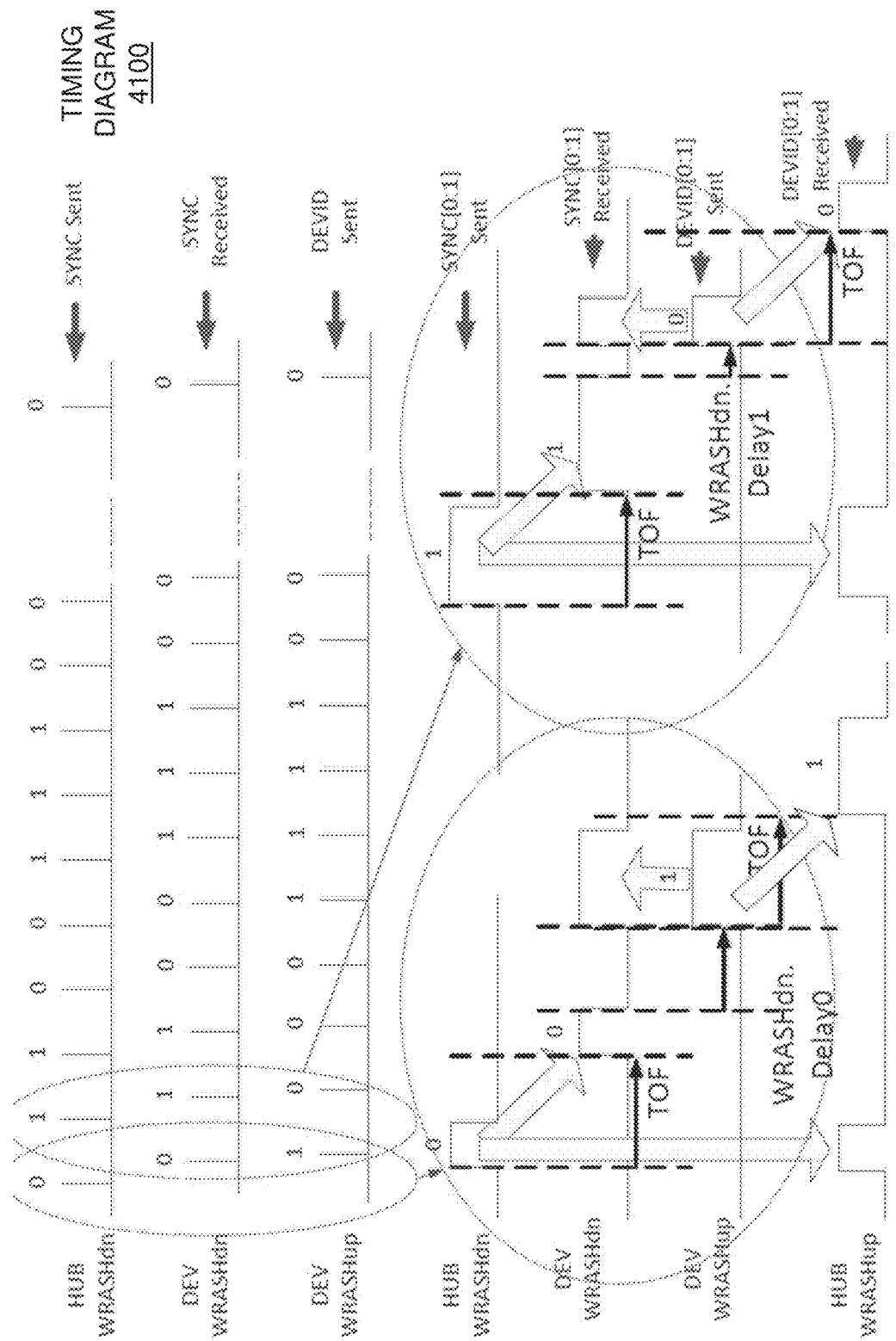
FIG. 41 depicts a timing diagram illustrating the sync sequence start of a device node according to an embodiment of the subject matter described herein.

Once the DEV node receives the TAM, it responds according to the TAM parameters using the assigned subslot of slot 1. The TAM includes the TOF for the DEV node and, so, it responds in advance of the time by the amount of the TOF. To make this work, the TAM assigns DEV nodes to subslots in slot 1 according to their TOF such that, as much as possible, there is no incursion into slot 0 as far as other DEV nodes are concerned. FIG. 41 depicts a timing diagram 4100 illustrating, once the DEV node has determined where the sync sequence starts:

- The HUB node sends its sync code on WRASHdn.
- The DEV node receives the first bit of the sync code on WRASHdn.
- After determining that the pulse width of the signal received on WRASHdn represents a "0", the DEV node waits a delay time for a 0 and responds on WRASHup with the first bit of its DEVID code.
- The HUB node receives the first bit of the DEVID code and measures the Time-Of-Flight (TOF) as twice the time since it sent the sync code less the delay time for a 0 (WRASHdn.delay0).
- Repeat for the second bit with the DEV node using the delay time for a "1" (WRASHdn.delay1) in the example.
- Repeat for all bits in the sync code. The HUB node refines its estimate of the TOF over the 32 bit sync sequence.

Figure 42:
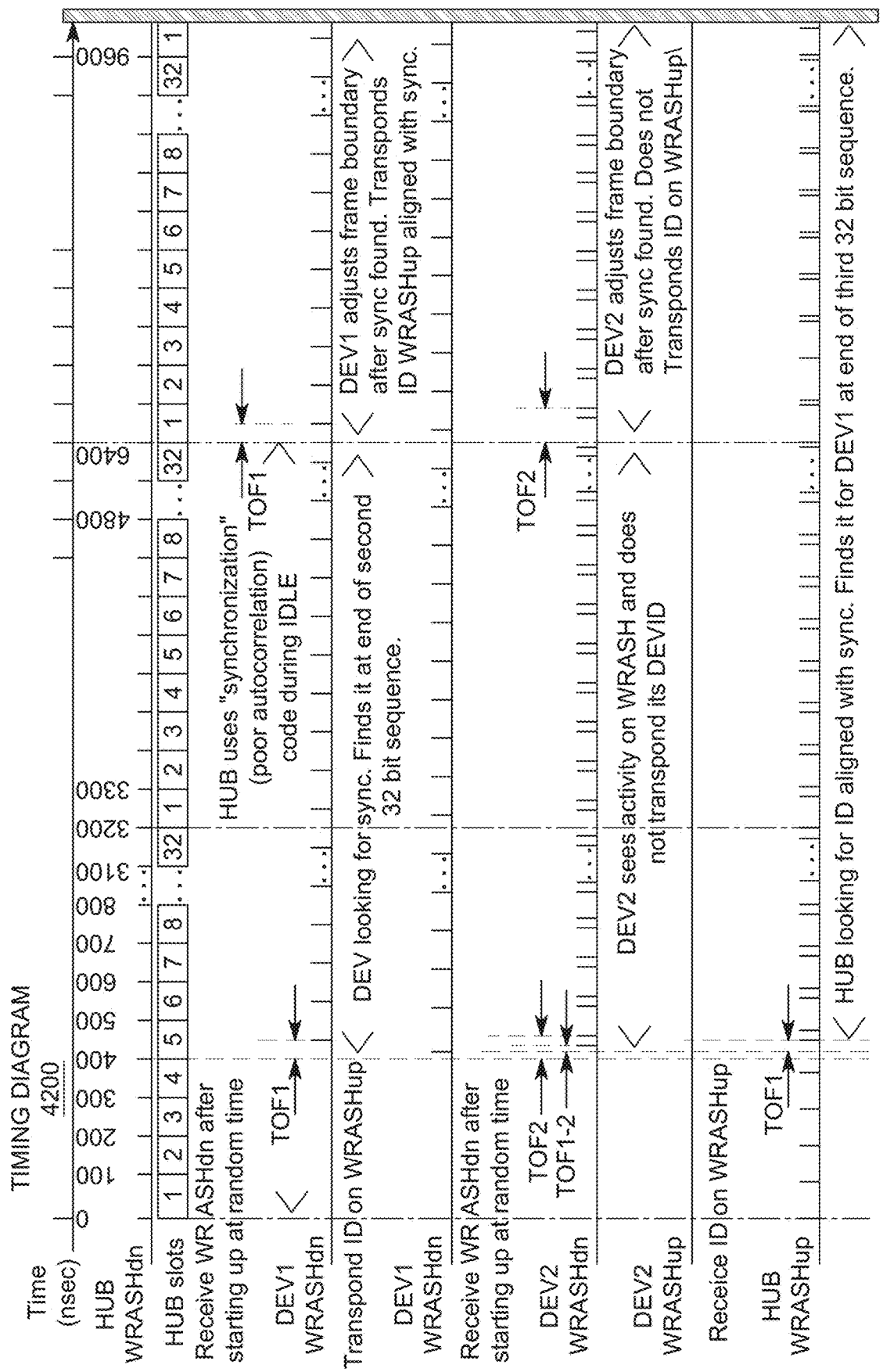
FIG. 42 depicts a timing diagram illustrating a detailed according to an embodiment of the subject matter described herein.
Figure 43A:
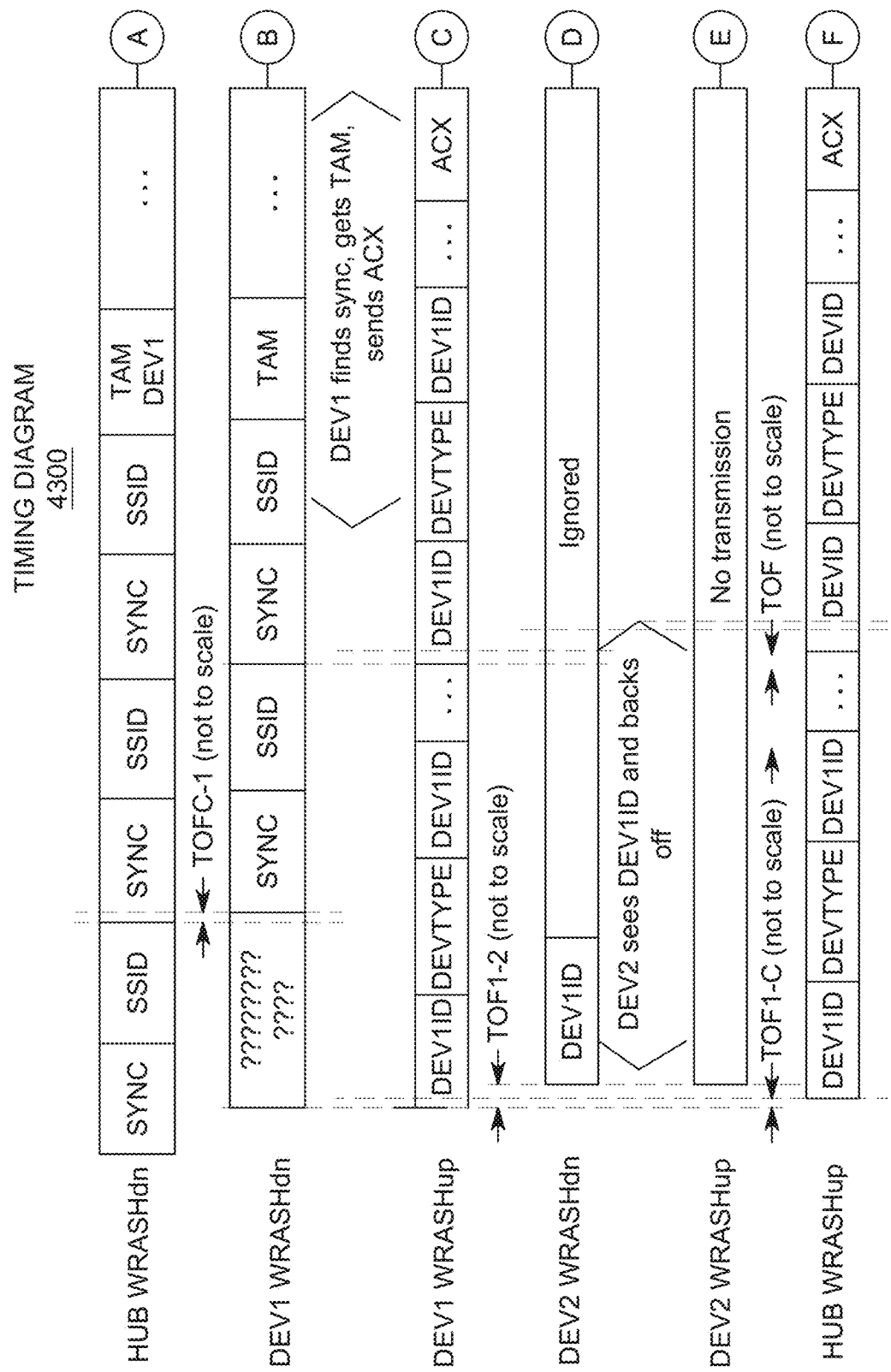
FIGS. 43A and 43B depict a timing diagram illustrating a compact view according to an embodiment of the subject matter described herein.
Figure 43B:
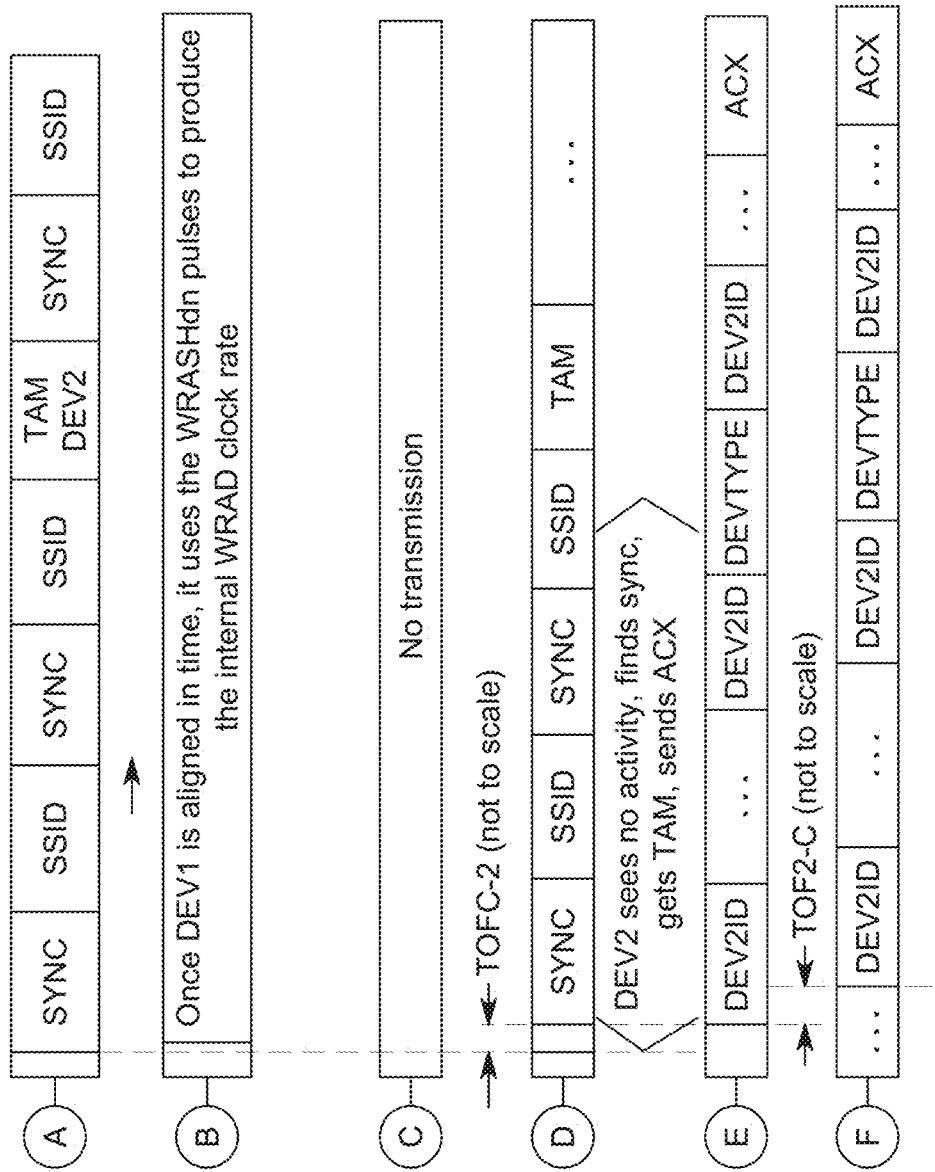

FIG. 42 depicts a timing diagram 4200 illustrating a detailed view and FIGS. 43A and 43B depict a timing diagram 4300 illustrating a compact view both showing the sequence of sync acquisition in the case of multiple DEV nodes when they start looking for Sync in the same sync frame. When DEV nodes start looking for sync in different frames, the sequence is as for the single node case.

The assumption is that the HUB node starts before the DEV nodes and begins broadcasting the sync pattern along with a System ID (SID) as a repeating sequence of 2 32 bit codes (procedure is similar if one or more DEV nodes start first).

After verifying that there is no activity on the WRASHdn channel, the DEV1 node starts receiving bits at an unknown position in the sync pattern. It transponds its own DEVID to "claim" the channel. In this example, DEV2 sees activity on the WRASH channel and waits a random number of sync frames to try again.

After the DEV node receives the 32 bit sync sequence, it sends the DEVID aligned with the bits in the sync sequence as it receives them.

The HUB node receives the DEVID bits by keeping the last 32 bits received and determines that a DEV node has sent its ID by recognizing a legitimate DEVID code in the 32 preceding bit times. During earlier 32 bit intervals, no such legitimate code was found.

While receiving bits on WRASHdn, the DEV node looks for pulses interleaved in the same 100 nsec interval. If they exist and they are not duplicates of other pulses in that same interval, then it assumes that another DEV node is communicating on the channel and does a backoff sequence.

Supported Interfaces

WiRays™ can stand alone as a wireless optical communication system. In addition, other standard interfaces are supported on top of the WiRays™ communication "pipe". These include but are not limited to:

PCI-Express Gen 1-4

Figure 44:
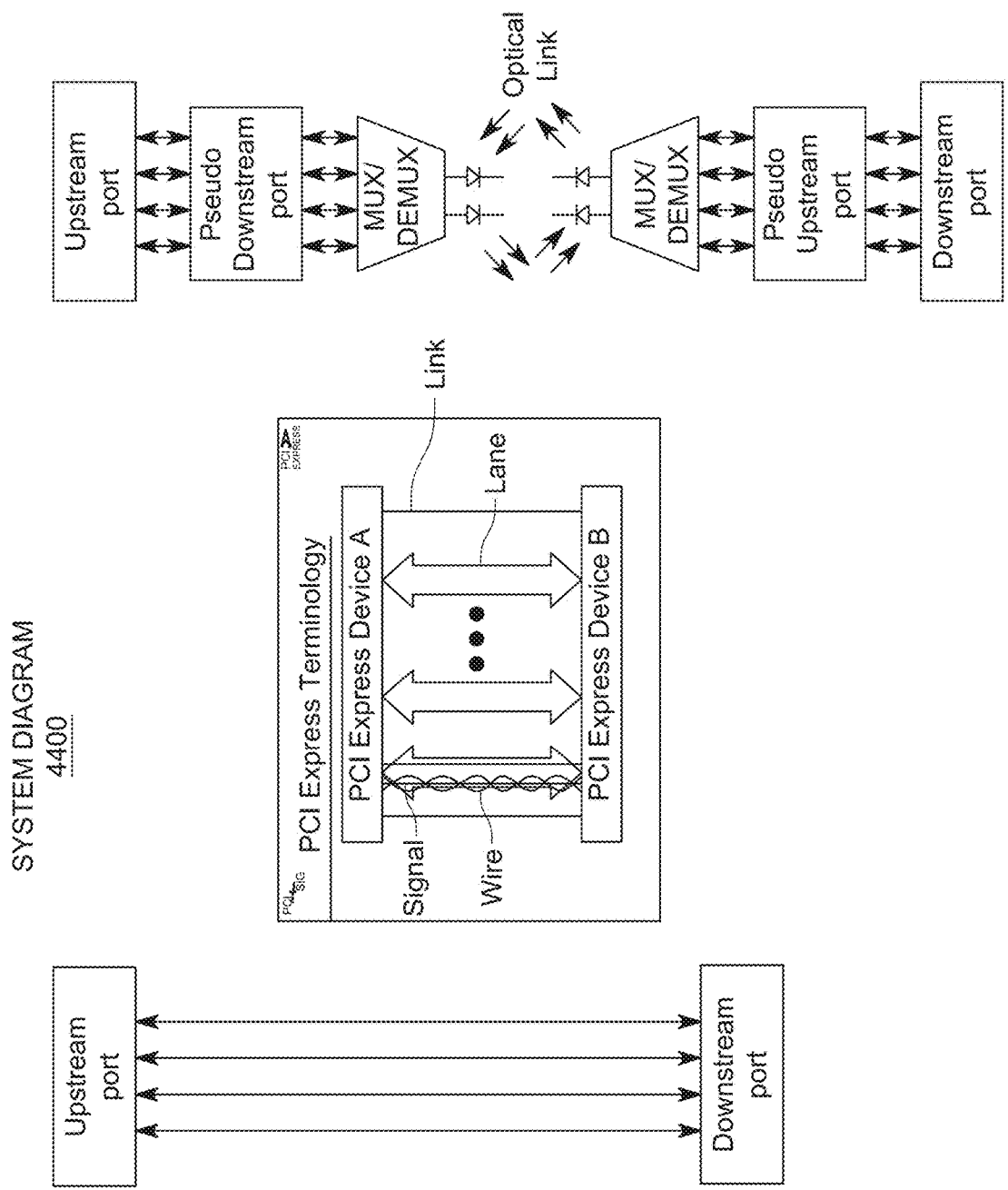
FIG. 44 depicts a system diagram illustrating a WiRays™ configuration providing a wireless optical extension of PCI-Express according to an embodiment of the subject matter described herein.

FIG. 44 depicts a system diagram 4400 illustrating a WiRays™ configuration providing a wireless optical extension of PCI-Express. Where there is a "Downstream Port" connected into an "Upstream Port" with clock distribution and multi-lane, multi-gigabit-per-second, bidirectional wired connection, the wired connection can be replaced by multiple WRAD channels to handle the data traffic and the WRASH channel to distribute the clock in a transparent manner. The additional piece is a pair of "pseudo" ports that implement the electrical characteristics of the respective actual ports to the complementary port. That is, the Pseudo-Downstream Port presents the electrical characteristics of the actual Downstream Port to the Upstream Port ahead of the WiRays™ optical connection and the Pseudo-Upstream Port presents the electrical characteristics of the actual Upstream Port to the Downstream Port after the WiRays™ optical connection.

HDMI Including 2.x

For HDMI, WiRays™ provides a wireless optical extension of the normally wired connection between two HDMI ports. The 3 data and 1 clock lanes of HDMI are mapped directly to multiple WRAD channels and the WRASH channel, respectively.

USB Including 3.x

For USB, WiRays™ provides a wireless optical extension of the normally wired connection between a USB host and device port.

MIPI interfaces such as those for audio, camera and imaging, chip-to-chip, control and data, debug and trace, and display and touch are supported by the WiRays™ system.

Any lower speed interfaces such as I2C that are mentioned above are supported via a convergence layer in the Media Access Control portion of the system.

Applications

WiRays™ achieves very high data rates compared to contemporary wireless communications standards. The high data rates are accompanied by very low latency, again, as compared to competing technologies. The applications in which these attributes of high data rate, low latency and mobility of WiRays™ provide advantages include but are not limited to:

- Virtual Reality
- Augmented Reality
- Very high-definition video transfer and streaming
- High-speed data transfer for data storage systems, etc.

Key Features

A few key features of the previously disclosed WiRays™ System are include (but are not limited to):

- Scheduling of communications activities using a control channel separated from the transmission of data so that, once set up, data communications operate at maximum speed with little or no interruption or overhead.

MIMO using multiple rays on the same wavelength spaced and oriented for diversity, multiple parallel rays on different wavelengths, and multiple rays arranged to cover 360° for mobility; may be used to minimize probability of an unrecoverable collision of optical rays.

A control channel that is separate from the data channel; wherein the control channel operates at higher power than the data channel, runs at a lower data rate and more robust modulation than the data channel, and the receiver can detect the occurrence of pulses when they happen with time resolution of at least 50 ps.

Propagation properties of the WRASH channel that are similar enough to the data channel such that the WRASH channel can be used to characterize the optical wireless channel to optimize through-put.

Observing collisions from multipath and multiple transmitters using the control channel to estimate similar effect within the data channel.

Using PWM for linearity and intersymbol interference (ISI) tolerance on the control channel Using scheduling strategies and limiting non-synchronized communications to avoid collisions such that once synchronized communications are timed to avoid collisions.

Supporting multiple data channel transceivers that use different wavelengths of light in order to avoid interference between transmitters.

Including control channel tracking to mitigate multipath on the data channel exploiting the commonalities between the two channels.

Supporting power level change to deal with multipath on both the control and data channels including a fast power adjustment using a single bit, up/down control in a rapidly repeating control code on the WRASH channel for the WRASH and for each individual wavelength WRAD channel.

Supporting adaptive data rate and adaptive receiver bandwidth to effectively respond to channel conditions.

Synchronizing each DEV node's clock phase to the HUB node clock via the 10 MHz Reference Clock sent on the WRASH channel, wherein the 10 MHz clock is derived from a 100 MHz clock used by each end of the connection.

Using the 10 MHz Reference Clock signal also as a scheduling message stream by encoding 0s and 1s using pulse width modulation of the clock pulses Interleaving message streams between the HUB node and multiple DEV nodes on the WRASH channel during Discovery and Connect.

Scheduling that is based on the Reference Clock that is sent on the WRASH channel by the HUB node to all DEV nodes.

In addition to being a clock pulse, the WRASH pulse train is pulse-width modulated with either a "0" indicated by a short pulse or a "1" indicated by a long pulse. Each pulse is individually modulated as necessary to create a desired bit sequence over 32 successive 100 nanosecond pulse periods.

The WRASH pulse train is organized into codes of, for example, 32 bits:

The HUB node monitors transmissions from DEV nodes to determine "time-of-flight" (TOF) of signals from the DEV node to the HUB node. This is done by knowing that the DEV node times an uplink (DEV-to-HUB) signal that it sends on WRASHup at a fixed delay from receipt of the Reference Clock signal from the HUB node. The TOF is ½×(round-trip delay−fixed RX-TX interval in the DEV node).

Using the TOF measurement by the HUB node to establish scheduling on both the WRASH and WRAD channel(s) individually for each DEV node.

Using the HUB node to track TOF per DEV node as changes occur due to movement of DEV nodes relative to the HUB node.

Exchanging of pulse trains from DEV-to-HUB is done in such a way as to avoid collisions.

The approach taken involves two "slots":

Slot 0 is used for transmissions from DEV to HUB before a DEV node is synchronized.

Slot 1 is used for transmissions from DEV nodes that are synchronized based on their known Times-Of-Flight Synchronizing DEV nodes using slot 0 and 1 to measure the TOF between them.

Using the HUB and DEV nodes to constantly estimate the multipath delay, Tmp, (and Time-Of-Flight) on each HUB-DEV WRASH channel in both directions, wherein the DEV nodes estimate time-of-flight and multipath timing on the path between itself and each other DEV node using the WRASH transmissions from each DEV node.

Using multiple multipath estimates in both directions, wherein the colocation of the transmit LEDs and detectors means that the delay measured is very close whether HUB-to-DEV or DEV-to-HUB. Still, it is beneficial to get multiple estimates.

Compensating for multipath when is determined for the WRASH communications between a particular DEV node and the HUB node, thus allowing support of communication with multiple DEV nodes using scheduling.

Using the presence of multipath such that multiple copies of transmissions are received and can be combined to improve the link margin for the WRASH connection involved.

Mitigating bit errors due to collisions between transmissions from different unsynchronized DEV nodes or due to collisions of a single DEV node's transmission with a reflection of itself Using higher power to accentuate the LOS signal and makes it easier to detect successfully but at the expense of more power consumption and considering dynamic power adjustment for periods with significant reflections.

Using polarization to reduce the impact of reflected light since polarity is not maintained in a reflection.

Using opportunistic scheduling.

The use of scheduling to deal with multipath assumes the following:

Two or more transceivers are at each end of the link. The transceivers operate on different wavelengths and, so, do not interfere with one another. The use of two transceivers is needed to achieve full-duplex operation in any situation whether doing opportunistic scheduling or not.

A measurement of the multipath delay is required to be accurate to the time for 1 bit or 50 psec. The WRASH channel is used for this.

Use intermittent transmission on the transceivers from the near end to the far end and also from the far end to the near end. Time the transmissions so that the reflection(s) of the LOS ray or first reflected ray in the non-LOS case is(are) ignored at the far end receiver for the duration of the significant channel impulse response caused by the reflection(s). Put another way, use the delay in the impulse response as a time to send a burst of pulses. Then go quiet until the channel stops reflecting.

Transmit in opposite directions on the two non-interfering wavelengths.

Dynamic adjustment of the timing and length of bursts of data is needed to utilize the channel optimally.

Using different delays when replying to a 0 vs a 1 to make detecting collisions more robust.

After determining that the pulse width of the signal received on WRASHdn represents a "0", the DEV node waits a delay time for a 0 and responds on WRASHup with the first bit of its DEVID code.

The HUB node receives the first bit of the DEVID code and measures the Time-Of-Flight (TOF) as twice the time since it sent the sync code less the delay time for a 0 (WRASHdn.delay0).

Repeat for the second bit with the DEV node using the delay time for a "1" (WRASHdn.delay1) in the example.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The invention claimed is:

1. A first free-space-optical (FSO) device for providing out-of-band management for a first FSO data channel associated with a second FSO device, the first FSO device comprising:
   a processor;
   a memory coupled with the processor;
   a first device first FSO transmitter coupled with the processor; and
   a first device first FSO receiver coupled with the processor, wherein:
      the second FSO device comprises a second device first FSO transmitter and a second device first FSO receiver;
      the first device first FSO transmitter is configured for transmitting a control signal to the second device first FSO receiver;
      the first device first FSO receiver is configured for receiving a response signal from the second device first FSO transmitter; and
      the processor is configured for:
         determining a first time interval based on the control signal, the response signal, and a detected multipath reflection, wherein the detected multipath reflection is detected by at least one of:
            the first device first FSO receiver upon receiving the response signal; and
            the second device first FSO receiver upon receiving the control signal;
         modifying transmission parameters associated with the first FSO data channel based on the first time interval;
         and
      the control signal and the response signal are distinct from the first FSO data channel.

2. The first FSO device of claim 1, wherein:
the control signal comprises timing information and bandwidth management information; and
the processor is further configured for modifying the timing information and the bandwidth management information based on the first time interval.

3. The first FSO device of claim 2, wherein the control signal further comprises a plurality of optical pulses and each optical pulse provides a portion of the timing information and a portion of the bandwidth management information.

4. The first FSO device of claim 3, wherein:
at least one of a rising edge and a falling edge of each optical pulse provides the portion of the timing information; and
the portion of the bandwidth management information is a data symbol.

5. The first FSO device of claim 1, wherein the first FSO data channel is a bidirectional data channel.

6. The first FSO device of claim 1, wherein:
the first FSO device is an FSO hub device; and
the first FSO device is further configured for providing out-of-band management for a second FSO data channel associated with a third FSO device.

7. The first FSO device of claim 6, wherein:
the first FSO data channel is a bidirectional data channel; and
the second FSO data channel is a bidirectional data channel.

8. The first FSO device of claim 1, wherein:
the first FSO data channel is a bidirectional data channel; and
the first FSO device further comprises
a first device second FSO transmitter coupled with the processor; and
a first device second FSO receiver coupled with the processor, wherein:
the first device second FSO transmitter is configured for transmitting over the first FSO data channel to the second FSO device; and
the first device second FSO receiver is configured for receiving over the first FSO data channel from the second FSO device.

9. The first FSO device of claim 8, wherein:
the first device first FSO transmitter is configured to transmit using a first wavelength;
the first device second FSO transmitter is configured to transmit using a second wavelength; and
the first wavelength and the second wavelength are distinct wavelengths.

10. The first FSO device of claim 8, wherein:
the second FSO device comprises:
a second device second FSO receiver configured for receiving over the first FSO data channel from the first FSO device; and
a second device second FSO transmitter configured for transmitting over the first FSO data channel to the first FSO device.

11. The first FSO device of claim 10, wherein:
the second device first FSO transmitter is configured to transmit using a first wavelength;
the second device second FSO transmitter is configured to transmit using a second wavelength; and
the first wavelength and the second wavelength are distinct wavelengths.

12. The first FSO device of claim 10, wherein:
the first device second FSO transmitter is configured to transmit using a first wavelength;
the second device second FSO transmitter is configured to transmit using a second wavelength; and
the first wavelength is approximately equal to the second wavelength.

13. The first FSO device of claim 1, wherein modifying transmission parameters associated with the first FSO data channel includes modifying an equalization associated with the first FSO data channel.

14. The first FSO device of claim 13, wherein modifying the equalization associated with the first FSO data channel includes modifying a pre-emphasis associated with the first FSO data channel.

15. The first FSO device of claim 13, wherein modifying the equalization associated with the first FSO data channel includes modifying a post-emphasis associated with the first FSO data channel.

16. A method implemented on a first free-space-optical (FSO) device for providing out-of-band management for a first FSO data channel associated with a second FSO device, the first FSO device comprising a processor, a memory coupled with the processor, a first device first FSO transmitter coupled with the processor; and a first device first FSO receiver coupled with the processor; the method comprising:
transmitting a control signal to a second device first FSO receiver of the second FSO device via the first device first FSO transmitter;
receiving a response signal from a second device first FSO transmitter of the second FSO device via the first device first FSO receiver;
determining a first time interval based on the control signal, the response signal, and a detected multipath reflection, wherein the detected multipath reflection is detected by at least one of:
the first device first FSO receiver upon receiving the response signal; and
the second device first FSO receiver upon receiving the control signal;
and
modifying transmission parameters associated with the first FSO data channel based on the first time interval, wherein the control signal and the response signal are distinct from the first FSO data channel.

* * * * *